US011327203B1

(12) United States Patent
Cook et al.

(10) Patent No.: US 11,327,203 B1
(45) Date of Patent: May 10, 2022

(54) OPTICAL FIBER CABLES SUBSTANTIALLY FREE OF COLORANT

(71) Applicant: Superior Essex International LP, Atlanta, GA (US)

(72) Inventors: Thomas Christopher Cook, Woodstock, GA (US); Amir Sekhavat, Marietta, GA (US)

(73) Assignee: Superior Essex International LP, Atlanta, GA (US)

( * ) Notice: Subject to any disclaimer, the term of this patent is extended or adjusted under 35 U.S.C. 154(b) by 72 days.

(21) Appl. No.: 16/855,093

(22) Filed: Apr. 22, 2020

(51) Int. Cl.
*G02B 1/04* (2006.01)
*B29D 11/00* (2006.01)

(52) U.S. Cl.
CPC ........ *G02B 1/046* (2013.01); *B29D 11/00663* (2013.01)

(58) Field of Classification Search
CPC .................. G02B 1/046; B29D 11/00663
See application file for complete search history.

(56) References Cited

U.S. PATENT DOCUMENTS

| 1,830,411 | A | 11/1931 | Schork, Jr. |
| 2,516,751 | A | 7/1950 | Brown |
| 3,020,335 | A | 2/1962 | Giiiis |
| 3,020,355 | A | 2/1962 | Moriya |
| 3,102,160 | A | 8/1963 | Cook et al. |
| 5,281,764 | A | 1/1994 | King et al. |
| 5,401,908 | A | 3/1995 | Rodeghero |
| 6,437,248 | B1 | 8/2002 | Giebel |
| 6,498,301 | B1 | 12/2002 | Pieper et al. |
| 7,193,155 | B2 | 3/2007 | McMillan et al. |
| 7,696,437 | B2 | 4/2010 | Clark et al. |
| 9,297,975 | B2 * | 3/2016 | Blazer .................. G02B 6/4479 |
| 9,343,200 | B2 | 5/2016 | Perez-Sanchez et al. |
| 9,424,964 | B1 | 8/2016 | Kithuka et al. |
| 9,435,977 | B2 * | 9/2016 | Blazer .................. G02B 6/4439 |
| 10,121,571 | B1 | 11/2018 | McNutt et al. |
| 10,641,981 | B1 | 5/2020 | Sahoo |
| 2002/0017393 | A1 | 2/2002 | Hanna-Myrick |
| 2006/0048961 | A1 | 3/2006 | Pfeiler et al. |
| 2006/0127014 | A1 | 6/2006 | Ledbetter |
| 2006/0165355 | A1 | 7/2006 | Greenwood |
| 2006/0193594 | A1 * | 8/2006 | Greenwood ......... G02B 6/4472 385/147 |
| 2009/0114418 | A1 | 5/2009 | Smith et al. |
| 2009/0200060 | A1 | 8/2009 | Smith et al. |

(Continued)

OTHER PUBLICATIONS

Office Action for U.S. Appl. No. 16/683,873, dated May 28, 2020.
(Continued)

*Primary Examiner* — Peter Radkowski

(57) ABSTRACT

An optical fiber cable that includes reduced or minimal use of colorant may include a single optical fiber component and a jacket formed around the optical fiber component. The optical fiber component may include at least one optical fiber and a buffer layer formed around the at least one optical fiber. The buffer laying may include one or more first polymeric materials that are not blended or compounded with any colorant, and no colorant may be formed on an outer surface of the buffer layer. Additionally, the jacket may include or more second polymeric materials that are not blended or compounded with any colorant.

20 Claims, 25 Drawing Sheets

(56) References Cited

U.S. PATENT DOCUMENTS

| | | |
|---|---|---|
| 2009/0236120 A1 | 9/2009 | Wiebelhaus et al. |
| 2010/0329615 A1* | 12/2010 | Rhyne .................. G02B 6/441 |
| | | 385/110 |
| 2013/0008684 A1 | 1/2013 | Weitzel et al. |
| 2013/0011108 A1 | 1/2013 | Weimann |
| 2013/0014972 A1 | 1/2013 | Wiebelhaus et al. |
| 2014/0014391 A1* | 1/2014 | Magner .................... H01B 7/18 |
| | | 174/102 R |
| 2014/0238721 A1 | 8/2014 | Wessels, Jr. et al. |
| 2015/0023641 A1* | 1/2015 | Blazer ............. B29D 11/00875 |
| | | 385/114 |
| 2016/0195689 A1* | 7/2016 | Blazer ............. B29D 11/00875 |
| | | 385/100 |
| 2017/0010412 A1* | 1/2017 | Racosky ............... C03C 25/323 |
| 2017/0045706 A1 | 2/2017 | Carberry |
| 2021/0003802 A1 | 1/2021 | Blazer |

OTHER PUBLICATIONS

Office Action for U.S. Appl. No. 16/683,881, dated May 28, 2020.
Office Action for U.S. Appl. No. 16/683,852, dated May 29, 2020.
Office Action for U.S. Appl. No. 16/683,842, dated May 14, 2020.
Office Action for U.S. Appl. No. 16/683,864, dated May 14, 2020.
Office Action dated Mar. 29, 2021 for U.S. Appl. No. 16/855,098.
Office Action dated Jun. 11, 2021 for U.S. Appl. No. 16/855,101.
Office Action dated Jul. 16, 2021 for U.S. Appl. No. 16/855,098.
Office Action dated Nov. 12, 2021 for U.S. Appl. No. 16/855,098.

* cited by examiner

OPTICAL FIBER CABLES SUBSTANTIALLY FREE OF COLORANT

CROSS-REFERENCE TO RELATED APPLICATIONS

The present application is related to U.S. patent application Ser. No. 16/855,098 filed on Apr. 22, 2020 and entitled "Optical Fiber Cables Substantially Free of Colorant"; and U.S. patent application Ser. No. 16/855,101 filed on Apr. 22, 2020 and entitled "Optical Fiber Cables Having Limited Colorant". Each of these applications is incorporated by reference herein in its entirety.

TECHNICAL FIELD

Embodiments of the disclosure relate generally to optical fiber cables and, more particularly, to optical fiber cables that include minimal or reduced amounts of colorant relative to conventional cables.

BACKGROUND

Communication cables are utilized in a wide variety of different applications to transmit a variety of data signals and, in some cases, both data and power signals. Certain communication cables are formed with optical fibers positioned in suitable buffer layers, such as tight buffer layers or loose buffer tubes. Conventionally, one or more buffer layers incorporated into a cable incorporate colorant or, alternatively, colored materials are incorporated into a buffer layer. For example, tight buffer layers or loose buffer tubes are color-coded in order to facilitate identification of optical fibers and/o/r groups of optical fibers. In certain conventional cables, buffer layers are formed from polymeric material that has been blended or otherwise combined with colorant. In other conventional cables, colorant is printed in on a significant portion of the surface of a buffer layer. In yet other conventional cables, colored filling compound or colored yarns are positioned within buffer layers. Proper identification of the optical fibers and/or groups of optical fibers is desirable for proper installation of the cables.

However, the use of color additives in communication cables increases the cost of the cables and enhances the environmental impact of the cable. There have been recent customer demands to reduce or eliminate chemicals and materials within cables that have negative or harmful environmental impact. Minimizing or reducing color additives will therefor result in cables having higher environmental sustainability. Accordingly, there is an opportunity for improved optical fiber cables that reduce or eliminate colorant. There is also an opportunity for improved optical fiber cables that reduce or eliminate colorant while still permitting proper identification of optical fibers and/or groups of optical fibers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures. Additionally, the drawings are provided to illustrate example embodiments described herein and are not intended to limit the scope of the disclosure.

DETAILED DESCRIPTION

Figure 1:
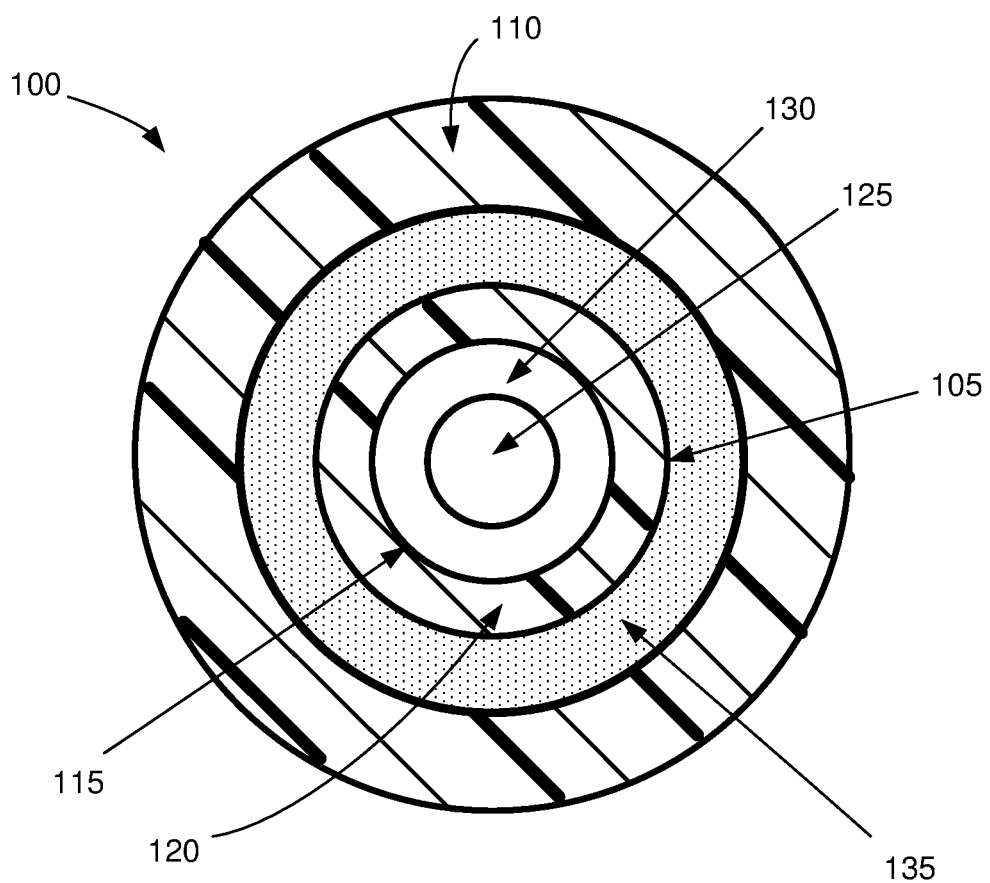
FIGS. 1-7 are cross-sectional views of example cables that may be formed with reduced or minimal colorant, according to illustrative embodiments of the disclosure.

Various embodiments of the present disclosure are directed to optical fiber communication cables that include minimal or reduced amounts of colorant relative to conventional cables. A cable may include one or more optical fibers that are housed within one or more suitable buffer layers. Examples of suitable buffer layers include, but are not limited to, tight buffer layers, loose buffer tubes, and/or other suitable buffer tubes (e.g., microtubes, etc.). The buffer layer(s) may be formed from one or more polymeric materials that are not blended or compounded with any colorants. Additionally, the buffer layers may have no colorant or limited colorant formed on their outer surfaces. As desired, the cable may optionally include one or more water blocking layers, strength layers, and/or other suitable internal cable components. A jacket may be formed around the buffered optical fibers and/or other internal cable components, and the jacket may be formed from one or more polymeric materials that are not blended or compounded with any colorant. In certain embodiments, the cable may also include physical indicia selectively formed on one or more buffer layers and/or other cable components to facilitate identification of the optical fibers and/or groups of optical fibers.

For purposes of this disclosure, the term "colorant" means any substance that is added or applied to a cable component (e.g., a buffer layer, a jacket, etc.) in order to change the color of the cable component or the color on a surface of the cable component. Examples of suitable colorants include, but are not limited to, dyes, pigments, color additives, paints, inks, etc. In conventional cables, a colorant may be blended, compounded, or otherwise mixed with a base material before a cable component is formed. For example, a colorant (e.g., a dye, a color additive, etc.) may be mixed with one or more polymeric materials prior to a buffer layer, a cable jacket, or a layer of a cable component (e.g., a layer of a buffering component, etc.) being extruded or otherwise formed. Other colorants (e.g., paints, inks, etc.) may be formed on a surface of a cable component.

Embodiments of the present disclosure may include cables and/or cable components that are free of colorant or that include limited colorant. A cable component that is "free of colorant" may include materials formed with their natural or virgin color and no colorants are applied to the surface of the cable component. In other words, the materials utilized to form the cable component (e.g., one or more polymeric materials utilized to form buffer layers, insulating layers, etc.) and/or any layers of a multi-layer cable component (e.g., insulation or a buffer layer having a foamed layer surrounded by a skin layer, etc.) are not blended, compounded, or otherwise mixed with any colorants. Additionally, no colorants (e.g., inks, paints, etc.) are applied to or formed on an outer surface of the cable component. In certain embodiments, a buffer layer that is free of colorant may also house one or more components that are free of colorant. For example, strength components (e.g., strength yarns, etc.) and water blocking compounds (e.g., filling compounds, water blocking tapes, etc.) may be formed without the use of any colorant. In certain embodiments, optical fibers incorporated into a buffer layer may be free of colorant. In other embodiments, colorant may be utilized in conjunction with one or more optical fibers. For example, a plurality of optical fibers may be color-coded. Regardless of whether one or more optical fibers include colorant, in certain embodiments, any components other than the optical fiber(s) positioned within a buffer layer may be free of colorant.

A cable component that includes "limited colorant" may be formed from materials having their natural or virgin color. Much like components that are "free of colorant", the materials utilized to form the cable component and/or any layers of a multi-layer cable component are not blended, compounded, or otherwise mixed with any colorants. However, a relatively small or limited amount of colorant may be applied to or formed on an outer surface of the cable component to facilitate identification of cable components, product identification, standards compliance, etc. For example, limited amounts of colorant may be formed on one or more buffer layers or other internal cable components to facilitate identification of the optical fibers and/or groups of optical fibers. As another example, limited amounts of colorant (e.g., a print string, etc.) may be formed on a cable jacket to provide a customer reasonably required identification information for the cable, such as a product name and/or compliance information for one or more applicable cable standards. For purposes of this disclosure, a cable component (e.g., a buffer layer, a cable jacket, etc.) that includes "limited colorant" may have colorant formed or applied to five percent (5.0%) or less of the surface area of an outer surface of the cable component. In this regard, valuable identification information may be provided while limiting an amount of relatively harmful and/or environmentally impactful materials incorporated into the cable. In other embodiments, a cable component that includes "limited colorant" may have colorant formed or applied to three percent (3.0%) or less of the surface area of an outer surface of the cable component. In yet other embodiments, a cable component that includes "limited colorant" may have colorant formed or applied to ten percent (10.0%) or less of the surface area of an outer surface of the cable component. In certain embodiments, a buffer layer that is formed with limited colorant may house one or more components that are free of colorant. For example, strength components (e.g., strength yarns, etc.) and water blocking compounds (e.g., filling compounds, water blocking tapes, etc.) incorporated into a buffer layer may be formed without the use of any colorant. In certain embodiments, optical fibers incorporated into a buffer layer may be free of colorant. In other embodiments, colorant may be utilized in conjunction with one or more optical fibers. For example, a plurality of optical fibers may be color-coded. Regardless of whether one or more optical fibers include colorant, in certain embodiments, any components other than the optical fiber(s) positioned within a buffer layer may be free of colorant.

For purposes of this disclosure, the term "physical indicia" means any suitable surface variations or other suitable identifiers utilized to visually and/or tactilely identify or distinguish between a plurality of buffered components, optical fibers and/or groups of optical fibers incorporated into a cable. According to an aspect of the disclosure, the physical indicia may be formed or incorporated into a cable without the use of colorant or with only limited colorant. Additionally, the physical indicia allow optical fibers and/or groups of optical fibers to be identified without the conventional use of colored buffer layers (i.e., buffer layers formed from polymeric material that is compounded with a colorant or coated with a colorant) or buffer layers that are filled with colored filling compound or colored yarns. As a result, cables may be formed that have reduced colorant or that include approximately zero colorant. These cables may have reduced environmental impact and potentially lower cost relative to conventional cables while still permitting proper identification of optical fibers and/or groups of optical fibers.

In certain embodiments, physical indicia may be provided in order to facilitate identification of each of a plurality of buffer layers (and optical fibers or groups of optical fibers housed by the buffer layers) in a cable. In certain embodiments, separate physical indicia corresponding to each of a plurality of buffer layers may be provided. In other embodiments, physical indicia for a subset of the plurality of buffer layers may be provided so long as identification of the remaining buffer layers (i.e., the buffer layers that do not have associated physical indicia) can be determined or derived. As an example, with a cable having a plurality of buffer layers formed in a ring around a central strength member or central component, physical indicia may be provided for at least two of the buffer layers. Identification of two buffer layers will permit a technician or installer to identify the remaining buffer layers based on their positions relative to the two buffer layers having associated physical indicia. For example, the installer may identify two buffer layers within the ring, as well as a direction in which to travel around the ring to identify the remaining buffer layers. As another example, with a cable having a plurality of buffer layers formed in a ring around a central strength member, physical indicia that identifies a buffer layer and a direction (e.g., an arrow, etc.) may be formed on the buffer layer of a single optical fiber component, and the physical indicia may permit a technician to identify all of the optical fiber components.

A wide variety of suitable types of physical indicia may be incorporated into a cable. These physical indicia may be formed on a wide variety of suitable cable components, such as any suitable buffer layers. Examples of suitable physical indicia that may be incorporated into a cable component include, but are not limited to: (i) surface variations formed on an outer surface of the cable component, such as raised portions (e.g., bumps, ridges, raised alphanumeric characters, raised symbols, embossing, etc.), indentions or indented portions (e.g., divots, grooves, indented alphanumeric characters, indented symbols, impressions, etc.), and/or texturing; and/or (ii) indicia that include limited colorant formed on an outer surface of a cable component. In the event that physical indicia includes the use of limited colorant, the physical indicia may be formed from either a single colorant or from a plurality of different colorants. Additionally, physical indicia may be formed or positioned on any suitable components or combination of components within a cable. In various embodiments, physical indicia may be formed on one or more buffer layers. In certain embodiments, physical indicia may be formed on two or more buffer layers. Non-limiting examples of various physical indicia are discussed in greater detail below in conjunction with example cable components on which the physical indicia may be formed.

A wide variety of suitable methods or techniques may be utilized to form physical indicia as desired in various embodiments. In certain embodiments, physical indicia may be formed via extrusion when a cable component (e.g., a buffer layer, etc.) is formed. In other embodiments, physical indicia may be formed by modifying a surface of a cable component. For example, a surface of a cable component may be impressed or otherwise manipulated to form one or more physical indicia. In yet other embodiments, physical indicia may be formed by applying limited amounts of one or more colorants to a cable component via any suitable techniques, such as printing, spraying, etc.

In certain embodiments, an optical fiber cable may include a single optical fiber component. The optical fiber component may include at least one optical fiber and a buffer layer formed around the at least one optical fiber. For example, the optical fiber cable may be formed as a simplex cable with a single optical fiber positioned within a tight buffer layer or buffer tube. As another example, the optical fiber cable may be formed with a single buffer tube that houses one or more optical fibers. The buffer layer incorporated into the optical fiber component may be free of colorant. In other words, the buffer layer may include or be formed from first polymeric materials that are not blended or compounded with any colorant, and no colorant may be formed on an outer surface of the buffer layer. As desired, one or more physical indicia may be selectively formed on buffer layer. A jacket may then be formed around the single optical fiber component, and the jacket may be formed from one or more polymeric materials that are not blended or compounded with any colorant. For example, the jacket may be formed without colorant or may be formed with limited colorant.

In other embodiments, an optical fiber cable may include a plurality of optical fiber components. Each optical fiber component may respectively include at least one optical fiber and a buffer layer surrounding the at least one optical fiber. For example, the optical fiber cable may include a plurality of tight buffered optical fibers. As another example, the optical fiber cable may include a plurality of buffer tubes, such as loose buffer tubes or microtubes. Additionally, the buffer layers for the plurality of optical fibers may be free of colorant. In other words, the buffer layers may include or be formed from first polymeric materials that are not blended or compounded with any colorant, and no colorant may be formed on an outer surface of the buffer layer. Physical indicia may be selectively formed on the buffer layers of at least one or at least two of the plurality of optical fiber components. The physical indicia may be free of colorant, and the physical indicia may facilitate identification of the plurality of optical fiber components. A jacket may then be formed around the plurality of optical fiber components, and the jacket may be formed from one or more second polymeric materials that are not blended or compounded with any colorant. For example, the jacket may be formed without colorant or may be formed with limited colorant.

In yet other embodiments, an optical fiber cable may include a plurality of optical fiber components. Each optical fiber component may respectively include at least one optical fiber and a buffer layer surrounding the at least one optical fiber. For example, the optical fiber cable may include a plurality of tight buffered optical fibers. As another example, the optical fiber cable may include a plurality of buffer tubes, such as loose buffer tubes or microtubes. Additionally, the buffer layers for the plurality of optical fibers may be formed from one or more first polymeric materials that are not blended or compounded with any colorant. Physical indicia may be selectively formed on the buffer layers of at least one or at least two of the plurality of optical fiber components such that the buffer layers containing physical indicia include limited colorant. In other words, the physical indicia may be formed on an outer surface of at least two buffer layers, and the physical indicia may include colorant that occupies less than five percent (5.0%) of the surface area of the respective buffer layers on which it is formed. The physical indicia may facilitate identification of the plurality of optical fiber components. A jacket may then be formed around the plurality of optical fiber components, and the jacket may be formed from one or more second polymeric materials that are not blended or compounded with any colorant. For example, the jacket smay be formed without colorant or may be formed with limited colorant.

Embodiments of the disclosure now will be described more fully hereinafter with reference to the accompanying drawings, in which certain embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIGS. 1-7 are cross-sectional views of example cables 100, 200, 300, 400, 500, 600, 700 that may be formed with reduced or minimal colorant, according to illustrative embodiments of the disclosure. The illustrated example cables 100, 200, 300, 400, 500, 600, 700 have different combinations of internal components. For example, various optical fiber cables may include different numbers of optical fibers, different numbers of buffer layers, different types of buffer layers (e.g., tight buffers, loose tubes, etc.), various water blocking components, different types of strength layers, etc. A wide variety of other suitable cable constructions having other combinations of internal components may be formed in addition to the illustrated example cables. Further, in various embodiments, any number of internal cable components may include physical indicia that facilitate identification of optical fiber components within a cable while allowing colorant in the cable to be eliminated, reduced, or minimized.

Further, the example cables 100, 200, 300, 400, 500, 600, 700 are illustrated as optical fiber cables. However, other types of cables may be formed having reduced colorant and optional physical indicia to facilitate identification of cable components and/or transmission media. These cables may include any suitable transmission media including but not limited to, one or more optical fibers, one or more coaxial cables, one or more twisted pairs of individually insulated conductors, one or more power conductors, one or more electrical conductors, etc. Additionally, in certain embodiments, a cable may be formed as a hybrid cable that includes a plurality of different types of transmission media. For example, a cable may include a combination of optical fibers and other transmission media (e.g., power conductors, twisted pairs, etc.). Additionally, cables formed in accordance with the present disclosure may be utilized in a wide variety of suitable operating environments. For example, embodiments of the disclosure may be utilized in association with outdoor cables, premise cables, indoor/outdoor cables, horizontal cables, vertical cables, plenum cables, riser cables, all dielectric self-supporting ("ADSS") cables, or any other appropriate types of cables.

Turning now to FIG. 1, a cross-section of a first example optical fiber cable 100 that may be formed with reduced or minimal colorant is illustrated. The cable 100 may include a single optical fiber component 105, and an outer jacket 110 may be formed around the optical fiber component 105. The optical fiber component 105 of the cable 100 may include a single tight buffered optical fiber. In other words, the cable 100 may be formed as a simplex cable that includes a single optical fiber 115 that is surrounded or encapsulated by a buffer layer 120. As desired in various embodiments, the cable 100 may additionally include one or more strength elements, water blocking layers, and/or any other suitable internal components.

The optical fiber 115 incorporated into the optical fiber component 105 may have a wide variety of suitable constructions. In certain embodiments, the optical fiber 115 may include a core 125 and a cladding 130. As desired, one or more protective coatings or protective layers may be formed on the cladding 130. The buffer layer 120 may then be formed on the protective coating(s) or, in embodiments with no protective coating(s), directly on the cladding 130. As desired, the combination of the core 125 and the cladding 130 may be referred to as an optical fiber or an optical wave guide. In other embodiments, the combination of the core 125, cladding 130, and the protective coatings may be referred to as an optical fiber or an optical wave guide.

As illustrated in FIG. 1, in certain embodiments, the optical fiber 115 may include a single core 125. In other embodiments, the optical fiber 115 may include multiple cores. Each core (such as illustrated core 125) may be configured to propagate light at one or more desirable wavelengths (e.g., 1310 nm, 1550 nm, etc.) and/or at any desired transmission rate or data rate. The cladding 130 may have a lower index of refraction than that of the core 125, to facilitate propagation of one or more signals through the core 125. The core 125 and the cladding 130 may include any suitable compositions and may be formed from a wide variety of suitable materials, such as glass, glassy substance(s), one or more silica materials, one or more plastic materials, or a suitable combination of materials.

A wide variety of different types of optical fibers may be utilized as desired in various embodiments. For example, an optical fiber may be a single mode fiber, multi-mode fiber, bend insensitive fiber, or some other suitable optical waveguide that carries data. The optical fiber 115 may also have any suitable cross-sectional diameter or thickness. For example, a single mode fiber may have a core diameter between approximately 8 micrometers and approximately 10.5 micrometers with a cladding diameter of approximately 125 micrometers. As another example, a multi-mode fiber may have a core diameter of approximately 50 micrometers or 62.5 micrometers with a cladding diameter of 125 micrometers. Other sizes of fibers may be utilized as desired.

In certain embodiments, one or more protective coatings may be formed on or around the cladding 130. The protective coating(s) may protect the optical fiber 115 from physical, mechanical, and/or environmental damage. For example, the protective coating(s) may protect against mechanical stresses, scratches, and/or moisture damage. In the event that multiple protective coatings are utilized, the coatings may be applied in concentric layers. In certain embodiments, a dual-layer protective coating approach may be utilized. An inner primary coating may be formed around the cladding 130, and an outer secondary coating may be formed around the inner coating. The outer secondary coating may be harder than the inner primary coating. In this regard, the inner primary coating may function as a shock absorber to minimize attenuation caused by microbending, and the outer secondary coating may protect against mechanical damage and act as a barrier to lateral forces. Other configurations of protective coating(s) may be utilized as desired in various embodiments. Additionally, the protective coating(s) may be formed from a wide variety of suitable materials and/or combinations of materials. A few example materials include, but are not limited to acrylates, acrylate resins, ultraviolet ("UV")-cured materials, urethane acrylate composite materials, etc.

In certain embodiments, the optical fiber 115 may be formed without the use of any colorant. In other words, no colorant is applied to an outer surface of the optical fiber 115 or any of its layers (e.g., the cladding, the protective coating(s), etc.). Additionally, as desired, no colorant is blended, mixed, or compounded into the materials utilized to form the optical fiber 115 or any of its layers. In other embodiments, colorant may be incorporated into one or more layers or components of the optical fiber 115.

With continued reference to FIG. 1, a buffer layer 120 may be formed around the optical fiber 115 and, if present, the protective coating(s) and/or any intermediate layers (e.g., release layers, etc.). In certain embodiments, the buffer layer 120 may be formed in intimate contact with an underlying layer along a longitudinal length of the optical fiber 115. In other words, the buffer layer 120 may encapsulate the underlying optical fiber 115 at any given cross-section of the optical fiber 115 taken along a longitudinal direction. The formation of a buffer layer 120 in intimate contact with an underlying layer (i.e., approximately no spacing between the buffer layer 120 and an underlying layer at the time of formation, etc.) may be referred to as a tight buffered configuration. Thus, the combination of the optical fiber 115 and the buffer layer 120 may be referred to as a tight buffered optical fiber.

In certain embodiments, the buffer layer 120 may be formed directly on an outer layer of the optical fiber 115. In other embodiments, one or more intermediate layers may be positioned between the buffer layer 120 and the optical fiber 115. For example, a suitable release layer may be positioned between the optical fiber 115 and the buffer layer 120 in order to facilitate easier stripping of the buffer layer 120 from the optical fiber. In other embodiments, one or more substances or materials (e.g., water blocking powder, water blocking gel, etc.) may be applied to an outer surface of the optical fiber 115 prior to formation of the buffer layer 120.

A wide variety of suitable materials and/or combinations of materials may be utilized to form the buffer layer 120. For example, the buffer layer 120 may be formed from one or more suitable polymeric materials and/or thermoplastic materials. Examples of suitable materials include, but are not limited to polypropylene ("PP"), polyvinyl chloride ("PVC"), a low smoke zero halogen ("LSZH") material, polyethylene ("PE"), nylon, polybutylene terephthalate ("PBT"), polyvinylidene fluoride ("PVDF"), fluorinated ethylene propylene ("FEP"), etc. In various embodiments, a polymeric material may include a single material component or a mixture of various components. Additionally, in certain embodiments, the buffer layer 120 may be formed as a single layer. In other embodiments, the buffer layer 120 may include a plurality of layers, such as a plurality of co-extruded or successively extruded layers. In the event that a plurality of layers are utilized, in certain embodiments, each layer may be formed from the same or from similar materials. In other embodiments, at least two layers may be formed from different materials. In certain embodiments, one or more polymeric and/or thermoplastic material(s) may form a base material of the buffer layer 120, and one or more additives may be combined, mixed, or blended with the base material. For example, one or more slip agents or release agents may be optionally combined with the base material. The slip agents may facilitate relatively easier stripping of the buffer layer 120 from the underlying optical fiber. As desired, a slip agent and/or other additives may be combined with a base material with any suitable mix rates or blend rates.

In certain embodiments, the buffer layer 120 may be formed such that it is free of colorant. In other words, no colorant is blended or combined with the material(s) utilized to form the buffer layer 120. Additionally, no colorant is formed on an outer surface of the buffer layer 120. Additionally, in certain embodiments, any components housed by the buffer layer 120 may be free of colorant. For example, the optical fiber 115 and any other components (e.g., strength layers, a release layer, water blocking material, etc.) housed within the buffer layer 120 may be free of colorant. In other embodiments, colorant or limited colorant may be utilized in conjunction with the optical fiber 115 while any other components housed within the buffer layer 120 are free of colorant.

A wide variety of suitable methods and/or techniques may be utilized as desired to form the buffer layer 120 on the optical fiber 115. In certain embodiments, a buffer layer 120 may be extruded onto the optical fiber 115 (and/or around any intermediate layers or other components) via one or more suitable extrusion devices, such as one or more suitable extrusion heads. In one example embodiment, either prior to or during the formation of a cable 100, an optical fiber 115 may be fed from a suitable source (e.g., a bin, a reel, a box, etc.), and the optical fiber 115 may be fed in relatively close proximity to one or more extrusion devices. The extrusion devices may extrude tight buffer material onto the optical fiber 115 and, as desired, the optical fiber 115 may be passed through one or more dies in order to control an outer diameter of the extruded buffer layer 120.

In certain embodiments, an inner diameter of the buffer layer 120 may be approximately equal to an outer diameter of the optical fiber 115 and/or any intermediate layers. In other words, the buffer layer 120 may be formed in intimate contact with the underlying optical fiber 115 or intermediate layer. The buffer layer 120 may also be formed with any suitable outer diameter. For example, in certain embodiments, the buffer layer 120 may be extruded or otherwise formed to have an outer diameter of approximately 900 microns or micrometers. In other embodiments, the buffer layer 120 may be formed to have an outer diameter of approximately 400, 500, 600, 700, 800, or 900 microns, an outer diameter included in a range between any two of the above values, or an outer diameter included in a range bounded on a maximum end by one of the above values. Other suitable outer diameters may be utilized as desired for the buffer layer 120. Further, the buffer layer 120 may be formed with a wide variety of suitable thicknesses (i.e., a difference between an inner and outer diameter) as desired in various embodiments. In certain example embodiments, the buffer layer 120 may have a thickness between approximately 50 microns and approximately 875 microns.

In certain embodiments, physical indicia may be selectively formed on the outer surface of the buffer layer 120. As explained in greater detail below with reference to FIGS. 8A-11E, the physical indicia may be utilized to provide identification information for the optical fiber 115 and/or the cable 100. Additionally, a wide variety of suitable physical indicia may be utilized as desired in various embodiments of the disclosure. For example, any of the physical indicia described with reference to FIG. 2 and/or FIGS. 8A-9D that are free of colorant may be selectively formed on the outer surface of the buffer layer 120. In other embodiments, no physical indicia may be formed on the buffer layer 120.

With continued reference to FIG. 1, a jacket 110 may be formed around the optical fiber component 105. The jacket 110 may enclose the internal components of the cable 100, seal the cable 100 from the environment, and provide strength and structural support. The jacket 110 may include any number of layers (e.g., a single layer, multiple layers, etc.) and may be formed from a wide variety of suitable materials, such as one or more polymeric materials, polyvinyl chloride ("PVC"), polyurethane, a fluoropolymer, polyethylene, neoprene, chlorosulphonated polyethylene, polypropylene, modified ethylene-chlorotrifluoroethylene, ethylene-vinyl acetate ("EVA"), fluorinated ethylene propylene ("FEP"), ultraviolet resistant PVC, flame retardant PVC, low temperature oil resistant PVC, polyolefin, flame retardant polyurethane, flexible PVC, low smoke zero halogen ("LSZH") material, plastic, rubber, acrylic, or some other appropriate material known in the art, or a combination of suitable materials. In certain embodiments, the jacket 110 can include flame retardant and/or smoke suppressant materials. Additionally, the jacket 110 may include a wide variety of suitable shapes and/or dimensions. For example, as shown in FIG. 1, the jacket 110 may be formed to result in a round cable or a cable having an approximately circular cross-section. In other embodiments, the jacket 110 may be formed to result in other desired shapes, such as an elliptical shape (e.g., a cable having an approximately oval cross-section) or a rectangular shape. The jacket 110 may also have a wide variety of dimensions, such as any suitable or desirable outer diameter and/or any suitable or desirable wall thickness. In various embodiments, the jacket 110 can be characterized as an outer jacket, an outer sheath, a casing, a circumferential cover, or a shell.

The jacket 110 may enclose one or more openings in which other components of the cable 110 are disposed. At least one opening enclosed by the jacket 110 may be referred to as a cable core, and the optical fiber component 105 may be disposed in the cable core. In certain embodiments, the jacket 110 may be extruded or otherwise formed around the optical fiber component 105 and any other internal components of the cable 100. Additionally, in certain embodiments, the jacket 110 may be formed without any colorant being blended, compounded, or otherwise mixed with the one or more polymeric materials utilized to form the jacket 110. In other words, one or more polymeric materials may be extruded or otherwise formed around internal cable components with their natural color. In certain embodiments, the jacket 110 may be "free of colorant" with no colorant formed on an outer surface of the jacket 110. In other embodiments, the jacket 110 may be formed with "limited colorant" on its outer surface. For example, limited colorant may be utilized to form a print string on an outer surface of the jacket 110 that includes product identifiers, identifiers indicating compliance with applicable standards, and/or other required information.

A wide variety of suitable components may be positioned between the optical fiber component 105 and the jacket 110 as desired in various embodiments. For example, one or more strength members and/or water blocking materials may be positioned within a cable core. Any number of suitable strength members may be incorporated into the cable 100 as desired. In certain embodiments, strength yarns (e.g., aramid yarns, basalt fiber, etc.) may be positioned around, wrapped around, or stranded around the optical fiber component 105. For example, a strength layer formed from a plurality of strength yarns may be stranded or wrapped around the optical fiber component 105. In other embodiments, one or more strength rods may be positioned within the cable core or embedded within the jacket 110. For example, two strength rods may be embedded in the jacket 110 on opposite sides of the cable core. Strength rods may be formed from a wide variety of suitable materials including, but not limited to, metal wires (e.g., steel wire, etc.), metal rods, plastic rods, fiber-reinforced plastic ("FRP") rods, glass-reinforced plastic ("GRP") rods, fiberglass, or any other suitable material or combination of materials. As desired, strength rods may include one or more suitable coating layers, such as any of the suitable coating layers discussed in greater detail below with reference to FIG. 3. Strength members (e.g., strength rods, strength yarns, etc.) may also be formed with a wide variety of suitable dimensions. Other suitable cable designs may incorporate one or more strength members at a wide variety of different positions.

As desired in various embodiments, water swellable material may be incorporated into the cable 100. For example, water blocking gels, water blocking fibers, water blocking tapes, and/or water blocking yarns may be incorporated into the cable 100. As shown in FIG. 1, in certain embodiments, a water blocking tape 135 or other suitable water blocking layer may be positioned within the cable core between the optical fiber component 105 and the outer jacket 110. In certain embodiments, the cable 100 may be formed as a dry cable. The term "dry," as used herein generally indicates that the cable does not contain any fluids, greases, or gels for blocking water incursion. As a result, it may be easier for a technician to install the cable as the technician will not be required to wipe off a grease or gel when the internal contents of the fiber subunit are accessed. In other embodiments, a water blocking gel or other fluid may be incorporated into the cable.

Figure 2:
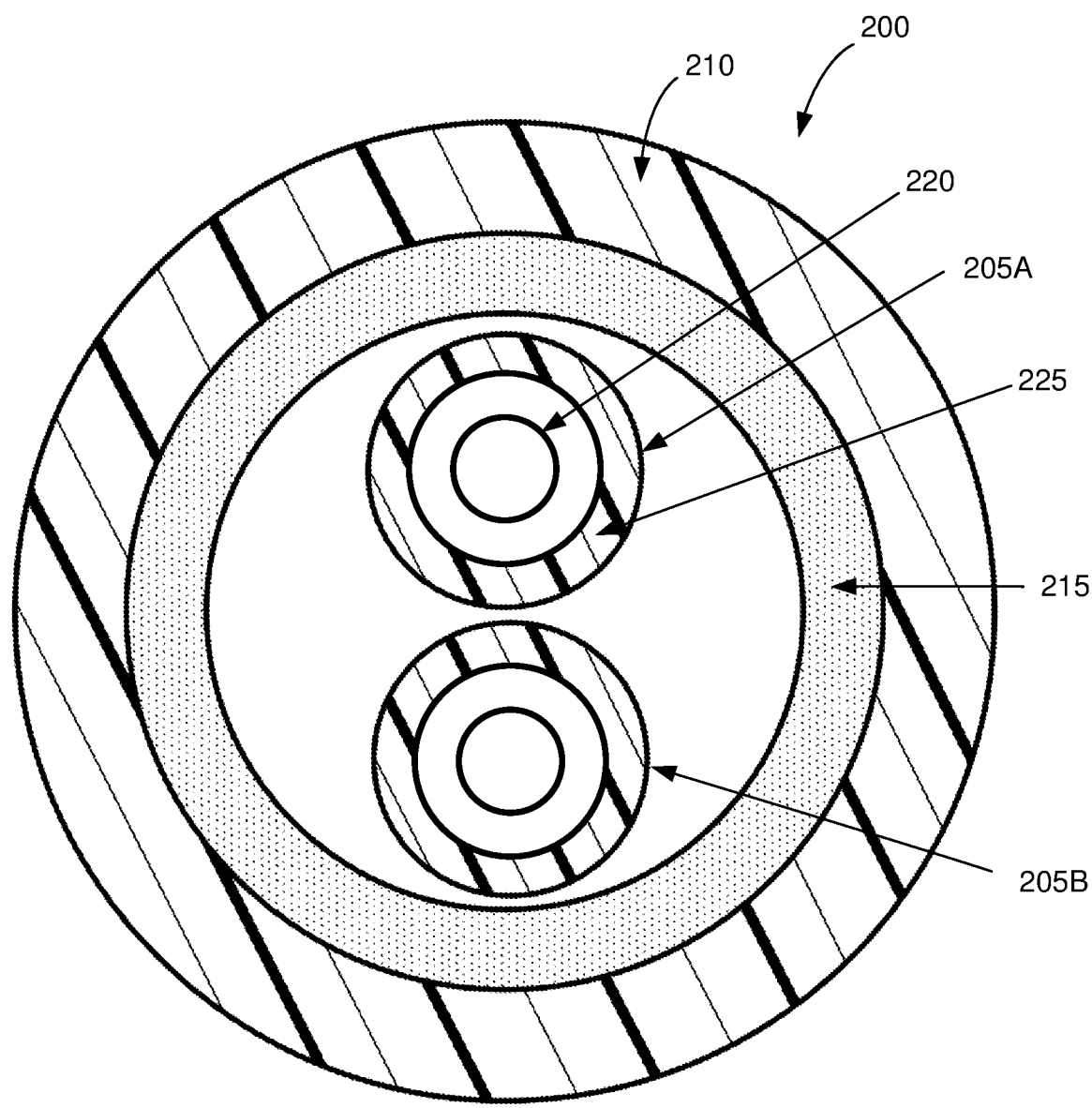

FIG. 2 illustrates a cross-section of a second example cable 200 that may be formed with reduced or minimal colorant. Similar to the cable 100 of FIG. 1, the cable 200 of FIG. 2 may include tight buffered optical fiber components positioned within a jacket. However, instead of including a single optical fiber component as shown in FIG. 1, the cable 200 of FIG. 2 may include a plurality of optical fiber components 205A, 205B positioned within a cable core defined by an outer jacket 210. Additionally, any suitable number of strength materials (e.g., strength yarns, strength rods, strength layers, etc.), water blocking materials (e.g., a water blocking tape 215, etc.), and/or other materials may be incorporated into the cable 200. Each of these components may be similar to those described above with reference to FIG. 1.

Figure 3:
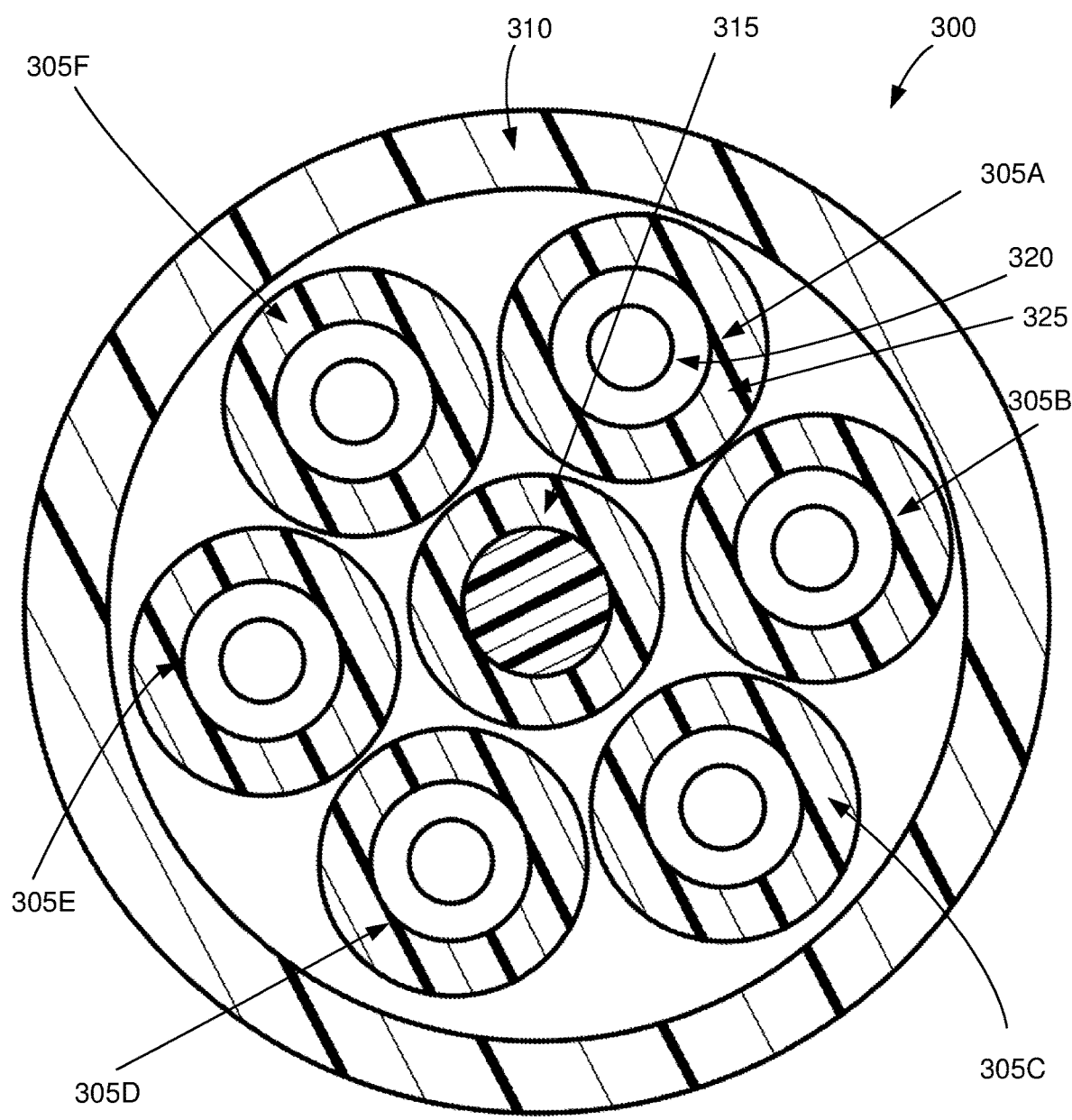
Figure 4:
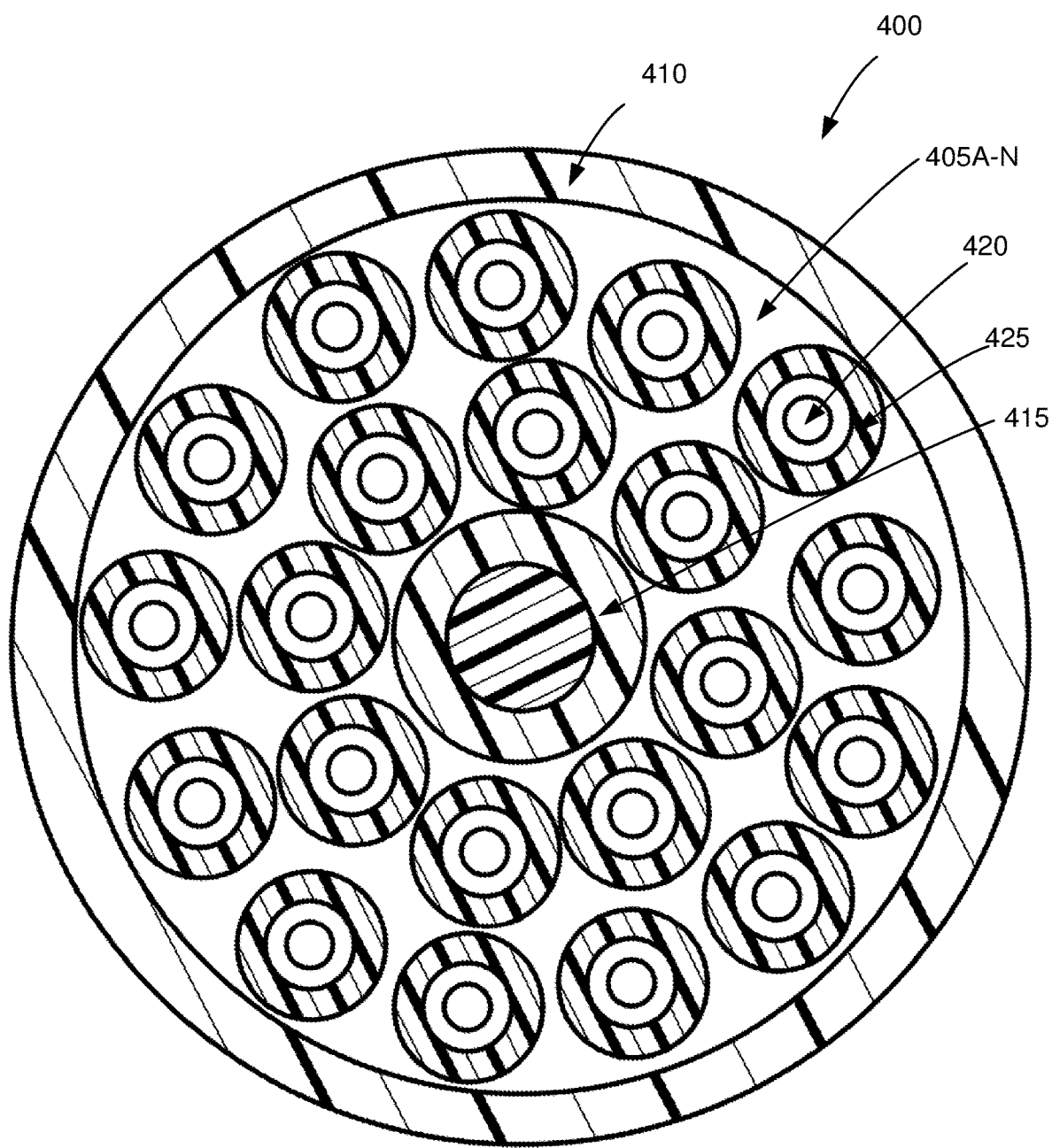

Any number of optical fiber components may be incorporated into the cable 200 as desired in various embodiments. In certain embodiments, as shown in FIG. 2, two optical fiber components 205A, 205B may be incorporated into the cable 200. In other words, the cable 200 may be formed as a duplex cable. In other embodiments, a wide variety of other suitable numbers of optical fiber components 205A. 205B may be incorporated. For example, a cable 200 may be formed with 2, 4, 6, 10, 12, 24, 48, or any other suitable number of tight buffered optical fibers or other suitable optical fiber components. FIG. 3 illustrates an example cable 300 having six tight buffered optical fiber components positioned around a central strength member. FIG. 4 illustrates an example cable 400 having multiple rings of tight buffered optical fiber components positioned around a central strength member. A wide variety of other suitable designs may include other suitable numbers of optical fiber components.

Similar to the optical fiber component 105 of FIG. 1, each optical fiber component 205A, 205B of the cable 200 (generally referred to as optical fiber component 205) may include an optical fiber 220 that is surrounded or encapsulated by a suitable buffer layer 225. The optical fibers and the buffer layers may be similar to those described above with reference to FIG. 1. As desired and discussed above with reference to FIG. 1, any suitable protective coatings, intermediate layers, and/or other materials may be incorporated into a tight buffered optical fiber component 205. A wide variety of suitable optical fibers may be incorporated into an optical fiber component 205. Additionally, a buffer layer 225 may be formed from a wide variety of suitable materials and/or with a wide variety of suitable dimensions. In certain embodiments, the respective buffer layers for each of the optical fiber components 205A, 205B may be formed from similar polymeric materials and/or with similar dimensions (e.g., inner diameter, outer diameter, thickness, etc.). In other embodiments, the respective buffer layers of the two components 205A, 205B may be formed from different materials (e.g., different polymeric materials, etc.) and/or with different dimensions. Further, in certain embodiments, the respective buffer layers of the optical fiber components 205A, 205B may be "free of colorant". In other words, the buffer layers may be formed from one or more polymeric materials that are extruded or otherwise formed around optical fibers with their natural color. No colorant is blended or compounded into the polymeric materials, and no colorant is formed on or applied to the outer surfaces of the buffer layers. In certain embodiments, certain components (e.g., the optical fibers, release layers, strength layers, etc.) housed within the buffer layers may also be free of colorant. In other embodiments, one or both of the buffer layers may incorporate "limited colorant" on its outer surface.

As desired, physical indicia may be selectively formed on the outer surface of the buffer layers of one or both of optical fiber components 205A, 205B. The physical indicia may facilitate identification of the optical fiber components 205A, 205B and/or the optical fibers contained therein. Physical indicia may be selectively formed at a wide variety of suitable locations along an outer periphery of a buffer layer (generally referred to as buffer layer 225). In certain embodiments, physical indicia may be formed on an entire outer surface of a buffer layer 225. For example, a buffer layer 225 may be textured on its entire outer surface. In other embodiments, physical indicia may be formed on a portion of an outer surface of a buffer layer 225. In certain embodiments, physical indicia may be continuous along a longitudinal length of a buffer layer 225. For example, a portion of a buffer layer 225 may be textured continuously along a longitudinal length. As another example, one or more longitudinally continuous ridges or grooves may be formed on an outer surface of a buffer layer 225. As yet another example, lines or other physical indicia formed with limited colorant may be longitudinally continuous.

In other embodiments, physical indicia may be formed at longitudinally spaced locations along a longitudinal length of a buffer layer 225. For example, longitudinally spaced sections of an outer surface of a buffer layer 225 may be textured. As another example longitudinally spaced surface variations (e.g., indentions, raised portions, etc.) may be formed at longitudinally spaced locations with gaps between the spaced portions or sections. As another example, alphanumeric characters, symbols, portion of lines, or other indicia formed from limited colorant may be formed at longitudinally spaced locations along a longitudinal length of a buffer layer 225. Indeed, a wide variety of suitable configurations of physical indicia formed at a plurality of spaced locations may be utilized.

In the event that physical indicia are formed at longitudinally spaced locations, a wide variety of suitable gaps or spacings in the longitudinal direction may be positioned between adjacent physical indicia. Examples of suitable gaps include, but are not limited to, approximately 0.01, 0.02, 0.03, 0.04, 0.05, 0.06, 0.07, 0.08, 0.09, 0.1, 0.2, 0.25, 0.3, 0.4, 0.5, 0.6, 0.7, 0.75, 0.8, 0.9, or 1.0 meters, a gap included in a range between any two of the above values, or a gap included in a range bounded on either a minimum or maximum end by one of the above values. In certain embodiments, the gaps or spacings may be selected to facilitate a technician being able to visually and/or tactilely identify the buffer layers during cable installation without having to strip an undesirable amount of the cable. In certain embodiments, the gaps or spacings between longitudinally spaced physical indicia may have similar lengths or be arranged in accordance with a pattern. In other embodiments, the gaps or spacings may be arranged in a random or pseudo-random manner.

Additionally, the individual physical indicia or sections of physical indicia (e.g., alphanumeric characters, symbols, dots, series of surface variations, sections of ridges or lines, etc.) that are longitudinally spaced from one another may each be formed with any suitable longitudinal length. For example, physical indicia may have longitudinal lengths of approximately, 0.01, 0.02, 0.03, 0.04, 0.05, 0.06, 0.07, 0.08, 0.09, 0.1, 0.2, 0.25, 0.3, 0.4, 0.5, 0.6, 0.7, 0.75, 0.8, 0.9, 1.0, or 2.0 meters, a length included in a range between any two of the above values, or a length included in a range bounded on either a minimum or maximum end by one of the above values. In certain embodiments, a plurality of physical indicia selectively formed on a buffer layer 225 may have similar longitudinal lengths, such as longitudinal lengths arranged in accordance with a pattern. In other embodiments, at least two physical indicia formed on a buffer layer 225 may have different longitudinal lengths. As desired, longitudinal lengths may be arranged in a random or pseudo-random manner.

Physical indicia can occupy any suitable percentage of the surface area of a buffer layer's outer surface. As set forth above, certain physical indicia may occupy an entire outer surface of buffer layer 225. Other physical indicia may occupy less than the entire outer surface. For example, physical indicia may occupy approximately 1.0, 2.0, 3.0, 4.0, 5.0, 10, 15, 20, 25, 30, 40, 50, 60, 70, 75, 80, or 90 percent of the surface area of a buffer layer's 225 outer surface, a percentage of an outer surface included in a range between any two of the above values, or a percentage of an outer surface included in a range bounded on either a minimum or maximum end by one of the above values. According to an aspect of the disclosure, physical indicia formed with limited colorant may occupy approximately five percent (5.0%) or less (or other suitable percentage) of the surface area of a buffer layer's 225 outer surface.

As desired in various embodiments, a wide variety of suitable physical indicia may be incorporated into a buffer layer 225. Examples of suitable physical indicia that may be formed on a buffer layer 225 include, but are not limited to: (i) surface variations formed on an outer surface of the buffer layer 225, such as raised portions (e.g., bumps, ridges, raised alphanumeric characters, raised symbols, etc.), indentions or indented portions (e.g., divots, grooves, indented alphanumeric characters, indented symbols, etc.), and/or texturing; and/or (ii) indicia that include limited colorant formed on an outer surface of the buffer layer 225. In the event that physical indicia includes the use of limited colorant, the physical indicia may be formed from either a single colorant or from a plurality of different colorants. A few non-limiting examples of physical indicia that may be formed on a tight buffer layer 225 are described in greater detail below. In particular, FIGS. 8A-9D provide a few examples of tight buffer layers having physical indicia formed from surface variations. FIGS. 10A-11E provide a few examples of tight buffer layers having physical indicia formed from limited colorant. Similarly, FIGS. 12A-15E provide a few examples of loose buffer tubes having different types of physical indicia. The physical indicia illustrated in FIGS. 12A-15E correspond to those illustrated in FIGS. 8A-11E. A wide variety of other suitable physical indicia and/or combinations of physical indicia may be formed as desired in other embodiments. For example, physical indicia may include a combination of surface variations and limited colorant.

In yet other embodiments, physical indicia may be selectively formed on internal components of the cable 200 other than one or more buffer layers. For example, physical indicia may be formed on separators, strength layers, internal jackets, and/or other suitable components positioned within a core of the cable 200. In yet other embodiments, physical indicia may be selectively formed on a combination of one or more buffer layers and one or more other internal components of the cable 200. Indeed, physical indicia may be formed on a wide variety of cable components and/or combinations of components.

With continued reference to FIG. 2, any number of strength layers, water blocking layers, and/or other suitable components may be incorporated into the cable 200. For example, one or more strength members (e.g., strength yarns, strength rods, etc.) similar to those described above with reference to FIG. 1 may be incorporated into the cable 200. As another example, water swellable and/or water blocking material may be incorporated into the cable 200. For example, water blocking gels, water blocking fibers, water blocking tapes, and/or water blocking yarns may be incorporated into the cable 200. As shown in FIG. 2, in certain embodiments, a water blocking tape 215 or other suitable water blocking layer may be positioned within the cable core between the optical fiber components 205A, 205B and the outer jacket 210. In various embodiments, the cable 200 may be formed as a dry cable or as a wet cable.

FIG. 3 illustrates a cross-section of a third example cable 300 that may be formed with reduced or minimal colorant. Similar to the cable 200 of FIG. 2, the cable 300 of FIG. 3 may include a plurality of tight buffered optical fiber components 305A-F positioned within a jacket 310. As shown in FIG. 3, in certain embodiments, the plurality of optical fiber components 305A-F may be stranded around or otherwise positioned around a central strength member ("CSM") 315. Additionally, any suitable number of other strength materials (e.g., strength yarns, strength rods, strength layers, etc.), water blocking materials (e.g., a water blocking tape, etc.), and/or other materials may be incorporated into the cable 300. The tight buffered optical fiber components 305A-F and any optional strength materials and/or water blocking materials may be similar to the components described above with reference to FIGS. 1 and 2.

Any number of optical fiber components may be incorporated into the cable 300 as desired in various embodiments. As shown in FIG. 3, six optical fiber components 305A-F may be stranded or otherwise positioned around a CSM 315. In the illustrated six around one design, the optical fiber components 305A-F and the CSM 315 may have similar or approximately equal diameters, thereby allowing the cable 300 to be formed with a round or approximately circular cross-sectional shape. In other embodiments, a CSM 315 may be formed with a larger size than one or more of the optical fiber components 305A-F. For example, more than six optical fiber components may be positioned around a larger CSM 315 in order to form a cable having a round cross-sectional shape. Indeed, a wide variety of suitable designs may include any desired number of optical fiber components and/or other internal cable components.

Similar to the optical fiber component 105 of FIG. 1, each optical fiber component 305A-F of the cable 300 (generally referred to as optical fiber component 305) may include an optical fiber 320 that is surrounded or encapsulated by a suitable buffer layer 325. The optical fibers and the buffer layers may be similar to those described above with reference to FIG. 1. As desired and discussed above with reference to FIG. 1, any suitable protective coatings, intermediate layers, and/or other materials may be incorporated into a tight buffered optical fiber component 305. A wide variety of suitable optical fibers may be incorporated into an optical fiber component 305. Additionally, a buffer layer 325 may be formed from a wide variety of suitable materials and/or with a wide variety of suitable dimensions. In certain embodiments, the respective buffer layers for each of the optical fiber components 305A-F may be formed from similar polymeric materials and/or with similar dimensions (e.g., inner diameter, outer diameter, thickness, etc.). In other embodiments, the respective buffer layers of at least two of the components 305A-F may be formed from different materials (e.g., different polymeric materials, etc.) and/or with different dimensions. Further, in certain embodiments, the respective buffer layers of the optical fiber components 305A-F may be "free of colorant". In other words, the buffer layers 305A-F may be formed from one or more polymeric materials that are extruded or otherwise formed around optical fibers with their natural color. No colorant is blended or compounded into the polymeric materials, and no colorant is formed on or applied to the outer surfaces of the buffer layers. In certain embodiments, certain components (e.g., the optical fibers, release layers, strength layers, etc.) housed within the buffer layers may also be free of colorant. In other embodiments, one or more of the buffer layers may incorporate "limited colorant" on their respective outer surfaces.

As desired, physical indicia may be selectively formed on the outer surface of the buffer layers of one or more of the optical fiber components 305A-F. The physical indicia may facilitate identification of the optical fiber components 305A-F and/or the optical fibers contained therein. A wide variety of suitable physical indicia may be formed on the respective buffer layers of one or more of the optical fiber components, such as any of the physical indicia described above with reference to FIG. 2. Additionally, as described in greater detail above with reference to FIG. 2, physical indicia may be selectively formed at a wide variety of suitable locations along an outer periphery of a buffer layer.

In the illustrated example cable 300 having six optical fiber components 305A-F, physical indicia may be formed on one, two, three, four, five, or six of the optical fiber components 305A-F for identification purposes. In certain embodiments, if at least two of the optical fiber components 305A-E are identified, a technician or installer may be able to determine the identities of the remaining optical fiber components 305A-F. For example, the technician or installer may be able to identify the two components that include physical indicia, as well as a direction in which to travel around the ring of optical fiber components 305A-F. As a result, the technician or installer may be able to identify all of the optical fiber components 305A-F. In other embodiments, a single optical fiber component may include physical indicia that both identifies the optical fiber component and a direction in which to travel around the ring of optical fiber components 305A-F. For example, the physical indicia may include a symbol (e.g., an arrow, a triangle, etc.) or one or more alphanumeric characters that can be utilized to determine an appropriate direction. As a result, the technician or installer may be able to identify all of the optical fiber components 305A-F. In the event that a cable 300 includes more or less than six optical fiber components, physical indicia may be formed on any suitable number of the optical fiber components for identification purposes. The physical indicia may facilitate, at a minimum, identification of one or two optical fiber components and identification of the arrangement of the optical fiber components (e.g., identification of a direction in which a ring of optical fiber components is arranged, etc.) such that the identities of the remaining optical fiber components may be determined.

With continued reference to FIG. 3, the plurality of optical fiber components 305A-F may be stranded or positioned around a central strength member ("CSM") 315. The CSM 315 may be formed with a wide variety of suitable constructions as desired. In certain embodiments, the CSM 315 may be formed as a strength rod, such as a metal rod, a plastic rod, a fiber-reinforced plastic ("FRP") rod, a glass-reinforced plastic ("GRP") rod, a fiberglass rod, or any other suitable rod. In other embodiments, the CSM 315 may be formed from a plurality of wires or strength elements that are twisted, stranded, or bunched together. In yet other embodiments, the CSM 315 may be formed from a plurality of conductive elements or transmission elements, such as a plurality of twisted pairs of individually insulated conductors, a plurality of coaxial conductors, or a plurality of power conductors. In yet other embodiments, the CSM 315 may be formed from a plurality of different types of components or with a plurality of layers formed from different types of components. For example, a CSM 315 may include a relatively rigid surrounded by a plurality of strength yarns or other strength elements. As another example, a CSM 315 may include a plurality of transmission elements that are surrounded by strength yarns or other strength elements.

In certain embodiments, one or more suitable coating layers may be formed on a CSM 315. For example, a polymeric or other coating may be extruded onto or otherwise formed around the CSM 315. Examples of suitable materials that may be utilized to form a coating include, but are not limited to, polyethylene (e.g., medium density polyethylene, etc.), polypropylene, one or more other polymeric materials (e.g., such as any of the materials described above with reference to the jacket 110 of FIG. 1, etc.), one or more thermoplastic materials, one or more elastomeric materials, an ethylene-acrylic acid ("EAA") copolymer, ethyl vinyl acetate ("EVA"), etc. A CSM 315 may also be formed with a wide variety of suitable dimensions, such as any suitable diameter or cross-sectional area. As shown in FIG. 3, in certain embodiments, a CSM 315 may have a size that is similar to or approximately equal to that of the optical fiber components 305A-F. In other embodiments, a CSM 315 may be larger than the optical fiber components 305A-F positioned around the CSM 315. A wide variety of other CSM 315 constructions may incorporate other materials and/or components as desired.

As desired in various embodiments, any number of additional strength layers, water blocking layers, and/or other suitable components may be incorporated into the cable 300. For example, one or more strength members (e.g., strength yarns, strength rods, etc.) similar to those described above with reference to FIG. 1 may be incorporated into the cable 300. As another example, water swellable and/or water blocking material may be incorporated into the cable 300. For example, water blocking gels, water blocking fibers, water blocking tapes, and/or water blocking yarns may be incorporated into the cable 300. As desired, the cable 300 may be formed as a dry cable or a wet cable.

FIG. 4 illustrates a cross-section of a fourth example cable 400 that may be formed with reduced or minimal colorant. Similar to the cable 300 of FIG. 3, the cable 400 of FIG. 4 may include a plurality of tight buffered optical fiber components 405A-N positioned within a jacket 410 and stranded or otherwise positioned around a CSM 415. Additionally, any suitable number of other strength materials (e.g., strength yarns, strength rods, strength layers, etc.), water blocking materials (e.g., a water blocking tape, etc.), and/or other materials may be incorporated into the cable 400. The various components of the cable 400 may be similar to those described above with reference to FIGS. 1-3.

Any number of optical fiber components may be incorporated into the cable 400 as desired in various embodiments. As shown in FIG. 4, multiple rings or layers of optical fiber components 405A-N may be stranded or otherwise positioned around a CSM 415. Each ring or layer may include any suitable number of optical fiber components. Additionally, any suitable number of rings or layers may be incorporated into the cable 400. Additionally, the CSM 415 may be sized appropriately to accommodate a desired number of rings of optical fiber components while permitting the cable 400 to have a desired cross-sectional shape, such as a round or circular cross-sectional shape.

Similar to the optical fiber component 105 of FIG. 1, each optical fiber component 405A-N of the cable 400 (generally referred to as optical fiber component 405) may include an optical fiber 420 that is surrounded or encapsulated by a suitable buffer layer 425. The optical fibers and the buffer layers may be similar to those described above with reference to FIG. 1. As desired and discussed above with reference to FIG. 1, any suitable protective coatings, intermediate layers, and/or other materials may be incorporated into a tight buffered optical fiber component 405. A wide variety of suitable optical fibers may be incorporated into an optical fiber component 405. Additionally, a buffer layer 425 may be formed from a wide variety of suitable materials and/or with a wide variety of suitable dimensions. In certain embodiments, the respective buffer layers for each of the optical fiber components 405A-N may be formed from similar polymeric materials and/or with similar dimensions (e.g., inner diameter, outer diameter, thickness, etc.). In other embodiments, the respective buffer layers of at least two of the components 405A-N may be formed from different materials (e.g., different polymeric materials, etc.) and/or with different dimensions. Further, in certain embodiments, the respective buffer layers of the optical fiber components 405A-N may be "free of colorant". In other words, the buffer layers 405A-N may be formed from one or more polymeric materials that are extruded or otherwise formed around optical fibers with their natural color. No colorant is blended or compounded into the polymeric materials, and no colorant is formed on or applied to the outer surfaces of the buffer layers. In certain embodiments, certain components (e.g., the optical fibers, release layers, strength layers, etc.) housed within the buffer layers may also be free of colorant. In other embodiments, one or more of the buffer layers 405A-N may incorporate "limited colorant" on their respective outer surfaces.

As desired, physical indicia may be selectively formed on the outer surface of the buffer layers of one, two or more of the optical fiber components 405A-N. The physical indicia may facilitate identification of the optical fiber components 405A-N and/or the optical fibers contained therein. A wide variety of suitable physical indicia may be formed on the respective buffer layers of one or more of the optical fiber components, such as any of the physical indicia described above with reference to FIG. 2. Additionally, as described in greater detail above with reference to FIG. 2, physical indicia may be selectively formed at a wide variety of suitable locations along an outer periphery of a buffer layer.

In the illustrated cable 400 containing two rings of optical fibers, suitable physical indicia may be provided to allow a technician or installer to identify all of the optical fiber components 405A-N. For example, for a given ring, physical indicia may be provided on the buffer layers at least two of the optical fiber components, thereby permitting a technician or installer to identify those optical fiber components and a direction in which to travel around the ring. As another example, for a given ring, physical indicia that both identifies both the optical fiber component and a direction in which to travel around the ring (e.g., an arrow, a triangle, alphanumeric characters that can be used to determine a direction, etc.) may be provided. In other embodiments, physical indicia may be provided for more than one or two optical fiber components within a ring. For example, respective physical indicia may be formed on the buffer layers of all of the optical fiber components 405A-N. Indeed, physical indicia may be formed on any suitable number of the optical fiber components for identification purposes. The physical indicia may facilitate, at a minimum, identification of one or two optical fiber components and identification of the arrangement of the optical fiber components (e.g., identification of a direction in which a ring of optical fiber components is arranged, etc.) such that the identities of the remaining optical fiber components may be determined.

As desired in various embodiments, any number of additional strength layers, water blocking layers, and/or other suitable components may be incorporated into the cable 400. For example, one or more strength members (e.g., strength yarns, strength rods, etc.) similar to those described above with reference to FIG. 1 may be incorporated into the cable 400. As another example, water swellable and/or water blocking material may be incorporated into the cable 400. For example, water blocking gels, water blocking fibers, water blocking tapes, and/or water blocking yarns may be incorporated into the cable 400. As desired, the cable 400 may be formed as a dry cable or a wet cable.

Figure 5:
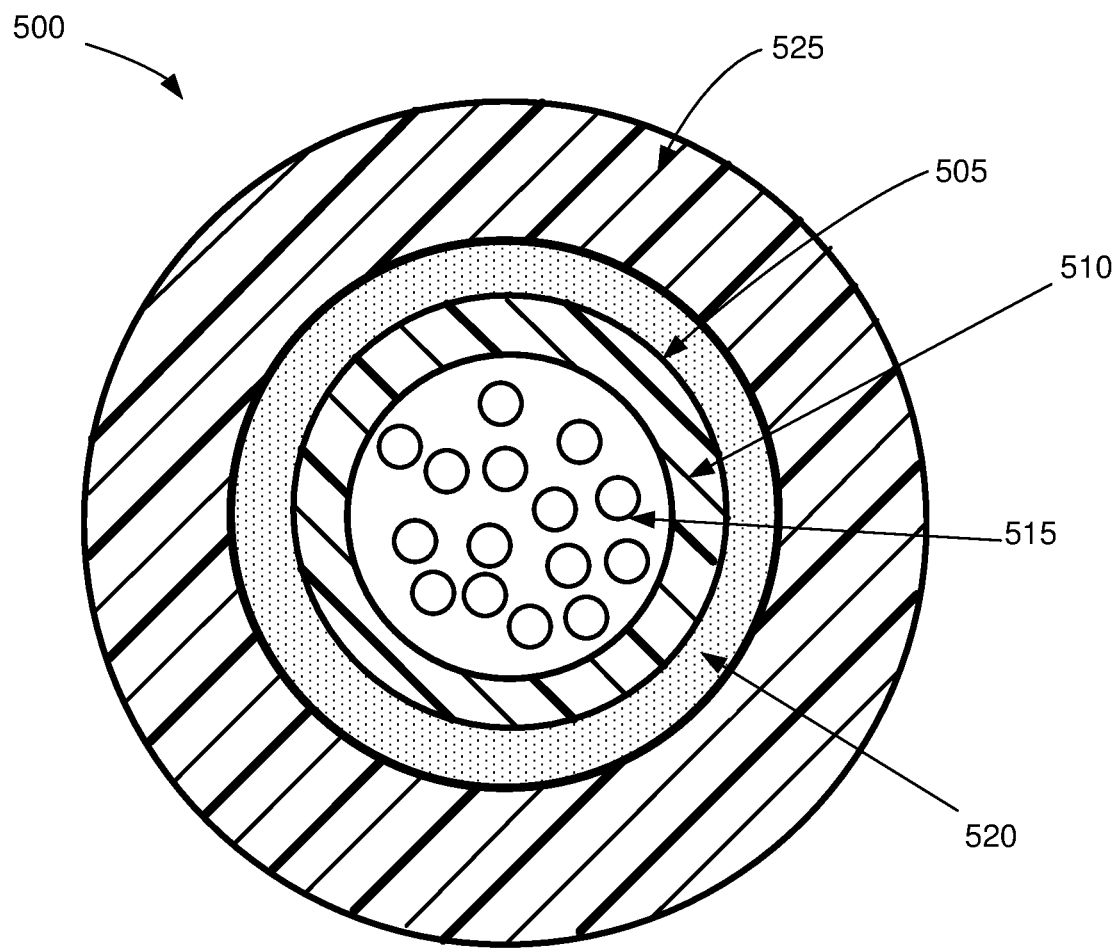
Figure 6:
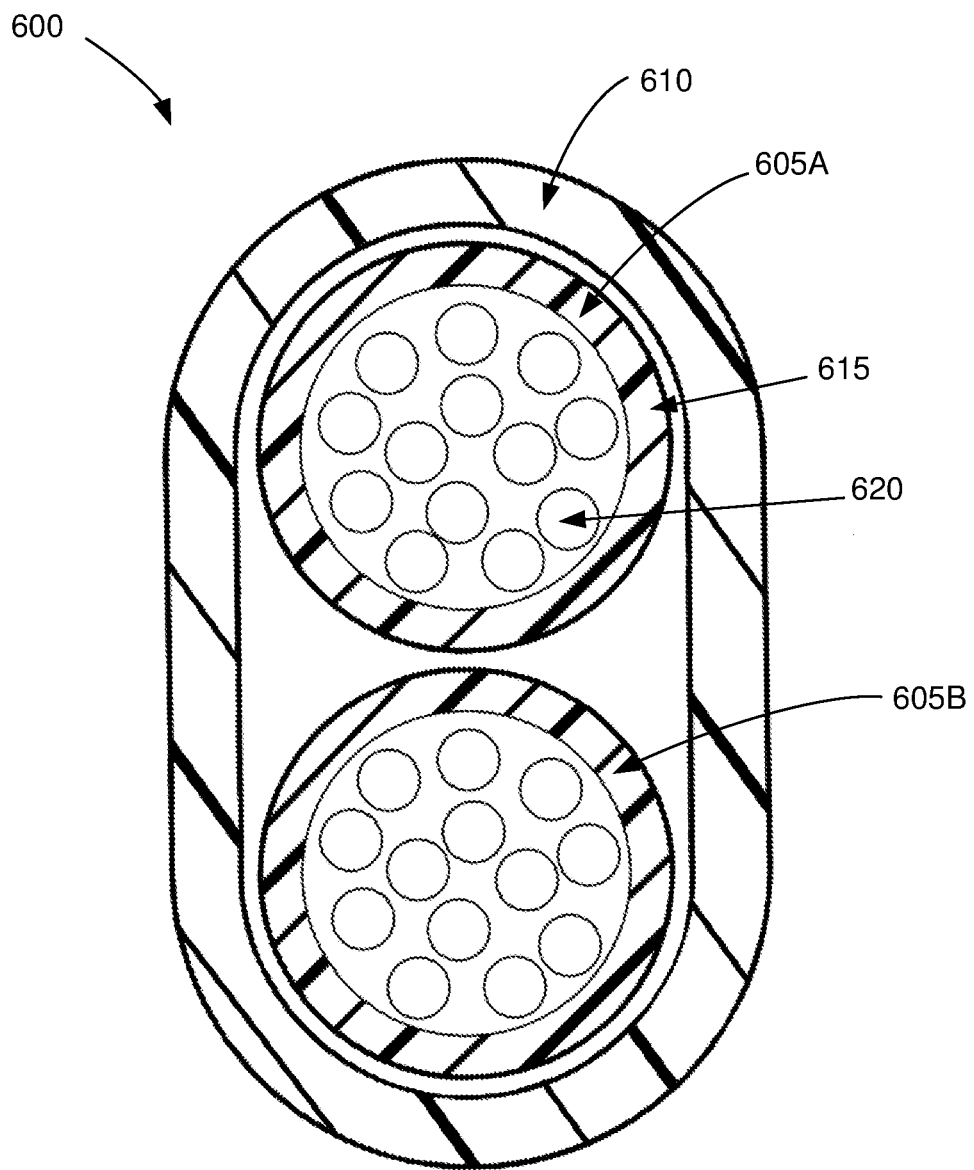
Figure 7:
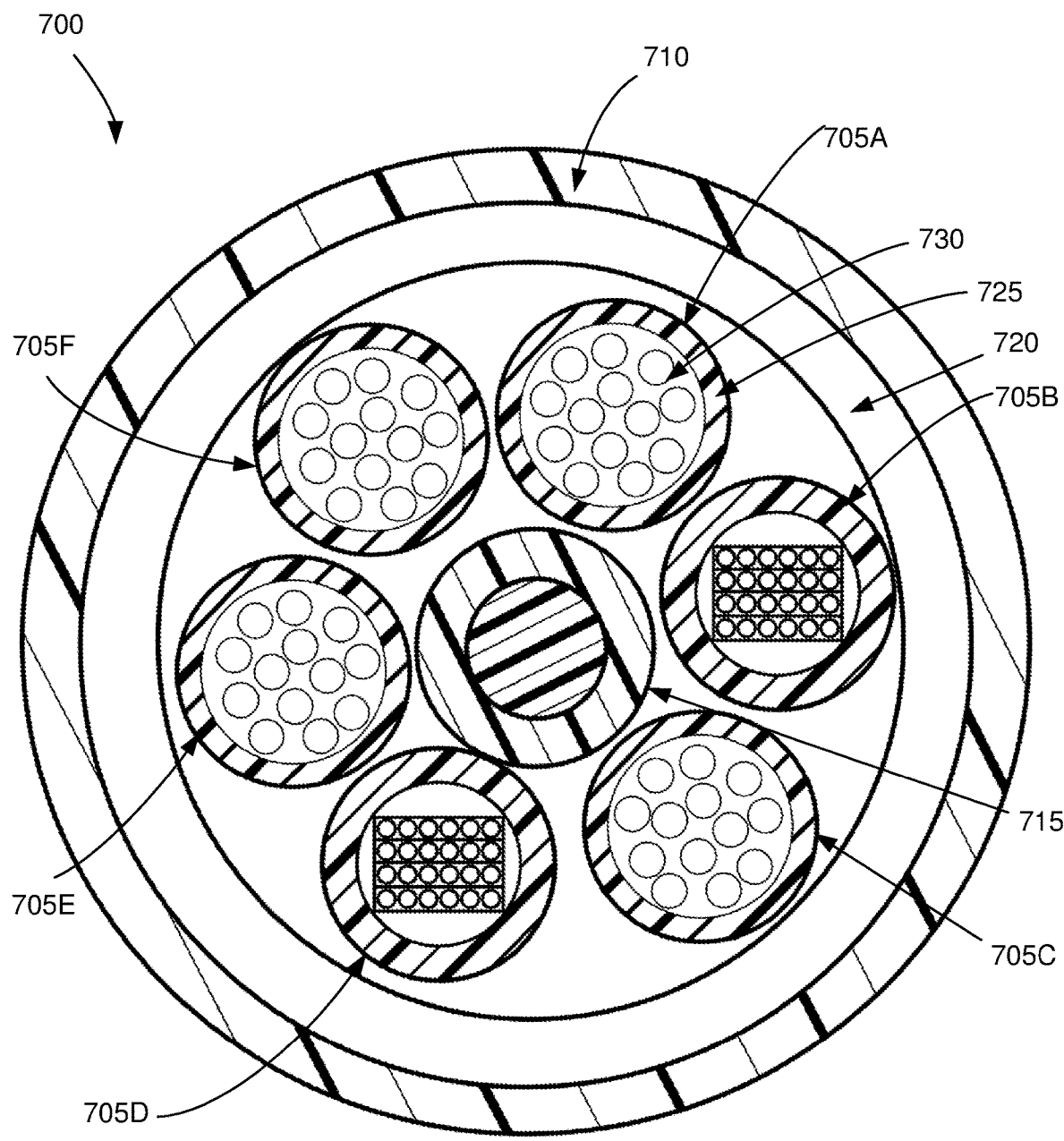

FIGS. 1-4 illustrate example cable constructions that include tight buffered optical fibers. In other embodiments, cables may include optical fibers that are positioned in one or more buffer tubes, such as loose buffer tubes or microtubes. FIGS. 5-7 illustrate a few non-limiting examples of cables that include fibers housed or positioned within buffer tubes. As desired, the buffer tubes may be formed to be free of colorant or to include limited colorant. Additionally, physical indicia may be selectively formed on one or more buffer tubes as desired in various embodiments.

Turning now to FIG. 5, a cross-sectional view of a fifth example optical fiber cable 500 is illustrated. The illustrated cable 500 may include a single optical fiber component 505 that includes a buffer tube 510 and any suitable number of optical fibers 515 disposed within the buffer tube 510. In certain embodiments, a water blocking layer 520 and/or a strength layer may be formed around the buffer tube 510. An outer jacket 525 may then be formed around the internal components of the cable 500. As desired, other cable designs, such as the cables illustrated in FIGS. 6 and 7, may include a plurality of optical fiber components that each include one or more buffer tubes, as well as any number of other cable components.

The buffer tube 510 may be situated within a cable core defined by the outer jacket 525, and the buffer tube 510 may be configured to contain or house one or more optical fibers, such as the illustrated optical fibers 515. Additionally, the buffer tube 510 may be formed from a wide variety of suitable materials and/or combinations of materials, such as various polymeric materials, nucleated polymeric materials, etc. Examples of suitable materials that may be utilized to form a buffer tube 505 include, but are not limited to polypropylene ("PP"), polyvinyl chloride ("PVC"), a low smoke zero halogen ("LSZH") material, polyethylene ("PE"), nylon, polybutylene terephthalate ("PBT"), polyvinylidene fluoride ("PVDF"), fluorinated ethylene propylene ("FEP"), etc. Additionally, in certain embodiments, the buffer tube 510 may be formed as a single layer. In other embodiments, the buffer tube 510 may include a plurality of layers, such as a plurality of co-extruded or successively extruded layers. In the event that a plurality of layers are utilized, in certain embodiments, each layer may be formed from the same or from similar materials. In other embodiments, at least two layers may be formed from different materials. In certain embodiments, one or more polymeric and/or thermoplastic material(s) may form a base material of the buffer tube 510, and one or more additives or fillers may be combined, mixed, or blended with the base material. For example, one or more flame retardant materials, smoke suppressants, and/or other additives may be combined with a base polymeric material. Further, the buffer tube 510 may have any suitable inner diameter, outer diameter, and/or thickness as desired in various applications.

In certain embodiments, the buffer tube 510 may be formed around the optical fiber(s) 515 as a loose buffer tube. A loose buffer tube 510 typically houses a plurality of optical fibers 515 and may protect the optical fibers 515 in relatively harsh environments, such as outdoor environments. In certain embodiments, a plurality of fibers 515 may be free to move or shift within the loose buffer tube. A loose buffer tube typically house between 6 and 244 optical fibers, although other suitable numbers of fibers may be utilized. As desired, a wide variety of other components may be incorporated into a loose buffer tube, such as one or more strength yarns, other strength materials, water blocking tapes, water blocking yarns, elastomeric coupling components, etc. Additionally, in certain embodiments, a loose buffer tube may be formed as a dry cable component that does not include any gels, greases, or other filling compounds. In other embodiments, a loose buffer tube may be filled with a suitable filling compound that provides water blocking and/or other protection to the optical fibers 515.

As an alternative, the buffer tube 510 may be formed as a microtube. A microtube may house any desired number of optical fibers 515, such as two, three, four, eight, twelve, or some other number of optical fibers. Additionally, a microtube may have a single layer or multi-layer construction, and the microtube may be formed from any suitable material or combination of materials. A microtube may also be formed with an inner diameter that is sized to allow the optical fibers 515 to move relative to one another while preventing the optical fibers 515 from crossing over or overlapping one another. In other words, the microtube may permit the optical fibers 515 to flex or move as the cable 500 is flexed or bent while simultaneously maintaining the position of each optical fiber relative to the other optical fibers. In certain embodiments, an inner diameter of the microtube may be determined based at least in part on the number of optical fibers to be positioned within the microtube and/or the outer diameters of the optical fibers. As a result of using one or more microtubes, it may be possible to reduce or minimize the diameter of a cable 500 relative to cables that incorporate loose buffer tubes.

In certain embodiments, the buffer tube 510 may be formed such that it is free of colorant. In other words, no colorant is blended or combined with the material(s) utilized to form the buffer tube 510. Additionally, no colorant is formed on an outer surface of the buffer tube 510. Additionally, in certain embodiments, any components housed by the buffer tube 505 may be free of colorant. For example, the optical fibers 515 and any other components (e.g., strength yarns, water blocking materials, filling compound, etc.) housed within the buffer tube 510 may be free of colorant. In other embodiments, colorant or limited colorant may be utilized in conjunction with the optical fibers 515 while any other components housed within the buffer tube 510 are free of colorant.

A wide variety of suitable methods and/or techniques may be utilized as desired to form a buffer tube 510. In certain embodiments, a buffer tube 510 may be extruded via one or more suitable extrusion devices, such as one or more suitable extrusion heads. In certain embodiments, the buffer tube 510 may be extruded around the optical fibers 515. In other embodiments, the buffer tube 510 may be formed, and the optical fibers 515 may subsequently be air-blown or otherwise positioned within the buffer tube 510.

In certain embodiments, physical indicia may be selectively formed on the outer surface of the buffer tube 510. As explained in greater detail below with reference to FIGS. 12A-15E, the physical indicia may be utilized to provide identification information for the optical fiber(s) 515 and/or the cable 500. Additionally, a wide variety of suitable physical indicia may be utilized as desired in various embodiments of the disclosure. For example, any of the physical indicia described with reference to FIG. 2 and/or FIGS. 12A-13D that are free of colorant may be selectively formed on the outer surface of the buffer tube 510. In other embodiments, no physical indicia may be formed on the buffer tube 510.

Any number of optical fibers 515, other transmission elements, and/or other components may be positioned within the buffer tube 510. Each optical fiber positioned within the buffer tube 510 may be similar to the example optical fiber 115 described above with reference to FIG. 1. Additionally, a wide variety of suitable types of optical fibers may be positioned within the buffer tube 510. In certain embodiments, optical fibers 515 may be loosely positioned in the buffer tube 510, wrapped or bundled together, provided in one or more ribbons, or incorporated into a ribbon stack. FIG. 5 illustrates loose optical fibers 515 positioned in the buffer tube 510. FIG. 7 illustrates some example buffer tubes that include optical fibers incorporated into one or more ribbons, and the ribbons may optionally be combined into one or more ribbon stacks. In other embodiments, optical fibers 515 may be arranged in one or more ribbons that each include intermittent, spaced, or spiderweb-type bonding that permits the ribbons to be bundled, rolled, and/or otherwise formed into a desired arrangement.

In certain embodiments, a plurality of optical fibers 515 positioned in the buffer tube 510 may be color-coded to facilitate identification of individual optical fibers; however, the buffer tube 510 and other components positioned within the buffer tube 510 may be free of colorant. In the event that the optical fibers 515 are color-coded, in certain embodiments, an entire outer surface (e.g., an outer surface of the cladding or outer protective layer, etc.) of each optical fiber may include colorant. In other embodiments, the optical fibers 515 may be color-coded utilizing limited colorant. In other words, identifying markings may occupy a relatively small percentage of the surface area of each optical fiber, such as less than five percent (5%) of the surface area. For example, longitudinally spaced bands, lines, or other markings may be formed from colorant on an outer surface of one or more optical fibers. In yet other embodiments, different optical fibers may include identifying markings that occupy different portion of the surface areas of the optical fibers. For example, a first portion of the optical fibers 515 may include colorant formed on less than 5% of their respective surface areas while a second portion of the optical fibers may include colorant formed on more than 5% of their respective surface areas. In yet other embodiments, a first portion of the optical fibers 515 may include colorant (e.g., limited colorant, colorant that occupies more than 5% of an outer surface, etc.) while a second portion of the optical fibers 115 are free of colorant.

In other embodiments, a plurality of optical fibers 515 positioned in the buffer tube 510 may be free of colorant. In yet other embodiments, a plurality of optical fibers 515 positioned in the buffer tube 510 may include only limited colorant. As desired, a wide variety of suitable methods and/or techniques may be utilized to identify the plurality of optical fibers 515. In certain embodiments, physical indicia (e.g., ridges or other surface variations, etc.) may be formed on the surface of one or more optical fibers. Suitable physical indicia may include, but are not limited to, any of the physical indicia described herein with respect to buffer layers. In other embodiments, identifying tags may be attached to one or more of optical fibers 515, and the identifying tags may include suitable physical indicia that facilitate identification of the optical fibers 515. For example, a respective series of longitudinally spaced tags may be attached to one or more of the optical fibers 515, and physical indicia (e.g., surface variations, physical indicia formed with limited colorant, etc.) may be formed on the tags. In other embodiments, optical fibers 515 may be incorporated into one or more ribbons or into a ribbon stack, and physical indicia may be formed on the ribbons or the ribbon stack. For example, physical indicia (e.g., surface variations, physical indicia formed with limited colorant, etc.) may be formed at one end of a fiber ribbon. The physical indicia may identify a first fiber in the ribbon as well as a direction or other orientation of the remaining optical fibers in the ribbon, thereby permitting a technician to identify each of the optical fibers in the ribbon. In yet other embodiments, optical fibers 515 may be incorporated into one or more intermittently bonded or spider-web type ribbons, and physical indicia (e.g., surface variations, physical indicia formed with limited colorant, etc.) may be formed on the intermittent bonding elements of the ribbons in order to identify individual optical fibers. A wide variety of other suitable techniques may be utilized as desired to identify the individual optical fibers without incorporating colorant onto the optical fibers themselves.

With continued reference to FIG. 5, the outer jacket 525 may enclose the internal components of the cable 500, seal the cable 500 from the environment, and provide strength and structural support. The outer jacket 525 may be similar to the jacket 110 described above with reference to FIG. 1. As such, the jacket 525 may include any number of layers and may be formed from a wide variety of suitable materials. The jacket 525 may also be formed with a wide variety of suitable dimensions (e.g., inner diameter, outer diameter, thickness, cross-sectional shape, etc.). Additionally, in certain embodiments, the jacket 525 may be formed without any colorant being blended, compounded, or otherwise mixed with the one or more polymeric materials utilized to form the jacket 525. In other words, one or more polymeric materials may be extruded or otherwise formed around internal cable components with their natural color. In certain embodiments, the jacket 525 may be "free of colorant" with no colorant formed on an outer surface of the jacket 525. In other embodiments, the jacket 525 may be formed with "limited colorant" on its outer surface. For example, limited colorant may be utilized to form a print string on an outer surface of the jacket 525 that includes product identifiers, identifiers indicating compliance with applicable standards, and/or other required information.

A wide variety of suitable components may be positioned between the optical fiber component 505 and the jacket 515 as desired in various embodiments. For example, one or more strength members and/or water blocking materials may be positioned within a cable core. Any number of suitable strength members may be incorporated into the cable 500 as desired. In certain embodiments, strength yarns (e.g., aramid yarns, basalt fiber, etc.) may be positioned around, wrapped around, or stranded around the optical fiber component 505. For example, a strength layer formed from a plurality of strength yarns may be stranded or wrapped around the optical fiber component 505. In other embodiments, one or more strength rods may be positioned within the cable core or embedded within the jacket 525. These strength members, strength rods, and/or other strength elements may be similar to those discussed above with reference to FIG. 1. A wide variety of suitable water swellable material may be incorporated into the cable 500 as desired. For example, water blocking gels, water blocking fibers, water blocking tapes, and/or water blocking yarns may be incorporated into the cable 500. As shown in FIG. 5, in certain embodiments, a water blocking tape 520 or other suitable water blocking layer may be positioned within the cable core between the optical fiber component 505 and the outer jacket 520. In certain embodiments, the cable 500 may be formed as a dry cable. In other embodiments, a water blocking gel or other fluid may be incorporated into the cable.

FIG. 6 illustrates a cross-section of a sixth example cable 600 that may be formed with reduced or minimal colorant. Similar to the cable 500 of FIG. 5, the cable 600 of FIG. 6 may include an optical fiber component positioned within a jacket. However, instead of including a single optical fiber component as shown in FIG. 5, the cable 600 of FIG. 6 may include a plurality of optical fiber components 605A, 605B positioned within a cable core defined by an outer jacket 610. Additionally, any suitable number of strength materials (e.g., strength yarns, strength rods, strength layers, etc.), water blocking materials (e.g., a water blocking tape, etc.), and/or other materials may be incorporated into the cable 600. Each of these components may be similar to those described above with reference to FIG. 5.

Any number of optical fiber components may be incorporated into the cable 600 as desired in various embodiments. In certain embodiments, as shown in FIG. 6, two optical fiber components 605A, 605B may be incorporated into the cable 600. In other embodiments, a wide variety of other suitable numbers of optical fiber components may be incorporated. For example, FIG. 7 illustrates an example cable 700 having six optical fiber components positioned around a CSM. In other embodiments, a cable may include having multiple rings of optical fiber components positioned around a CSM. A wide variety of other suitable designs may include other suitable numbers of optical fiber components.

Similar to the optical fiber component 505 of FIG. 5, each optical fiber component 605A, 605B of the cable 600 (generally referred to as optical fiber component 605) may include a buffer tube 615 that houses one or more optical fibers 620 and/or other suitable components (e.g., strength members, water blocking materials, etc.). Each buffer tube 615 may be similar to the buffer tube 510 described above with reference to FIG. 5. Accordingly, each buffer tube 615 may be formed from a wide variety of suitable materials and/or with a wide variety of suitable dimensions. Additionally, each buffer tube 615 may be formed as a loose buffer tube, microtube, or other suitable tube configured to house optical fibers and/or other components. In certain embodiments, the respective buffer tubes for each of the optical fiber components 605A, 605B may be formed from similar polymeric materials and/or with similar dimensions (e.g., inner diameter, outer diameter, thickness, etc.). In other embodiments, the respective buffer tubes of the two components 605A, 605B may be formed from different materials (e.g., different polymeric materials, etc.) and/or with different dimensions. Further, in certain embodiments, the respective buffer tubes of the optical fiber components 605A, 605B may be "free of colorant". In other words, the buffer tubes may be formed from one or more polymeric materials that are extruded or otherwise formed around optical fibers with their natural color. No colorant is blended or compounded into the polymeric materials, and no colorant is formed on or applied to the outer surfaces of the buffer layers. In certain embodiments, certain components (e.g., strength members, water blocking materials, filling compounds, etc.) housed within the buffer tubes may also be free of colorant. In other embodiments, one or both of the buffer tubes may incorporate "limited colorant" on its outer surface.

As desired, physical indicia may be selectively formed on the outer surface of the buffer tubes of one or both of optical fiber components 605A, 605B. The physical indicia may facilitate identification of the optical fiber components 605A, 605B and/or the optical fibers contained therein. A wide variety of suitable physical indicia may be formed on the outer surface of one or more buffer tubes as desired in various embodiments. These physical indicia may be similar to the physical indicia discussed in greater detail above with reference to the tight buffer layers of FIG. 2. Additionally, a few non-limiting examples of physical indicia that may be formed on buffer tubes are described in greater detail below with reference to FIGS. 12A-15E.

Additionally, as explained in greater detail above with reference to FIG. 5, in certain embodiments, the optical fibers positioned within one or more of the buffer tubes may be color-coded. For example, optical fibers may be color-coded either with limited colorant or colorant that occupies greater than 5% of the surface area of one or more fibers. In other embodiments, the optical fibers positioned within one or more of the buffer tubes may be free of colorant. As desired and explained in greater detail above with reference to FIG. 5, one or more suitable techniques may be utilized to identify or distinguish a plurality of optical fibers positioned within a buffer tube. For example, physical indicia may be incorporated onto tags attached to optical fibers or onto ribbon material utilized to form one or more optical fiber ribbons.

As desired in various embodiments, any number of additional strength layers, water blocking layers, and/or other suitable components may be incorporated into the cable 600. For example, one or more strength members (e.g., strength yarns, strength rods, etc.) similar to those described above with reference to FIGS. 1 and/or 5 may be incorporated into the cable 600. As another example, water swellable and/or water blocking material may be incorporated into the cable 600. For example, water blocking gels, water blocking fibers, water blocking tapes, and/or water blocking yarns may be incorporated into the cable 600. As desired, the cable 600 may be formed as a dry cable or a wet cable.

FIG. 7 illustrates a cross-section of a seventh example cable 700 that may be formed with reduced or minimal colorant. Similar to the cable 600 of FIG. 6, the cable 700 of FIG. 7 may include a plurality of optical fiber components 705A-F positioned within a jacket 710. As shown in FIG. 7, in certain embodiments, the plurality of optical fiber components 705A-F may be stranded around or otherwise positioned around a central strength member ("CSM") 715. Additionally, any suitable number of other strength materials (e.g., a strength layer 720, strength yarns, strength rods, etc.), water blocking materials (e.g., a water blocking tape, etc.), and/or other materials may be incorporated into the cable 700. The optical fiber components 705A-F and any optional strength materials and/or water blocking materials may be similar to the components described above with reference to FIGS. 5 and 6.

Any number of optical fiber components may be incorporated into the cable 700 as desired in various embodiments. As shown in FIG. 7, six optical fiber components 705A-F may be stranded or otherwise positioned around a CSM 715. In the illustrated six around one design, the optical fiber components 705A-F and the CSM 715 may have similar or approximately equal diameters, thereby allowing the cable 700 to be formed with a round or approximately circular cross-sectional shape. In other embodiments, a CSM 715 may be formed with a larger size than one or more of the optical fiber components 705A-F.

For example, more than six optical fiber components may be positioned around a larger CSM 715 in order to form a cable having a round cross-sectional shape. Indeed, a wide variety of suitable designs may include any desired number of optical fiber components and/or other internal cable components.

Similar to the optical fiber component 505 of FIG. 5, each optical fiber component 705A-F of the cable 700 (generally referred to as optical fiber component 705) may include a buffer tube 720 that houses one or more optical fibers 725 and/or other suitable components (e.g., strength members, water blocking materials, etc.). Each buffer tube 720 may be similar to the buffer tube 510 described above with reference to FIG. 5. Accordingly, each buffer tube 720 may be formed from a wide variety of suitable materials and/or with a wide variety of suitable dimensions. Additionally, each buffer tube 720 may be formed as a loose buffer tube, microtube, or other suitable tube configured to house optical fibers and/or other components. In certain embodiments, the respective buffer tubes for each of the optical fiber components 705A-F may be formed from similar polymeric materials and/or with similar dimensions (e.g., inner diameter, outer diameter, thickness, etc.). In other embodiments, the respective buffer tubes of at least two of the components 705A-F may be formed from different materials (e.g., different polymeric materials, etc.) and/or with different dimensions. Further, in certain embodiments, the respective buffer tubes of the optical fiber components 705A-F may be "free of colorant". In other words, the buffer tubes may be formed from one or more polymeric materials that are extruded or otherwise formed around optical fibers with their natural color. No colorant is blended or compounded into the polymeric materials, and no colorant is formed on or applied to the outer surfaces of the buffer layers. In certain embodiments, certain components (e.g., strength members, water blocking materials, filling compounds, etc.) housed within the buffer tubes may also be free of colorant. In other embodiments, one, two, or more of the buffer tubes may incorporate "limited colorant" on its outer surface.

As desired, physical indicia may be selectively formed on the outer surface of the buffer tubes of one, two, or more of the optical fiber components 705A-F. The physical indicia may facilitate identification of the optical fiber components 705A-F and/or the groupings of optical fibers contained therein. A wide variety of suitable physical indicia may be formed on the outer surface of one, two, or more buffer tubes as desired in various embodiments. These physical indicia may be similar to the physical indicia discussed in greater detail above with reference to the tight buffer layers of FIG. 2. Additionally, a few non-limiting examples of physical indicia that may be formed on buffer tubes are described in greater detail below with reference to FIGS. 12A-15E.

In the illustrated example cable 700 having six optical fiber components 705A-F, physical indicia may be formed on one, two, three, four, five, or six of the optical fiber components 705A-F for identification purposes. In certain embodiments, if at least two of the optical fiber components 705A-E are identified, a technician or installer may be able to determine the identities of the remaining optical fiber components 705A-F. For example, the technician or installer may be able to identify the two components that include physical indicia, as well as a direction in which to travel around the ring of optical fiber components 705A-F. As a result, the technician or installer may be able to identify all of the optical fiber components 705A-F. In other embodiments, a single optical fiber component may include physical indicia that both identifies the optical fiber component and a direction in which to travel around the ring of optical fiber components 705A-F. For example, the physical indicia may include a symbol (e.g., an arrow, a triangle, etc.) or one or more alphanumeric characters that can be utilized to determine an appropriate direction. As a result, the technician or installer may be able to identify all of the optical fiber components 705A-F. In the event that a cable 700 includes more or less than six optical fiber components, physical indicia may be formed on any suitable number of the optical fiber components for identification purposes. The physical indicia may facilitate, at a minimum, identification of one or two optical fiber components and identification of the arrangement of the optical fiber components (e.g., identification of a direction in which a ring of optical fiber components is arranged, etc.) such that the identities of the remaining optical fiber components may be determined.

Additionally, as explained in greater detail above with reference to FIG. 5, in certain embodiments, the optical fibers positioned within one or more of the buffer tubes may be color-coded. For example, optical fibers may be color-coded either with limited colorant or colorant that occupies greater than 5% of the surface area of one or more fibers. In other embodiments, the optical fibers positioned within one or more of the buffer tubes may be free of colorant. As desired and explained in greater detail above with reference to FIG. 5, one or more suitable techniques may be utilized to identify or distinguish a plurality of optical fibers positioned within a buffer tube. For example, physical indicia may be incorporated onto tags attached to optical fibers or onto ribbon material utilized to form one or more optical fiber ribbons.

With continued reference to FIG. 7, the plurality of optical fiber components 705A-F may be stranded or positioned around a central strength member ("CSM") 715. The CSM 715 may be similar to the CSM 315 described above with reference to FIG. 3. Accordingly, the CSM 715 may be formed from a wide variety of suitable materials, components, and/or combinations of materials and/or components. Additionally, the CSM 715 may be formed with a wide variety of suitable dimensions.

As desired in various embodiments, any number of additional strength layers, water blocking layers, and/or other suitable components may be incorporated into the cable 700. For example, one or more strength members (e.g., strength yarns, strength rods, etc.) similar to those described above with reference to FIGS. 1 and/or 5 may be incorporated into the cable 700. As shown in FIG. 7, a suitable strength layer 720 (e.g., a strength layer formed from strength yarns, etc.) may be wrapped around the plurality of optical fiber components 705A-F and positioned between the optical fiber components 705A-F and the jacket 710. As another example, water swellable and/or water blocking material may be incorporated into the cable 600. For example, water blocking gels, water blocking fibers, water blocking tapes, and/or water blocking yarns may be incorporated into the cable 700. As desired, the cable 700 may be formed as a dry cable or a wet cable.

The cables 100, 200, 300, 400, 500, 600, 700 illustrated in FIGS. 1-7 are provided by way of example only. Embodiments of the disclosure contemplate a wide variety of other cables and cable constructions. These other cables may include more or less components than the cables illustrated in FIGS. 1-7. For example, other cables may include other numbers of optical fiber components. Additionally, certain components may have different dimensions and/or materials than the components illustrated in FIGS. 1-7. A wide variety of other suitable materials and/or components may be incorporated into a cable as desired in other embodiments. For example, a cable may include any number of optical fibers, buffer layers, conductors, twisted pairs, and/or other transmission media. As another example, any number of suitable ripcords, armor layers (e.g., metallic armor, dielectric armor, corrugated armor, etc.), location elements (e.g., a metallic wire or strip embedded into or attached to a cable jacket that permits the cable to be located, for example, when buried, etc.), strength members, water blocking materials, insulating materials, dielectric materials, flame retardants, flame suppressants, smoke suppressants, extinguishants, and/or other materials may be incorporated into a cable.

As set forth above, a wide variety of different types of physical indicia may be incorporated into a cable. FIGS. 8A-11E illustrate a few non-limiting examples of physical indicia that may be formed on an outer surface of one or more tight buffer layers, such as any of the tight buffer layers illustrated in FIGS. 1-4. Similarly, FIGS. 12A-15E illustrate a few non-limiting examples of physical indicia that may be formed on an outer surface of a one or more buffer tubes, such as any of the buffer tubes illustrated in FIGS. 5-7. Each of these figures is described in greater detail below. Although FIGS. 8A-15E all specifically illustrate cables having six around one designs (e.g., six optical fiber components positioned around a CSM), the illustrated physical indicia may be applicable to cables having any suitable number of optical fiber components. It will further be appreciated that a wide variety of other suitable physical indicia may be incorporated into a cable as desired in other embodiments. Additionally, any suitable combination of two or more of the example physical indicia discussed herein may be combined within a single cable.

Figure 8A:
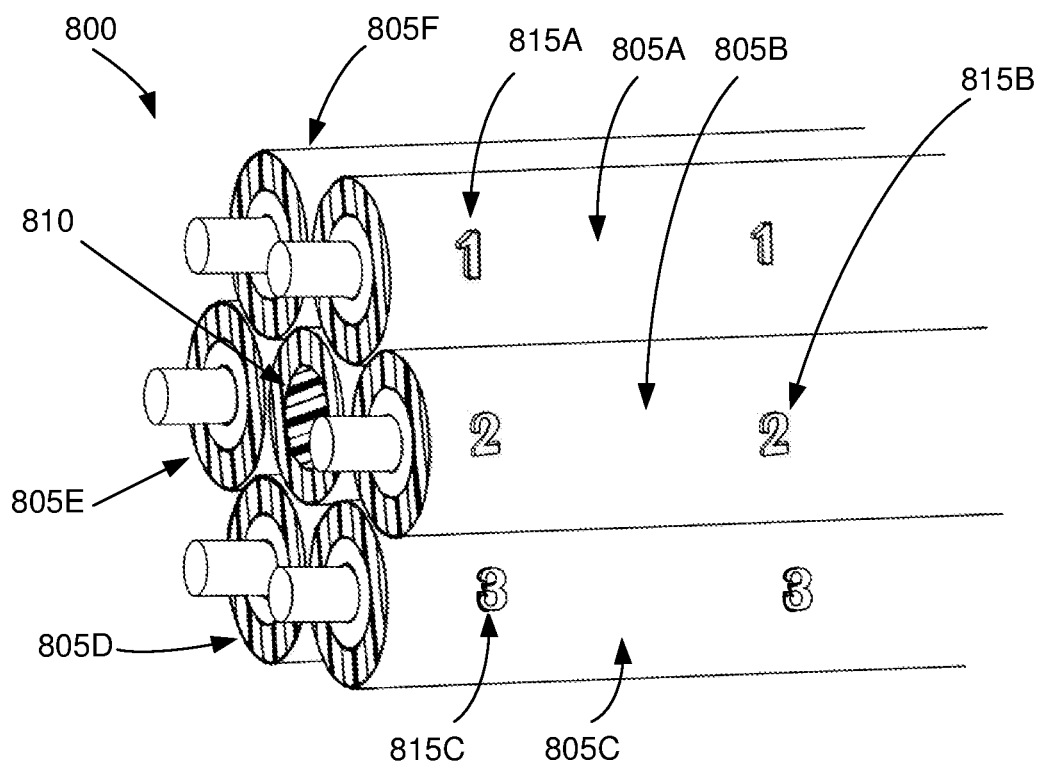
FIGS. 8A-8D are perspective views of example tight buffered optical fibers that are free of colorant and that include raised physical indicia, according to illustrative embodiments of the disclosure.

FIGS. 8A-9D are perspective views of example optical fiber components that include physical indicia formed as surface variations on tight buffer layers. In particular, FIGS. 8A-8D are perspective views of example optical fiber components including buffer layers that are free of colorant and that include raised physical indicia. FIGS. 9A-9D are perspective views of example optical fiber components including buffer layers that are free of colorant and that include indented physical indicia. Turning first to FIG. 8A, a first set 800 of optical fiber components 805A-F is illustrated. The optical fiber components 805A-F may be stranded or otherwise positioned around a CSM 810 as desired. Respective physical indicia (such as 815A-C which are visible in FIG. 8A for a subset 805A-C of the optical fiber components 805A-F) may be formed on the buffer layers of each of the optical fiber components 805A-F to facilitate visual and/or tactile identification of the optical fiber components 805A-F without the use of colorant. The physical indicia are illustrated as raised numbers formed on the respective outer surfaces of the buffer layers of the optical fiber components 805A-F. Each optical fiber component (generally referred to as optical fiber component 805) may include a plurality of longitudinally spaced raised physical indicia formed on and extending or protruding from an outer surface of the buffer layer.

Figure 8B:
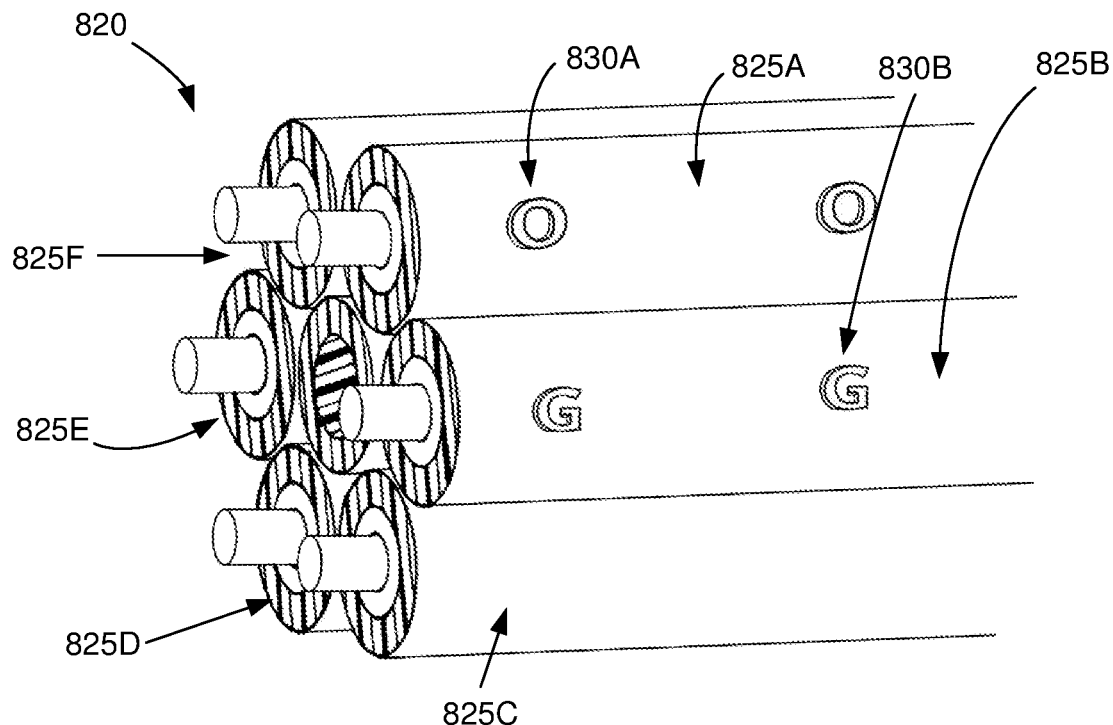
Figure 8C:
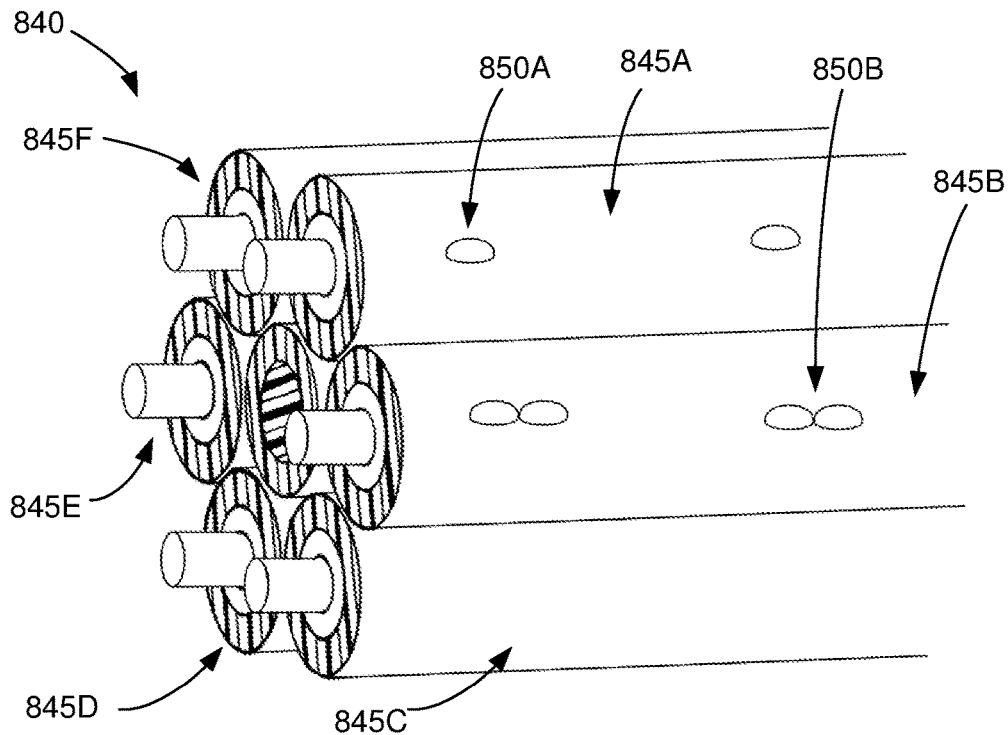
Figure 8D:
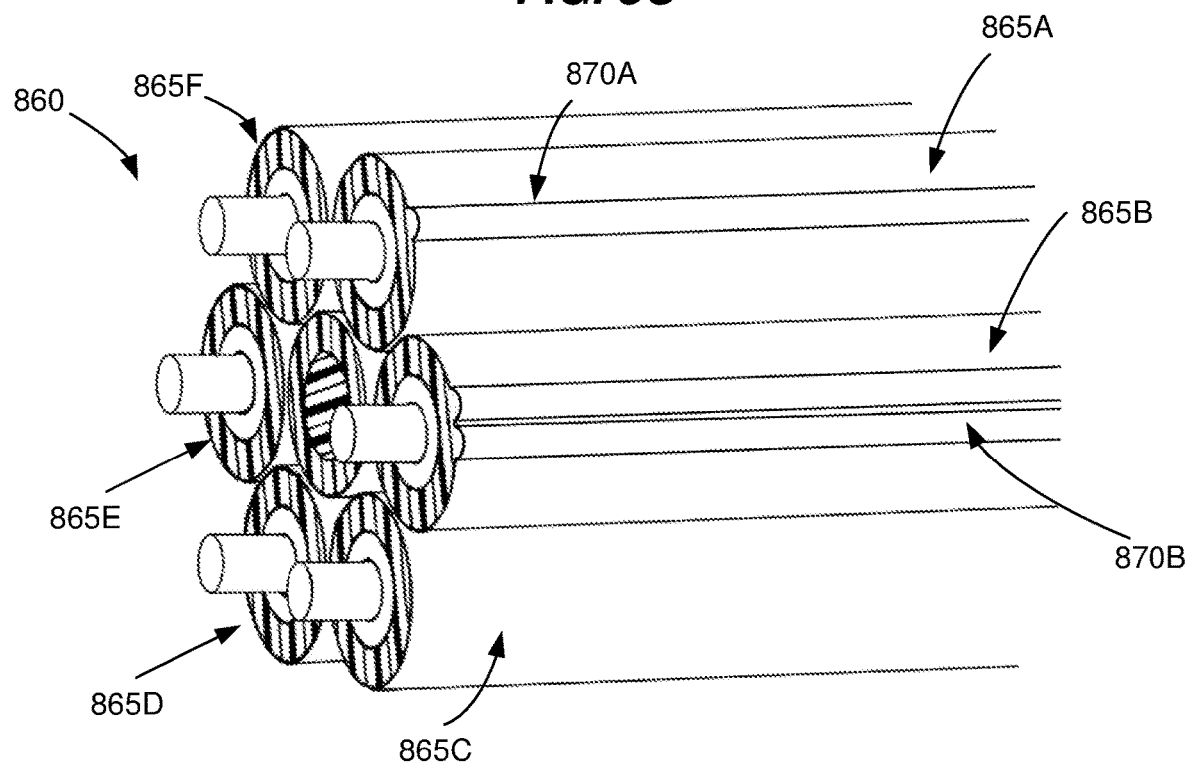

Although FIG. 8A illustrates respective physical indicia (such as physical indicia 810A-C) formed on the buffer layers of each of the optical fiber components 805A-F, raised physical indicia may be formed on a subset of the optical fiber component 805A-F as illustrated in FIG. 8B-8D. For example, raised physical indicia may be formed on one or two of the optical fiber components 805A-F provided that a technician or installer can identify all of the various optical fiber components 805A-F using the physical indicia. In certain embodiments, physical indicia may be formed on two of the optical fiber components 805A-F in order to identify the two components and a direction in which a technician should travel around the ring of optical fiber components 805A-F in order to identify the other components. In other embodiments, physical indicia formed on a single optical fiber component 805 may identify the optical fiber component and a direction in which to travel around the ring of optical fiber components 805A-F. For example, an arrow, triangle, symbol, alphanumeric character (e.g., a letter or number from which an orientation can be determined, etc.) or other suitable physical indicia may be utilized to identify a first optical fiber component and a direction.

FIG. 8B illustrates a second set 820 of optical fiber component 825A-F that include raised physical indicia formed on a desired number of buffer layers. Respective physical indicia 830A, 830B may be formed on the buffer layers of a subset of the optical fiber components 825A-F to facilitate visual and/or tactile identification of the optical fiber components 825A-F without the use of colorant. For example, respective physical indicia 830A, 830B may be formed on the buffer layers of two of the optical fiber components 825A, 825B. Once the two optical fiber components 825A, 825B are identified, a technician or installer may use the identities of the two optical fiber components 825A, 825B and their orientation relative to one another to determine the identities of the other optical fiber components 825C, 825D, 825E, 825F. In other embodiments, respective physical indicia may be formed on one, three, four, five, or each of the optical fiber components 825A-F.

The physical indicia 830A, 830B are illustrated as raised letters formed on the respective outer surfaces of the buffer layers of two optical fiber components 825A, 825B. On each optical fiber component (generally referred to as optical fiber component 825), the respective physical indicia may include a plurality of longitudinally spaced raised physical indicia formed on an outer surface of the buffer layer. In certain embodiments, the raised letters may correspond to conventional colors used within optical fiber cables. As shown, the raised letters may identify a conventional "orange" buffered optical fiber and a conventional "green" buffered optical fiber. Other letters, alphanumeric characters, sets of alphanumeric characters, and/or symbols (e.g., shapes as illustrated in FIG. 11D), etc.) may be utilized as desired in other embodiments. In other embodiments, one or more alphanumeric characters or symbols may be formed as physical indicia on the buffer layer of a single optical fiber component 825, and the physical indicia may be utilized to identify the component 825 and an orientation of the remaining optical fiber components relative to the component 825.

FIG. 8C illustrates a third set 840 of optical fiber components 845A-F that include raised physical indicia. Respective physical indicia 850A, 850B may be formed on the buffer layers of a subset of the optical fiber components 845A-F to facilitate visual and/or tactile identification of the optical fiber components 845A-F without the use of colorant. For example, respective physical indicia 850A, 850B may be formed on the buffer layers of two of the optical fiber components 845A-F. In other embodiments, respective physical indicia may be formed on one, three, four, five, or each of the optical fiber components 845A-F. The physical indicia 850A, 8550B are illustrated as raised bumps or protrusions formed on the respective outer surfaces of the buffer layers of two optical fiber components 845A, 845B. On each optical fiber component (generally referred to as optical fiber component 845), the respective physical indicia may include a plurality of longitudinally spaced raised physical indicia formed on an outer surface of the buffer layer. As shown, different configurations of raised bumps may be utilized on different optical fiber components to facilitate identification. For example, single bumps may be utilized as physical indicia 850A on a first optical fiber component 845A, and sets of double bumps may be utilized as physical indicia 850B on a second optical fiber component 845B. Other numbers and/or arrangements of bumps may be utilized as desired. Bumps may also have any suitable shape, such as a round, oval, rectangular, or other shape. In certain embodiments, bumps having different shapes may be utilized on different optical fiber components. Additionally, in certain embodiments, bumps (e.g., bumps indicating a direction, etc.) or a set of bumps (e.g., a grouping of raised portions indicating a direction, etc.) formed on a single optical fiber component may be utilized to identify both the component and an orientation (e.g., direction in which to travel around a ring, etc.) of the remaining optical fiber components.

FIG. 8D illustrates a fourth set 860 of optical fiber components 865A-F that include raised physical indicia. Respective physical indicia 870A, 870B may be formed on the buffer layers of a subset of the optical fiber components 865A-F to facilitate visual and/or tactile identification of the optical fiber components 865A-F without the use of colorant. For example, respective physical indicia 870A, 870B may be formed on the buffer layers of two of the optical fiber components 865A, 865B. In other embodiments, respective physical indicia may be formed on one, three, four, five, or each of the optical fiber components 865A-F. The physical indicia 870A, 870B are illustrated as raised ridges formed on the respective outer surfaces of the buffer layers of two optical fiber components 865A, 865B. As shown, different configurations of raised ridges may be utilized on different optical fiber components to facilitate identification. For example, a single ridge may be utilized as physical indicia 870A on a first optical fiber component 865A, and two ridges (e.g., two ridges formed on opposite sides of a buffer layer, two ridges formed in close proximity to one another, etc.) may be utilized as physical indicia 870B on a second optical fiber component 865B. Other numbers of ridges may be utilized as desired. As shown, in certain embodiments, one or more ridges may be formed as longitudinally continuous ridges. In other embodiments, a ridge may include a plurality of longitudinally spaced sections such that the ridge resembles a dotted line ridge. Additionally, a ridge may either extend in a parallel direction to that of the buffer layer on which it is formed, may spiral around a buffer layer, or may have any other suitable configuration. Various combinations of ridges may be utilized to identify different twisted pairs. For example, a single longitudinally continuous ridge may be formed on a first optical fiber component, and a dotted line ridge may be formed on a second optical fiber component.

Figure 9A:
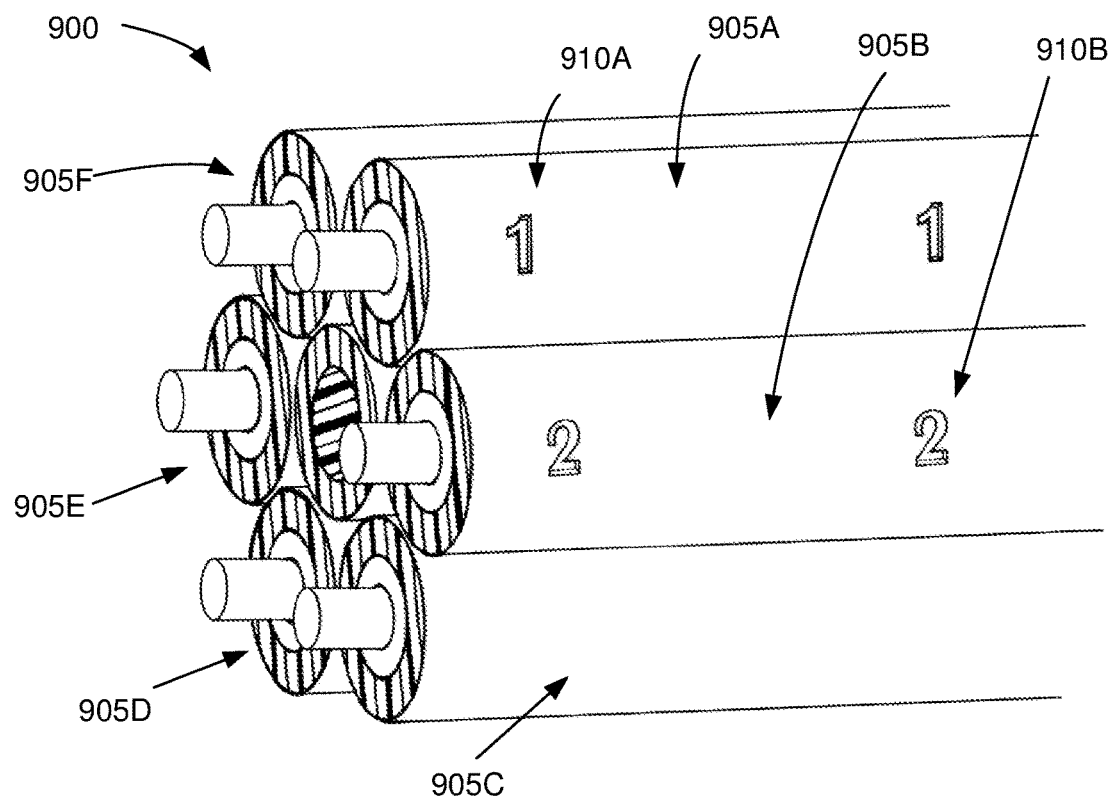
FIGS. 9A-9D are perspective views of example tight buffered optical fibers that are free of colorant and that include indented physical indicia, according to illustrative embodiments of the disclosure.

FIG. 9A illustrates a first set 900 of optical fiber components 905A-F that includes indented physical indicia. Physical indicia may be formed on any number of the optical fiber components 905A-F to facilitate visual and/or tactile identification of the optical fiber components 905A-F without the use of colorant. As illustrated, respective physical indicia 910A, 910B may be formed on the buffer layers of two of the optical fiber components 905A, 905B. In other embodiments, respective physical indicia may be formed on the buffer layers of one, three, four, five, or each of the optical fiber components 905A-F. The physical indicia 910A, 910B are illustrated as indented numbers formed on the respective outer surfaces of the buffer layers of the desired optical fiber components 905A, 905B. Regardless of the number of optical fiber components 905A-F on which physical indicia are formed, as described in greater detail above, the physical indicia may be utilized to identify or determine the identities of each of the optical fiber components 905A-F. An optical fiber component (generally referred to as optical fiber component 905) may include a plurality of longitudinally spaced indented physical indicia formed in and/or impressed into an outer surface of the buffer layer.

Figure 9B:
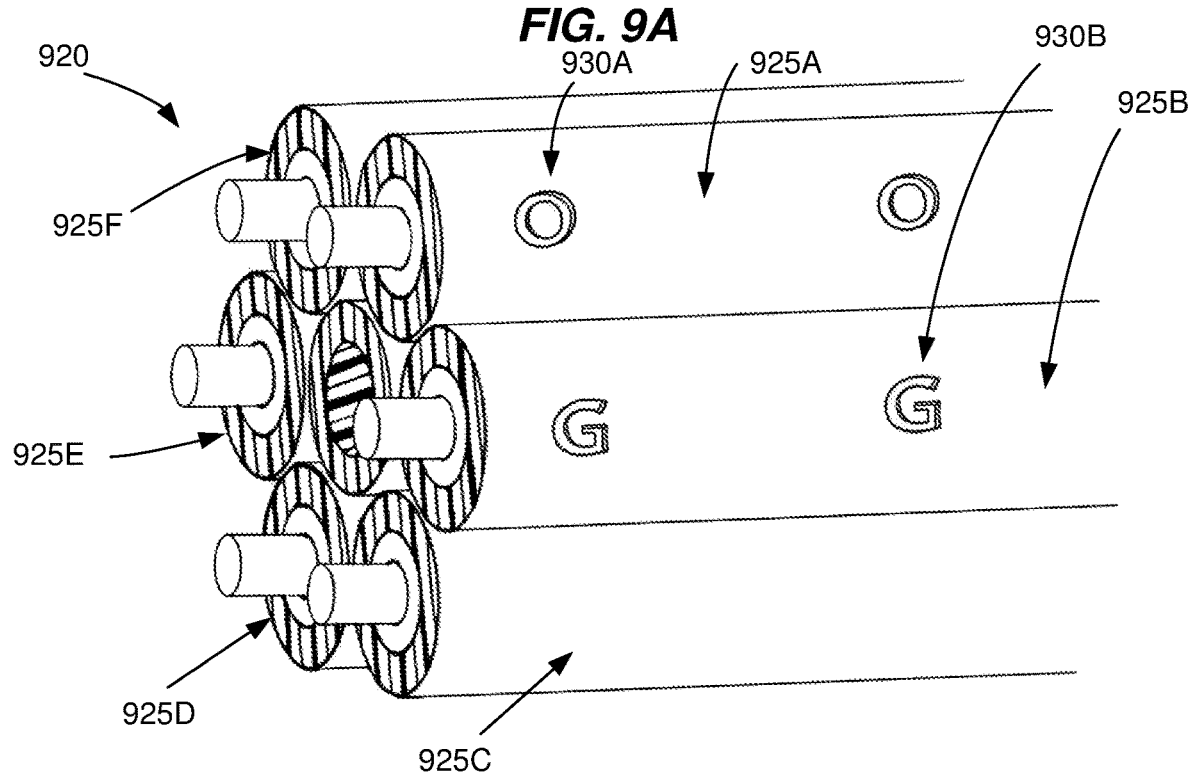

FIG. 9B illustrates a second set 920 of optical fiber components 925A-F that include indented physical indicia. Physical indicia may be formed on any number of the optical fiber components 925A-F to facilitate visual and/or tactile identification of the optical fiber components 925A-F without the use of colorant. As illustrated, respective physical indicia 930A, 930B may be formed on the buffer layers of two of the optical fiber components 925A, 925B. In other embodiments, respective physical indicia may be formed on the buffer layers of one, three, four, five, or each of the optical fiber components 925A-F. The physical indicia 930A, 930B are illustrated as indented letters formed on the respective outer surfaces of the buffer layers of desired optical fiber components 925A, 925B. On each optical fiber component (generally referred to as optical fiber component 925), the respective physical indicia may include a plurality of longitudinally spaced physical indicia formed into or on an outer surface of the buffer layer. In certain embodiments, the indented letters (or applicable groups of letters) may correspond to conventional colors used within optical fiber cabling. As shown, the indented letters may identify conventional "orange" and "green" buffer layers. Other conventional colors (e.g., blue, brown, white, red, black, etc.) may be identified as desired. Other letters, alphanumeric characters, sets of alphanumeric characters, and/or symbols (e.g., shapes as illustrated in FIG. 11D), etc.) may be utilized as desired in other embodiments.

Figures 9C, 9D:
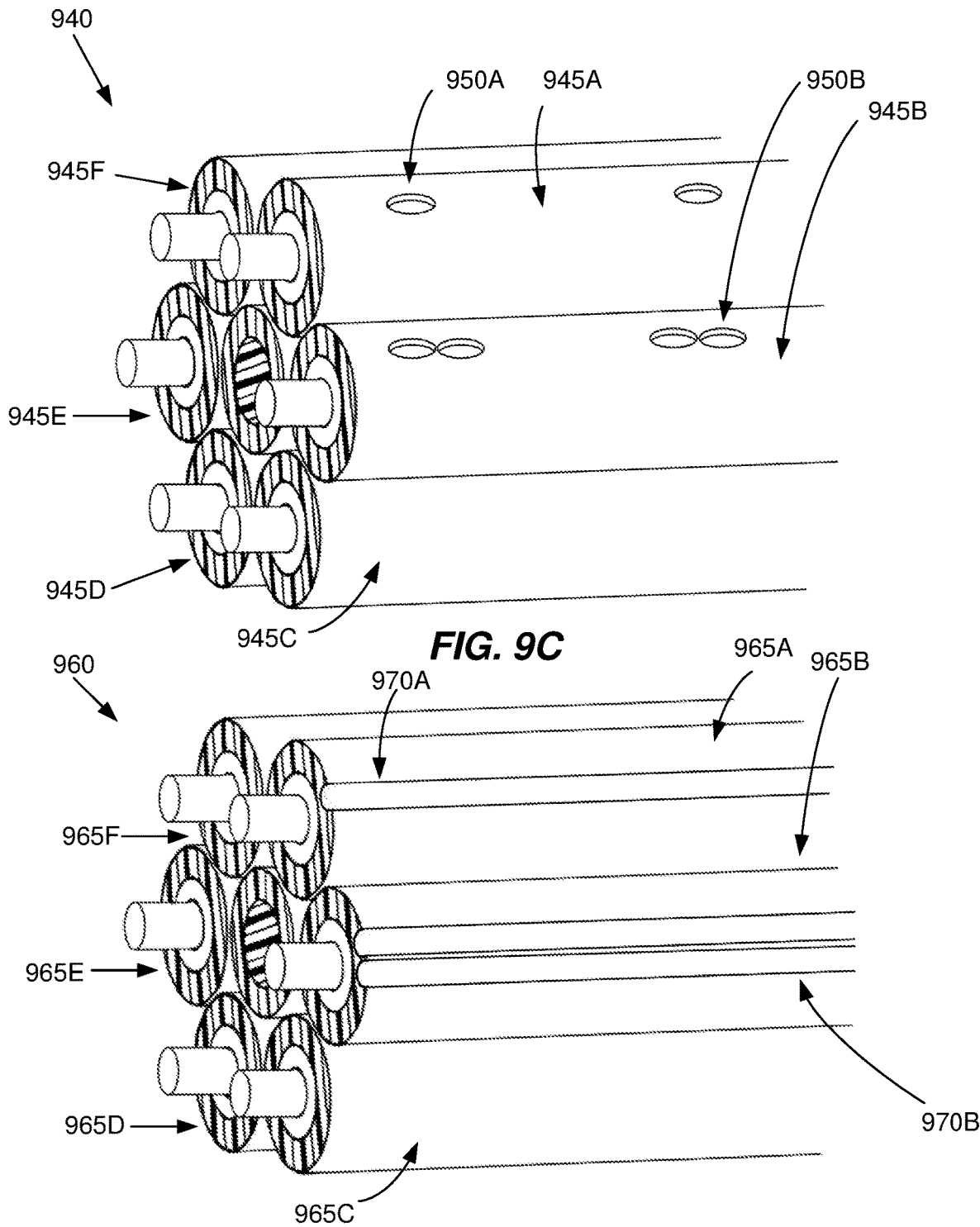

FIG. 9C illustrates a third set 940 of optical fiber components 945A-F that include indented physical indicia. Respective physical indicia (e.g., physical indicia 950A, 950B, etc.) may be formed on all or a subset of the buffer layers of the optical fiber components 945A-F to facilitate visual and/or tactile identification of the optical fiber components 945A-F without the use of colorant. The physical indicia 950A, 950B are illustrated as divots, dimples, or other suitable indentions formed on the respective outer surfaces of the buffer layers of two optical fiber components 945A, 945B. On each optical fiber component (generally referred to as optical fiber component 945), the respective physical indicia may include a plurality of longitudinally spaced indented physical indicia formed on an outer surface of the buffer layer. As shown, different configurations of divots or dimples bumps may be utilized on different optical fiber components to facilitate identification. For example, single divots may be utilized as physical indicia 950A on the buffer layer of a first optical fiber component 945A, and sets of double divots may be utilized as physical indicia 950B on the buffer layer of a second optical fiber component 945B. Other numbers and/or arrangements of divots may be utilized as desired. Divots may also have any suitable shape, such as a round, oval, rectangular, or other shape. In certain embodiments, divots having different shapes may be utilized on different optical fiber components. Additionally, in certain embodiments, divots (e.g., divots indicating a direction, etc.) or a set of divots (e.g., a grouping of divots indicating a direction, etc.) formed on a single optical fiber component may be utilized to identify both the component and an orientation (e.g., direction in which to travel around a ring, etc.) of the remaining optical fiber components.

FIG. 9D illustrates a fourth set 960 of optical fiber components 965A-F that include indented physical indicia. Respective physical indicia (e.g., physical indicia 970A, 970B, etc.) may be formed on the buffer layers of all or a subset of the optical fiber components 965A-F to facilitate visual and/or tactile identification of the optical fiber components 965A-F without the use of colorant. The physical indicia 970A, 970B are illustrated as grooves or channels formed on the respective outer surfaces of the buffer layers of two optical fiber components 965A, 965B. As shown, different configurations of grooves may be utilized on different optical fiber components to facilitate identification. For example, a single groove may be utilized as physical indicia 970A on the buffer layer of a first optical fiber component 965A, and two grooves (e.g., two grooves formed on opposite sides of a buffer layer, two grooves formed in relatively close proximity to one another on a buffer layer, etc.) may be utilized as physical indicia 970B on the buffer layer of a second optical fiber component 965B. Other numbers of grooves may be utilized as desired. As shown, in certain embodiments, one or more grooves may be formed as longitudinally continuous grooves. In other embodiments, a groove may include a plurality of longitudinally spaced sections such that the groove resembles a dotted line groove. Additionally, a groove may either extend in a parallel direction to that of the buffer layer on which it is formed, may spiral around a buffer layer, or may have any other suitable configuration. Various combinations of grooves may be utilized to identify different optical fiber components. For example, a single longitudinally continuous groove may be formed on a first optical fiber component, and a dotted line groove may be formed on a second optical fiber component.

Figure 10A:
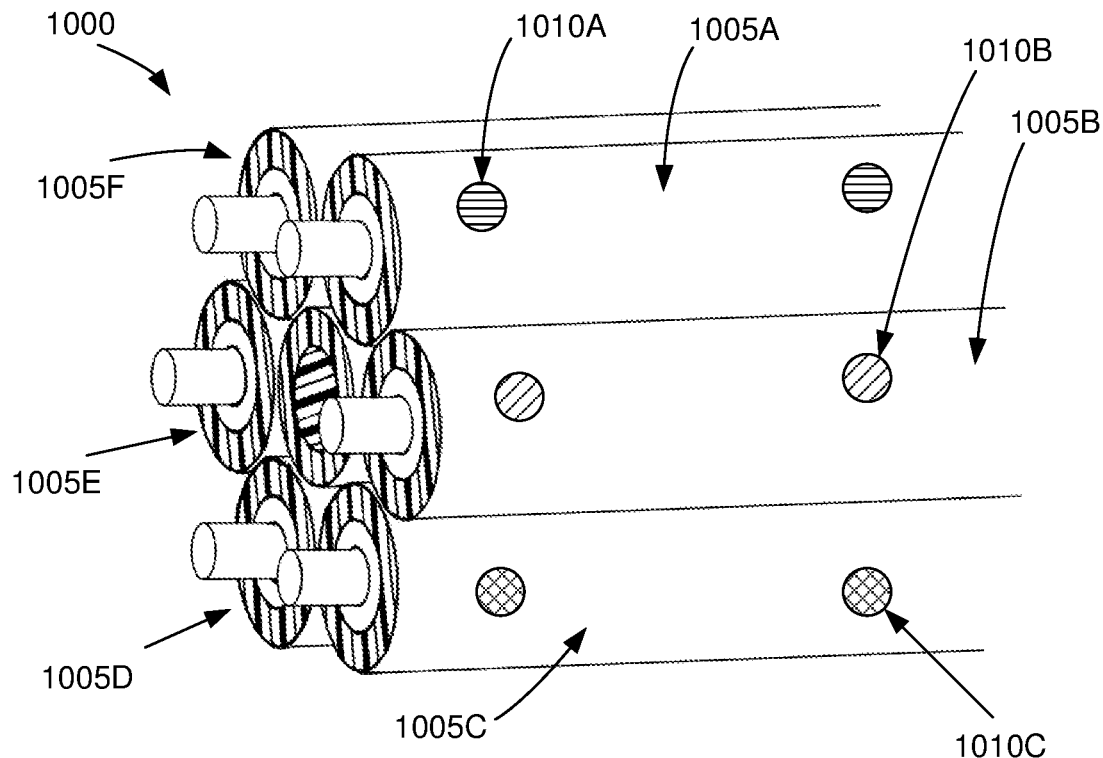
FIGS. 10A-10D are perspective views of example tight buffered optical fibers that include limited colorant with physical indicia formed from two or more colors, according to illustrative embodiments of the disclosure.

In certain embodiments, physical indicia may be formed on the buffer layers of one or more optical fiber components utilizing limited colorant. The limited colorant may include multiple colors or a single color as desired in various embodiments. FIGS. 10A-10D are perspective views of example optical fiber components that include limited colorant with physical indicia formed from two or more colors, according to illustrative embodiments of the disclosure. Turning first to FIG. 10A, a first set 1000 of optical fiber components 1005A-F that include multi-colored physical indicia is illustrated. Physical indicia may be formed on the buffer layers of any desired number of the optical fiber components 1005A-F to facilitate visual identification of the optical fiber components 1005A-F. In certain embodiments, respective physical indicia (such as depicted physical indicia 1010A-C) may be formed on the buffer layers of each of the optical fiber components 1005A-F. The physical indicia may be relatively small sections or areas of different colors. Any suitable colors can be utilized as desired. As shown, blue physical indicia 1010A may be formed on the buffer layer of a first optical fiber component 1005A; brown physical indicia 1010B may be formed on the buffer layer of a second optical fiber component 1005B, and orange physical indicia 1110C may be formed on the buffer layer of a third optical fiber component 1005C. As desired, other colors may be utilized in conjunction with the other optical fiber components 1005D-F. Additionally, a wide variety of different colors and/or combinations of colors may be utilized in other embodiments. On each optical fiber component (generally referred to as optical fiber component 1005), the respective physical indicia (generally referred to as physical indicia 1010) may be formed at a plurality of longitudinally spaced locations. A wide variety of suitable gaps or spaces may be positioned between longitudinally spaced physical indicia. Additionally, each physical indicia 1010 may be formed with a wide variety of suitable dimensions, such as any suitable cross-sectional shape (e.g., circular, elliptical, rectangular, etc.), diameter, longitudinal length, cross-sectional size, etc. In other embodiments, the physical indicia 1010 may be formed as longitudinally spaced rings or bands with each ring spanning around a portion or all of the circumference of a buffer layer. Other suitable physical indicia may be utilized as desired, such as alphanumeric characters, symbols, shapes, etc.

Figure 10B:
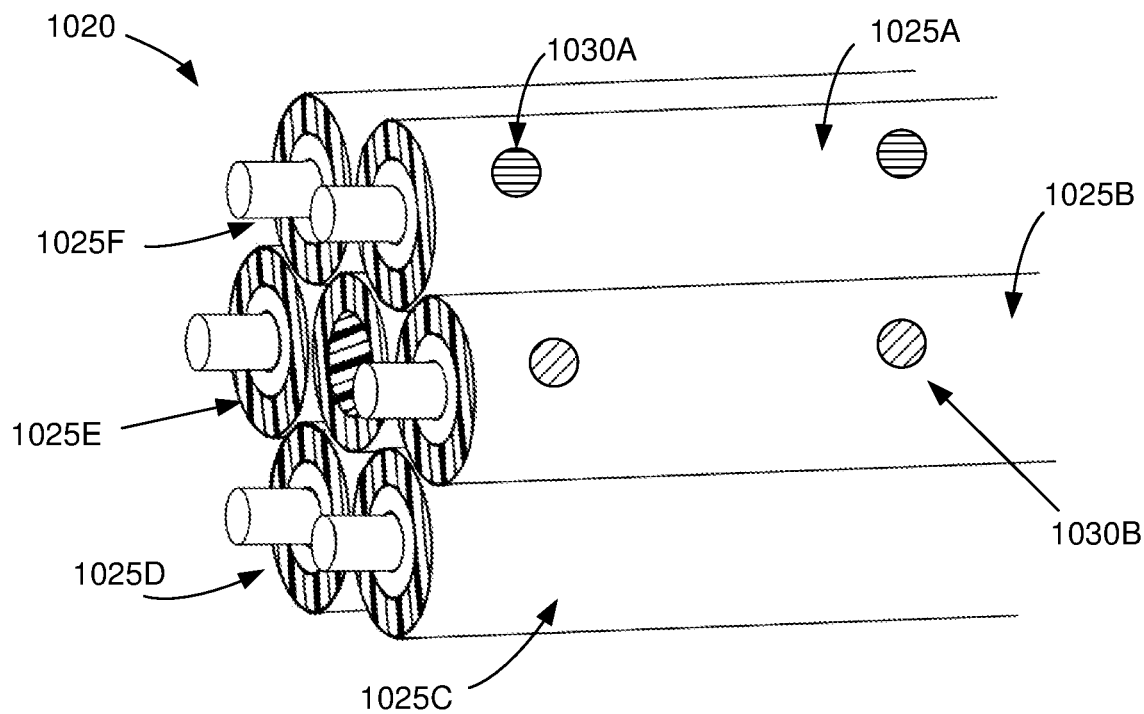
Figure 10C:
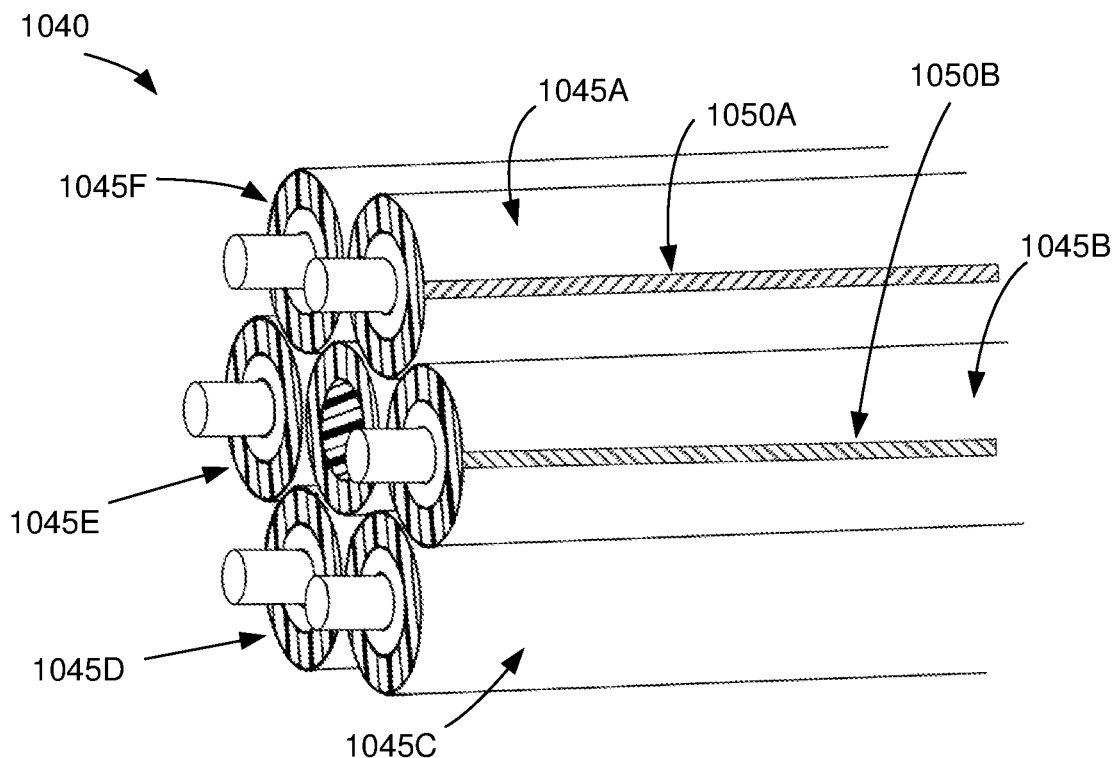
Figure 10D:
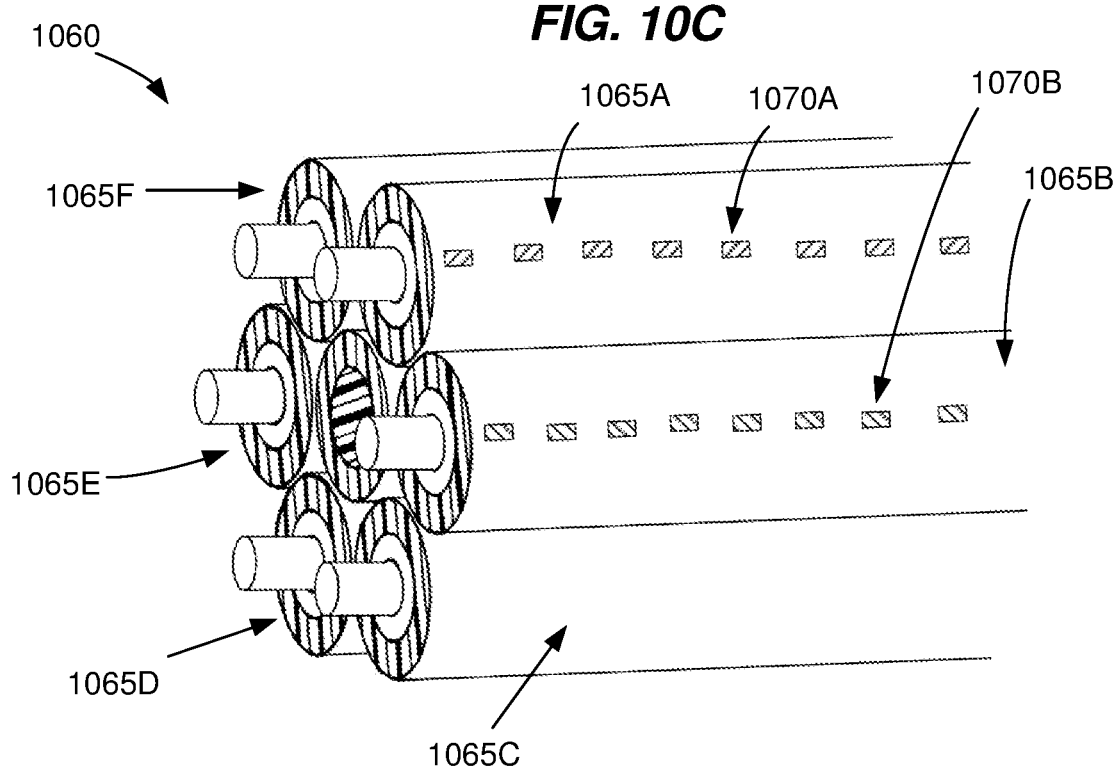

FIG. 10B illustrates a second set 1020 of optical fiber components 1025A-F that include multi-colored physical indicia. In contrast to FIG. 10A, FIG. 10B illustrates the formation of respective physical indicia 1030A, 1030B on a subset of the optical fiber components 1025A-F. For example, physical indicia may be formed on one, two, or another suitable number of optical fiber components 1025A-F that is a subset of the optical fiber components 1025A-F. The physical indicia 1030A, 1030B may be relatively small sections or areas of different colors similar to the physical indicia 1010A-C illustrated in FIG. 10A. FIG. 10C illustrates a third set 1040 of optical fiber components 1045A-F that include multi-colored physical indicia. The physical indicia 1050A, 1050B may be formed as different colored stripes on the buffer layers of any desired number of respective optical fiber components (such as optical fiber components 1045A, 1045B, etc.) to facilitate identification of the optical fiber components 1045A-F. Similarly, FIG. 10D illustrates a fourth set 1060 of optical fiber components 1065A-F that include different colored stripes formed as physical indicia 1070A, 1070B on the buffer layers of a desired number of respective optical fiber components (such as optical fiber components 1065A, 1065B, etc.). However, FIG. 10D illustrates stripes that are formed as dashed or broken lines. Indeed, a wide variety of suitable stripe patterns (e.g., solid lines, dashed lines, lines having segments with different lengths, etc.) may be utilized as desired. In other embodiments, multiple stripes may be utilized on a buffer layer. Regardless of the type and/or number of stripes utilized, the stripes formed on a buffer layer may occupy a relatively small surface area of the buffer layer, such as less than 5.0% of the surface area. As desired, a stripe may be parallel to the longitudinal length of the buffer layer on which it is formed or, alternatively, may spiral or twist around the buffer layer.

Figure 11A:
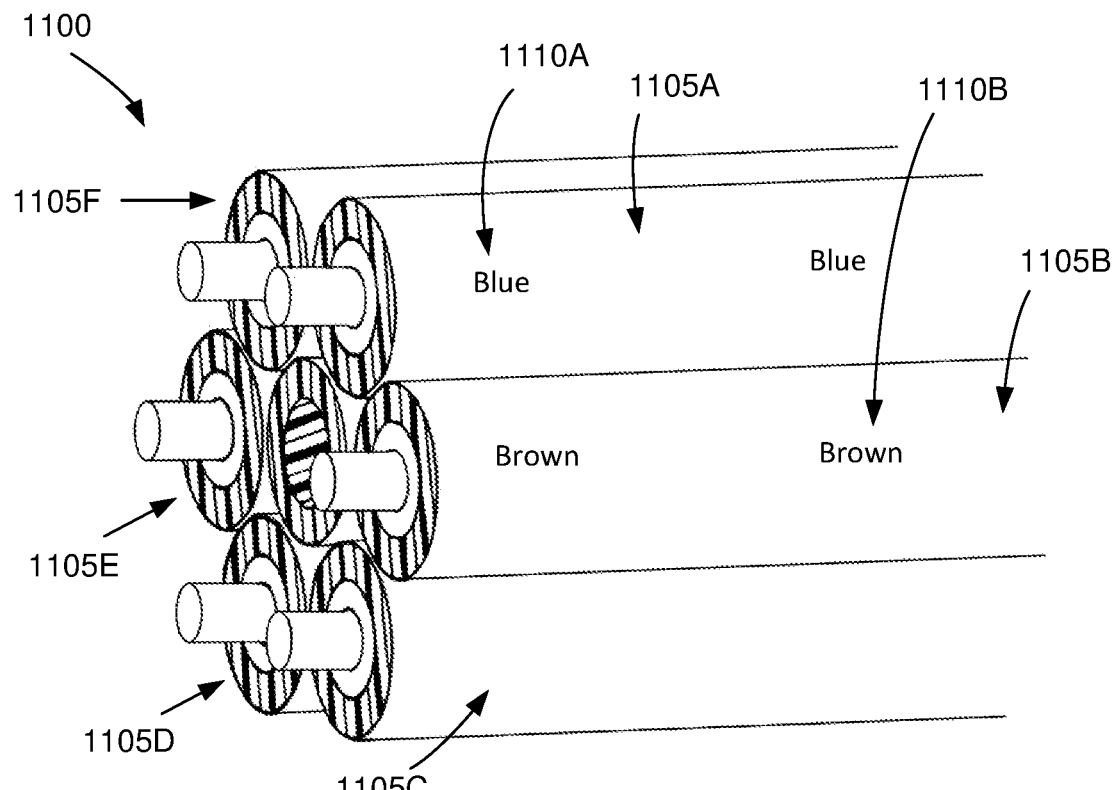
FIGS. 11A-11E are perspective views of example tight buffered optical fibers that include limited colorant with physical indicia formed from a single color, according to illustrative embodiments of the disclosure.
Figure 11B:
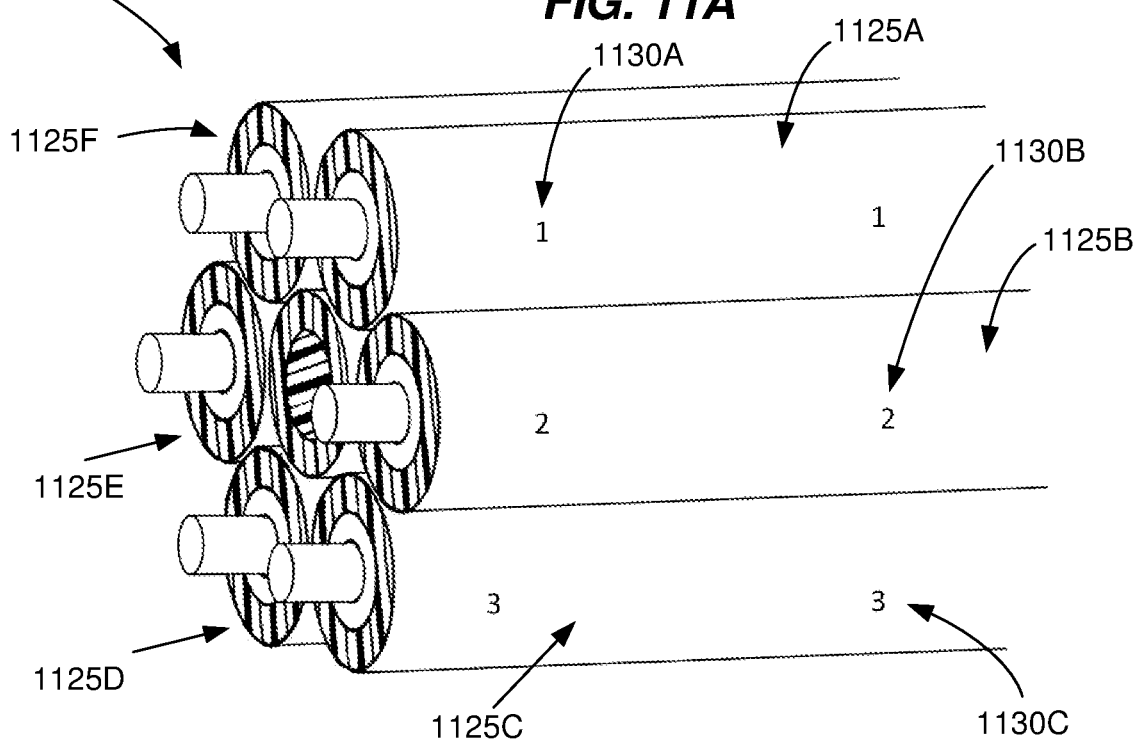
Figure 11C:
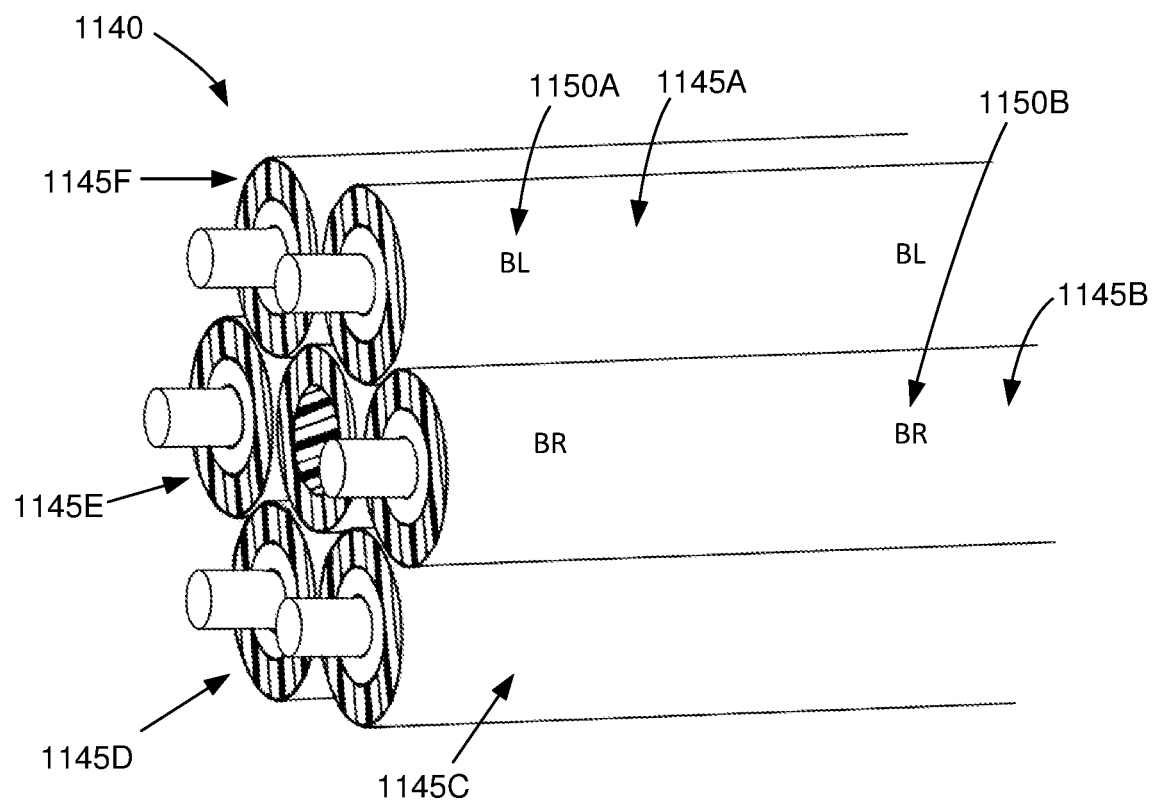
Figure 11D:
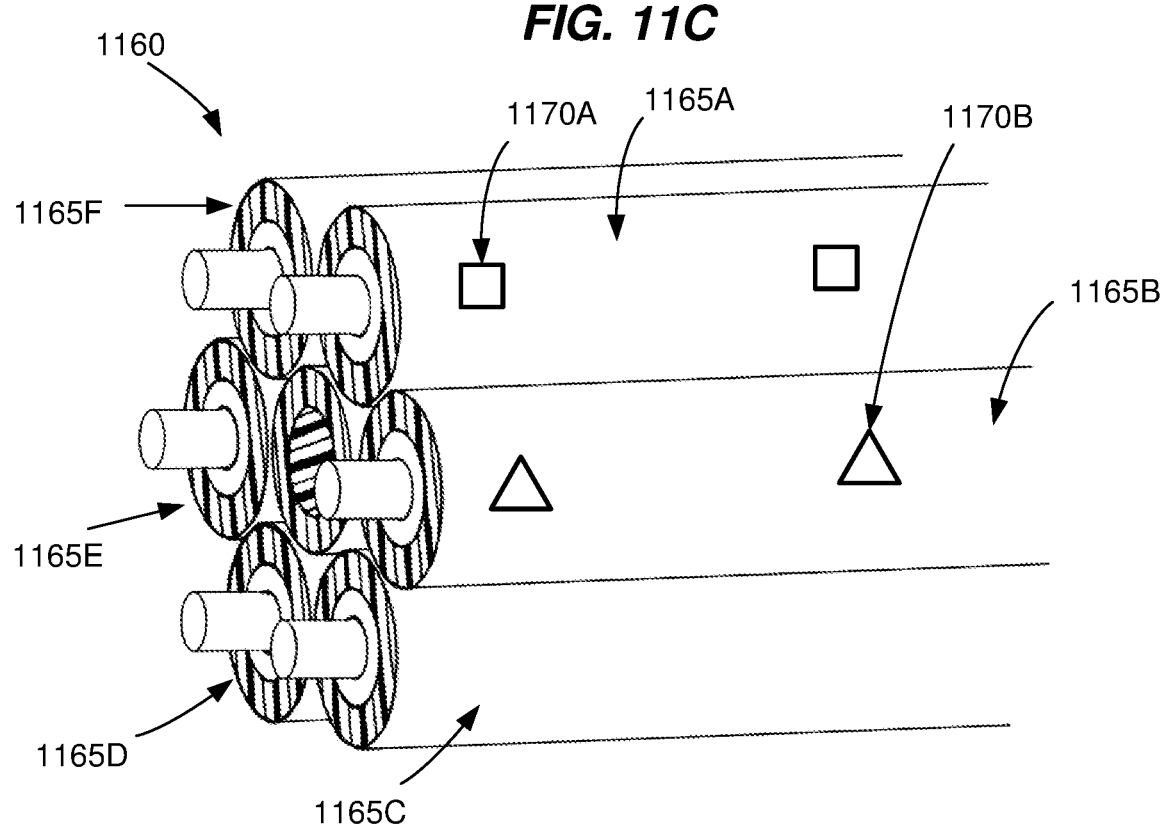
Figure 11E:
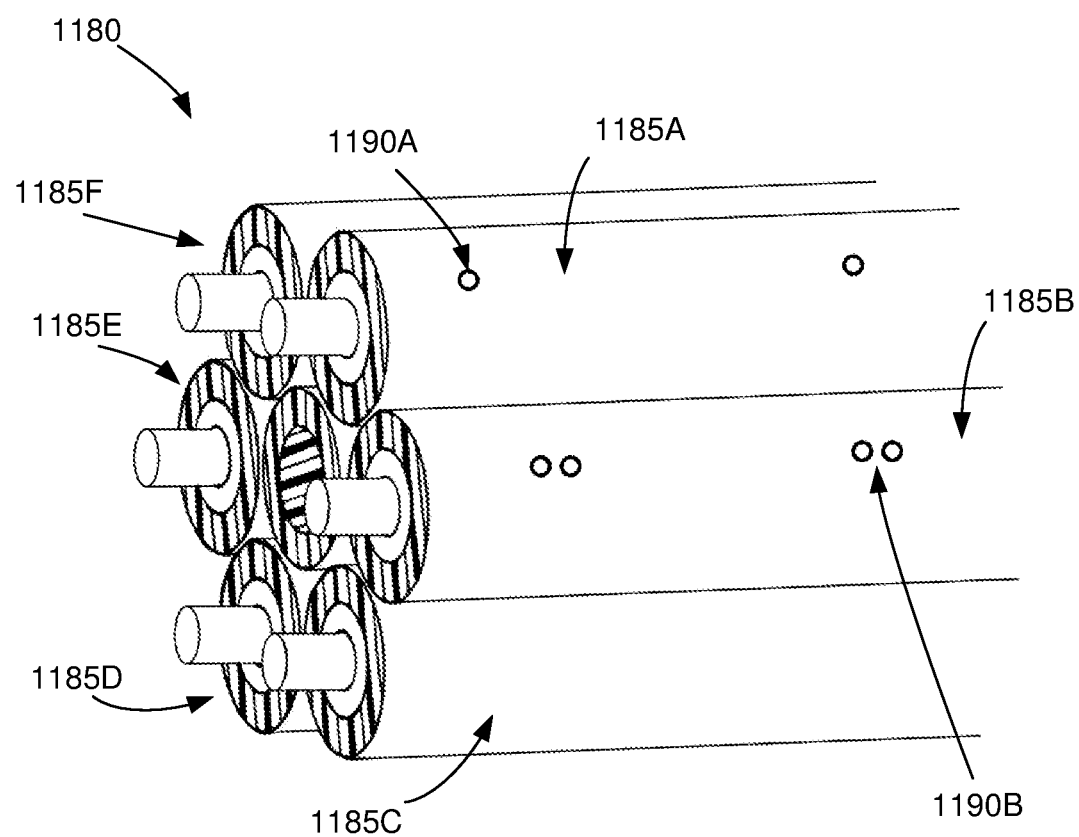

FIGS. 11A-11E are perspective views of example optical fiber components that include limited colorant with physical indicia formed from a single color, according to illustrative embodiments of the disclosure. Any single color or colorant can be utilized as desired, such as black or a colorant having the lowest environmental impact. Turning first to FIG. 11A, a first set 1100 of optical fiber components 1105A-F that include single colored physical indicia 1110A, 1110B is illustrated. The physical indicia 1110A, 1110B may include text that identifies the conventional color of a desired number of the optical fiber components 1105A-F. FIG. 11B illustrates a second set 1120 of optical fiber components 1125A-F in which numbers are utilized as physical indicia (such as illustrated physical indicia 1130A-C) to identify various optical fiber components 1125A-F. FIG. 11C illustrates a third set 1140 of optical fiber components 1145A-F in which alphanumeric characters are utilized as physical indicia 1150A, 1150B to identify a desired number of the optical fiber components 1145A-F. For example, the characters "BL" may be utilized to identify a conventional blue optical fiber components and the characters "BR" may be utilized to identify a conventional brown optical fiber component. Any suitable alphanumeric characters, letters, words, etc. may be utilized to identify optical fiber components as desired in various embodiments. FIG. 11D illustrates a fourth set 1160 of optical fiber components 1165A-F in which symbols are utilized as physical indicia 1170A, 1170B to identify a desired number of the optical fiber components 1165A-F. As shown, different shapes may be associated with different optical fiber components 1165A-F. A wide variety of other suitable symbols may be utilized as desired in other embodiments. Additionally, in certain embodiments, symbols (e.g., an arrow, a triangle, etc.) and/or alphanumeric characters may be utilized to identify both an optical fiber component and an orientation of other optical fiber components, such as a direction to travel around a ring. FIG. 11E illustrates a fifth set 1180 of optical fiber components 1185A-F in which series of dots (or other shapes or symbols) are utilized as physical indicia 1190A, 1190B to identify a desired number of the optical fiber components 1185A-F. For example, spaced sections of single dots may be utilized to identify a first optical fiber component 1185A and spaced sections of double dots may be utilized to identify a second optical fiber component 1185B.

A wide variety of other suitable single color or single colorant physical indicia may be utilized as desired in other embodiments. Examples of other physical indicia that may be utilized include, but are not limited to, sets of rings or bands (e.g., single bands for a first optical fiber component, double bands for a second optical fiber component, and so on; different band patterns or designs for different optical fiber components such as solid and dashed bands; etc.), the use of stripes (e.g., a single stripe for a first optical fiber component, a double stripe for a second optical fiber component, and so on; different stripe patterns or designs for different optical fiber components, etc.), and/or other suitable indicia formed with a single colorant. Regardless of the type of physical indicia utilized, respective physical indicia may be formed on the buffer layers of any suitable or desired number of optical fiber components. For example, FIG. 11B illustrates a set 1120 of optical fiber components 1125A-F in which respective physical indicia is formed on each optical fiber component 1125A-F. FIGS. 11A, 11C, 11D, and 11E illustrate the use of physical indicia on a subset of the optical fiber components. In various embodiments, respective physical indicia may be formed on the buffer layers one, two, three, or any other suitable number up to each and every one of the plurality of optical fiber components. Regardless of the number of optical fiber components that include physical indicia, the physical indicia may facilitate identification of all of the optical fiber components.

FIGS. 8A-11E illustrate example sets or groups of tight buffered optical fibers that include physical indicia. Similarly, as illustrated in FIGS. 12A-15D, physical indicia may be formed on any suitable number of buffer tubes (e.g., loose buffer tubes, microtubes, etc.) incorporated into a cable, such as any of the cables 500, 600, 700 of FIGS. 5-7. The example physical indicia illustrated in FIGS. 12A-15D for groups of buffer tubes are similar to those described above with reference to FIGS. 8A-11E for groups of tight buffered optical fibers. As a result, only a brief description of each of FIGS. 12A-15D is set forth below. Additionally, it will be appreciated that a group of buffer tubes may be positioned around a CSM as desired in certain embodiments.

Figure 12A:
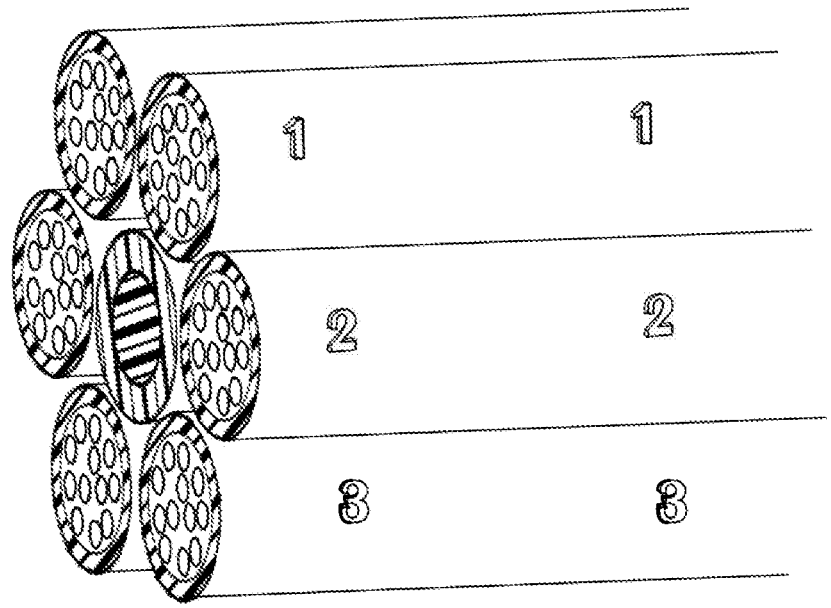
FIGS. 12A-12D are perspective views of example optical fiber buffer tubes that are free of colorant and that include raised physical indicia, according to illustrative embodiments of the disclosure.
Figure 12B:
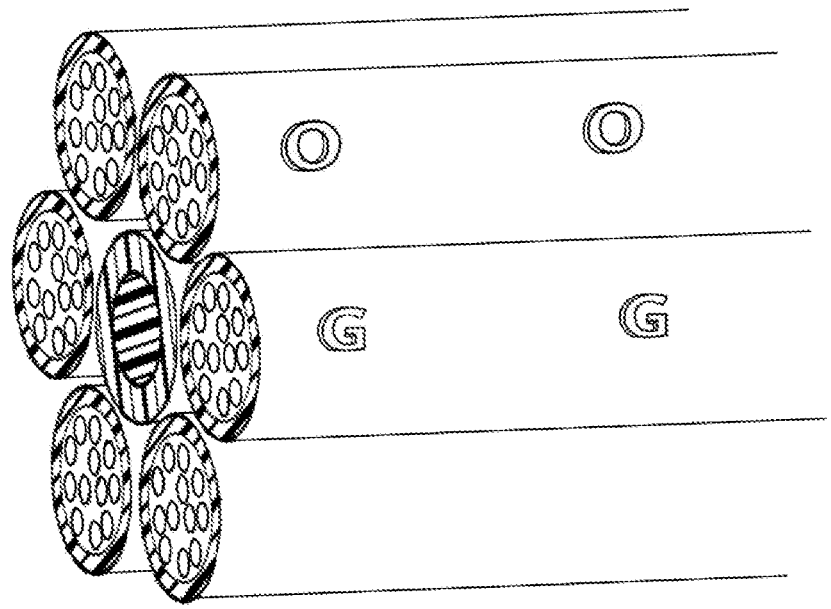
Figure 12C:
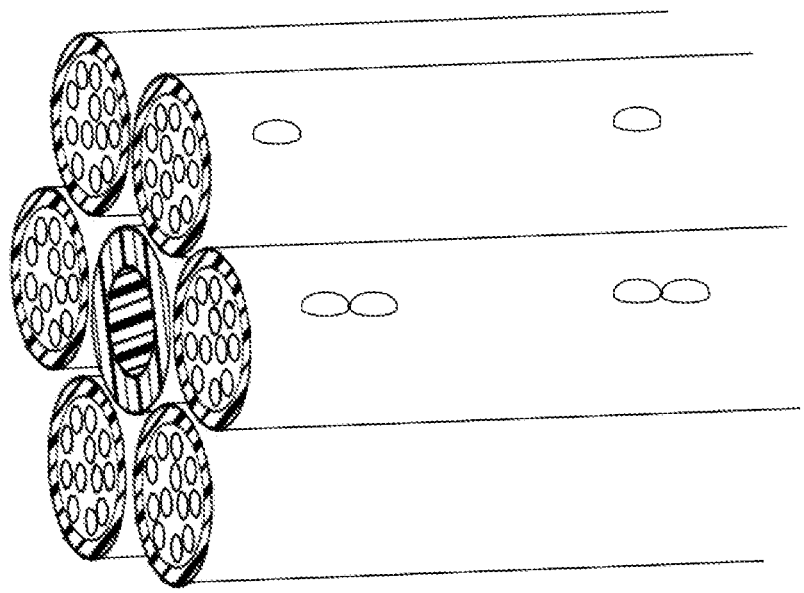
Figure 12D:
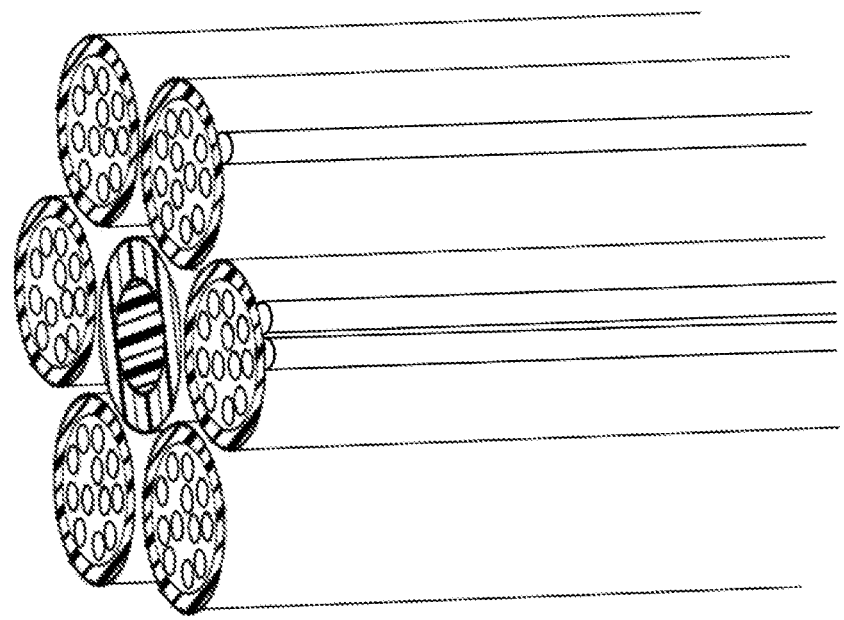
Figure 13A:
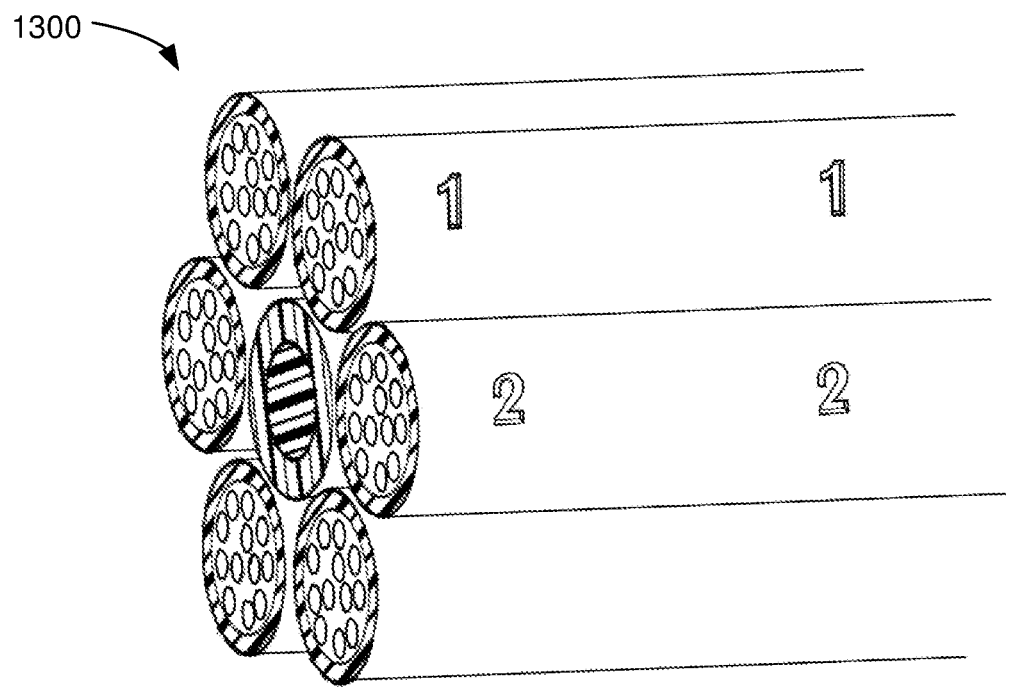
FIGS. 13A-13D are perspective views of example optical fiber buffer tubes that are free of colorant and that include indented physical indicia, according to illustrative embodiments of the disclosure.
Figure 13B:
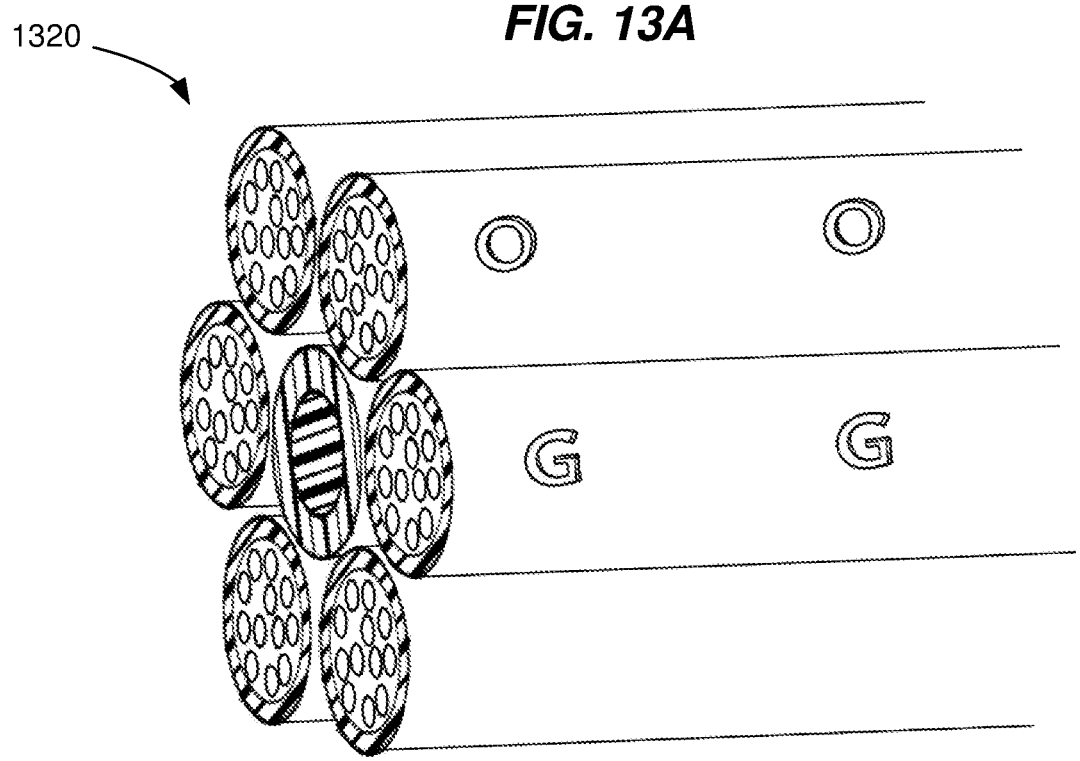
Figure 13C:
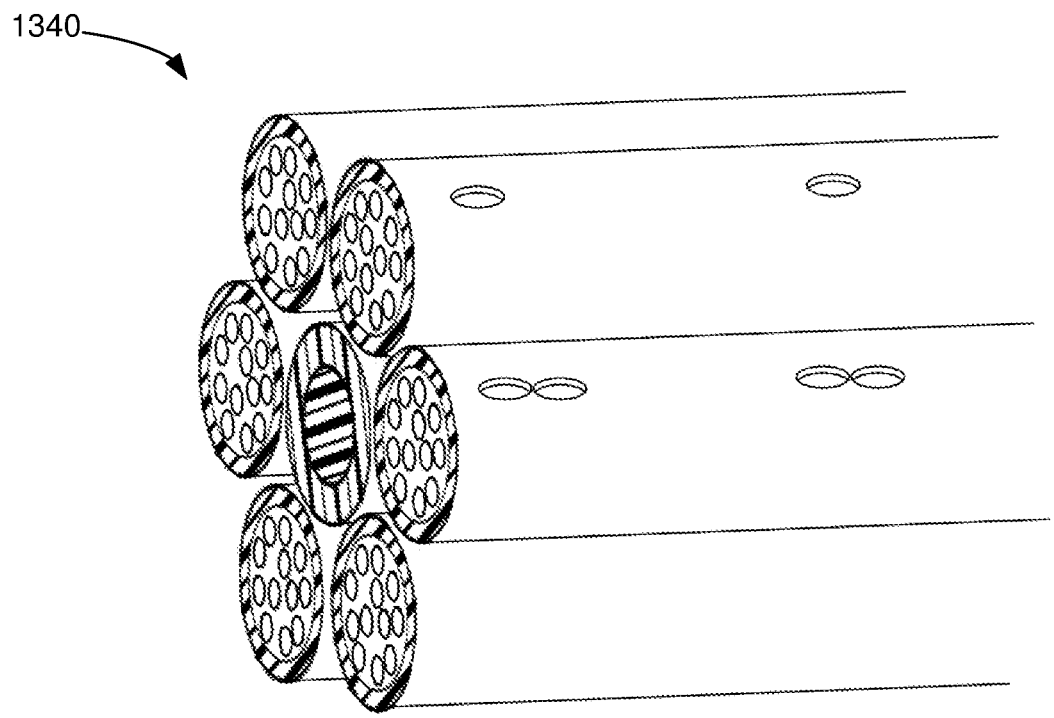
Figure 13D:
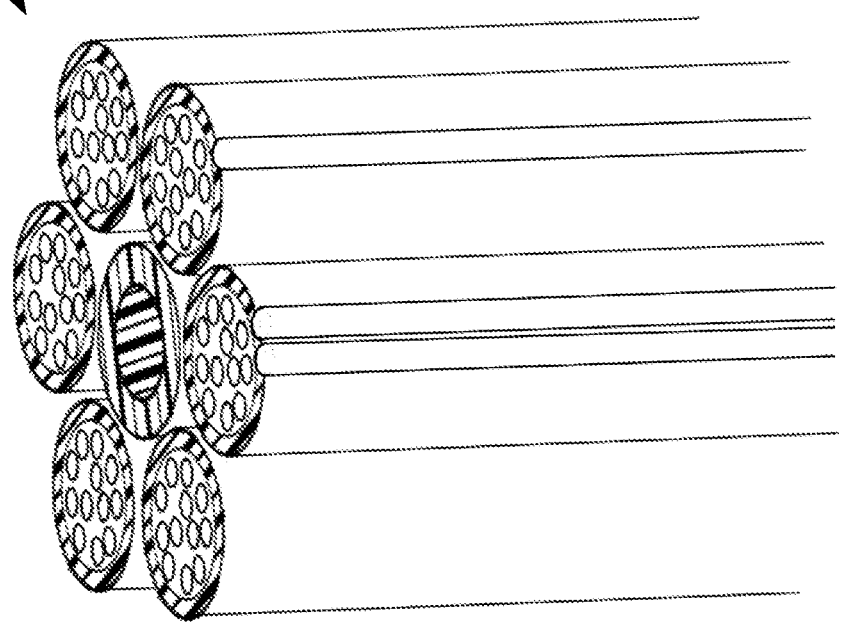

FIGS. 12A-13D are perspective views of example optical fiber components that include physical indicia formed as surface variations on buffer tubes. In particular, FIGS. 12A-12D are perspective views of example optical fiber components including buffer tubes that are free of colorant and that include respective raised physical indicia on the buffer tubes of any desired number of optical fiber components. In particular, FIG. 12A illustrates a first example group 1200 of optical fiber components in which physical indicia are formed as raised numbers. FIG. 12B illustrates a second example group of optical fiber components 1220 in which physical indicia are formed as raised letters or other alphanumeric characters. FIG. 12C illustrates a third example group of optical fiber components 1240 in which physical indicia are formed as raised dots or bumps. FIG. 12D illustrates a fourth example group of optical fiber components 1260 in which physical indicia are formed as raised ridges. FIGS. 13A-13D are perspective views of example optical fiber components including buffer layers that are free of colorant and that include respective indented physical indicia on the buffer tubes of any desired number of optical fiber components. In particular, FIG. 13A illustrates a first example group 1300 of optical fiber components in which physical indicia are formed as indented numbers. FIG. 13B illustrates a second example group of optical fiber components 1320 in which physical indicia are formed as indented letters or other alphanumeric characters. FIG. 13C illustrates a third example group of optical fiber components 1340 in which physical indicia are formed as indented dots or divots. FIG. 13D illustrates a fourth example group of optical fiber components 1360 in which physical indicia are formed as grooves.

Figure 14A:
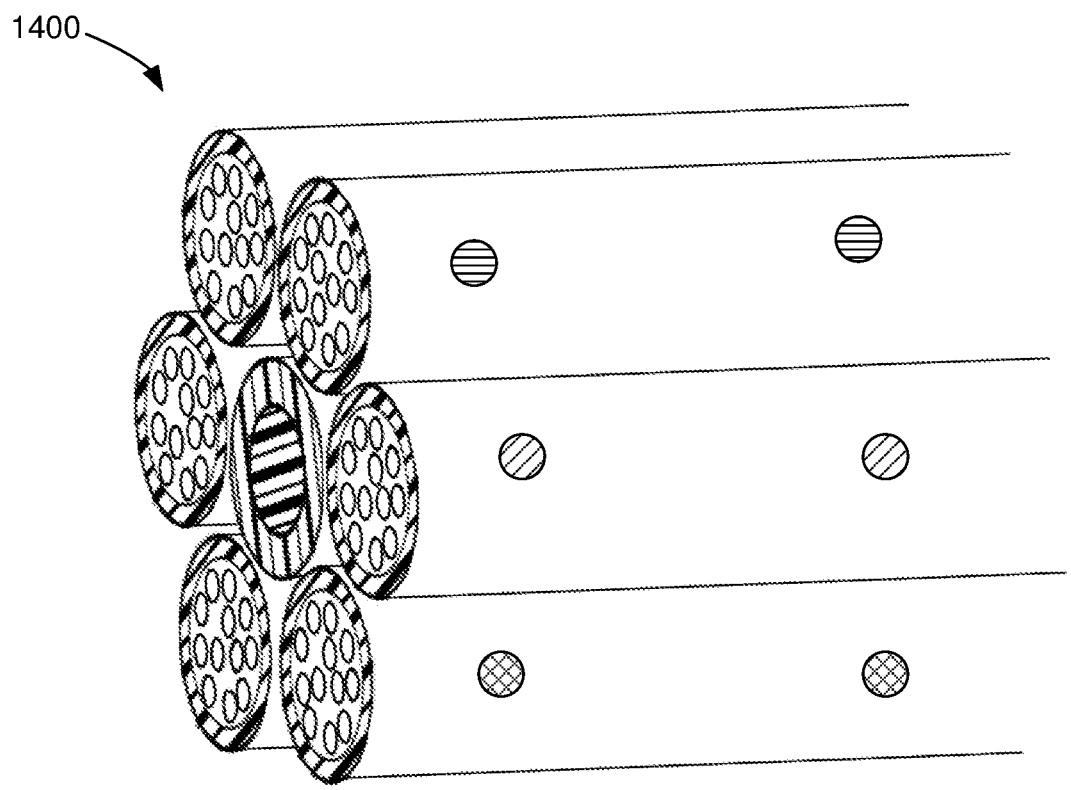
FIGS. 14A-14D are perspective views of example optical fiber buffer tubes that include limited colorant with physical indicia formed from two or more colors, according to illustrative embodiments of the disclosure.
Figure 14B:
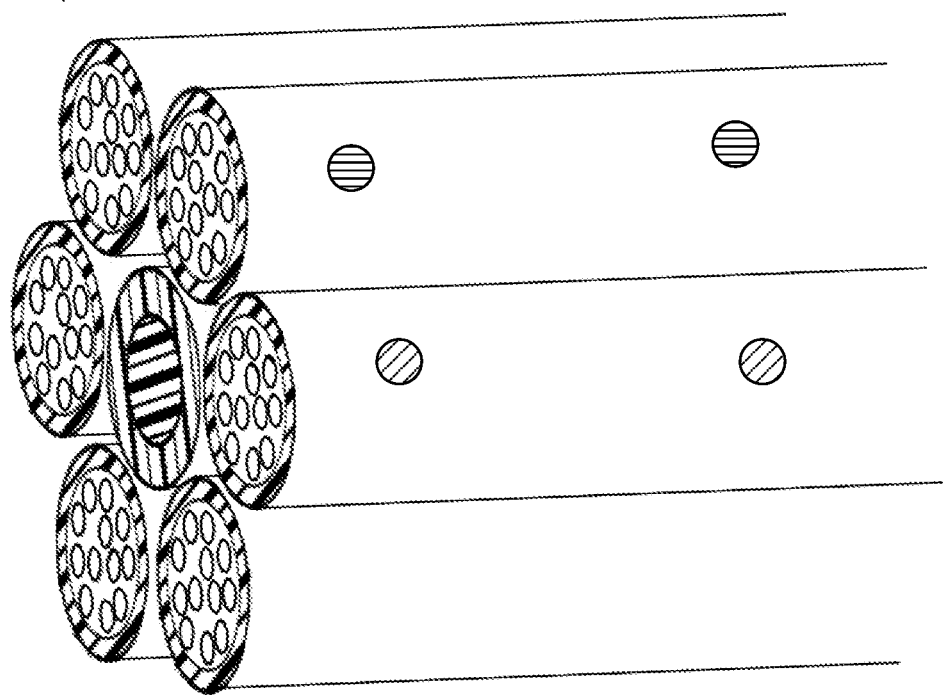
Figure 14C:
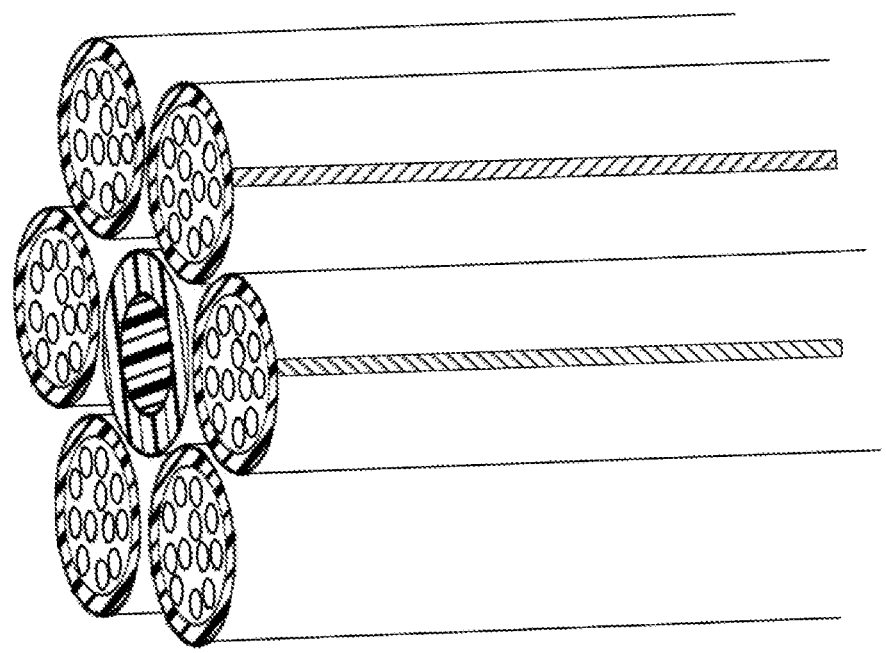
Figure 14D:
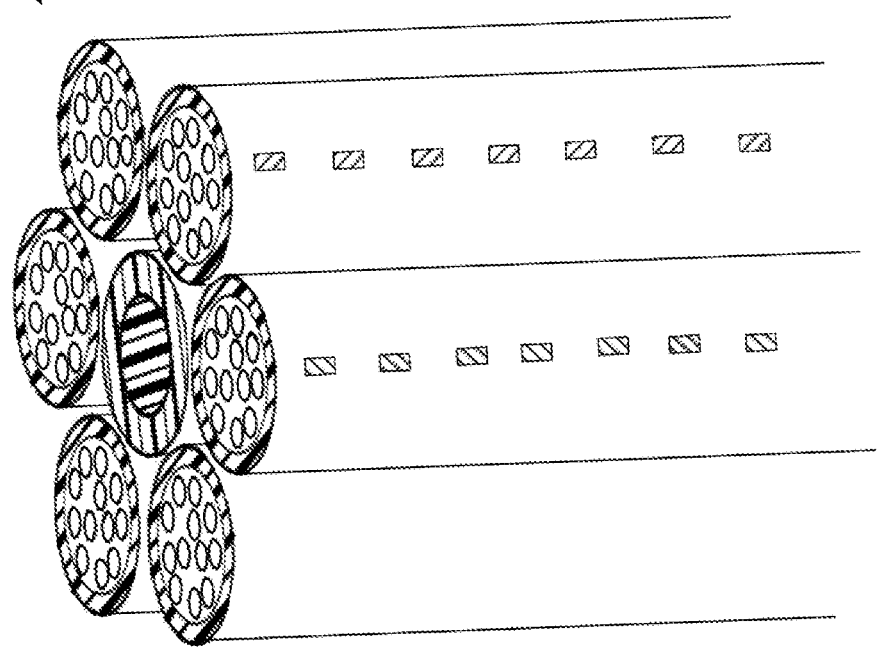
Figure 15A:
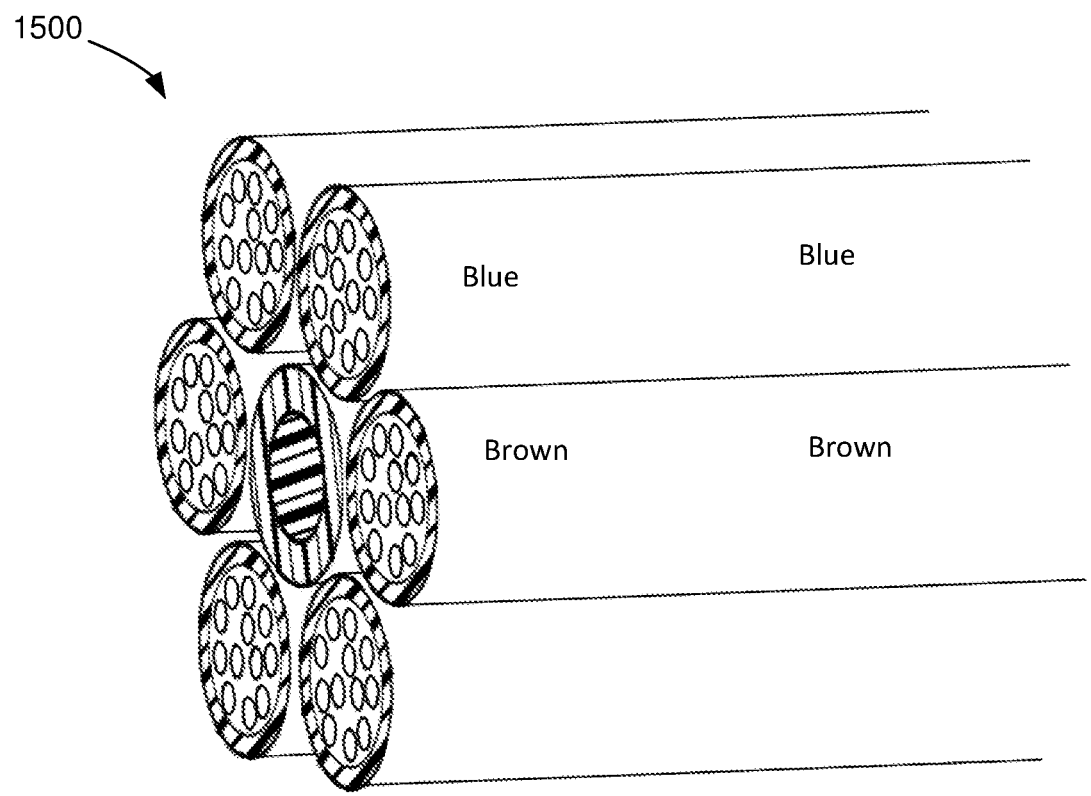
FIGS. 15A-15E are perspective views of example optical fiber buffer tubes that include limited colorant with physical indicia formed from a single color, according to illustrative embodiments of the disclosure.
Figure 15B:
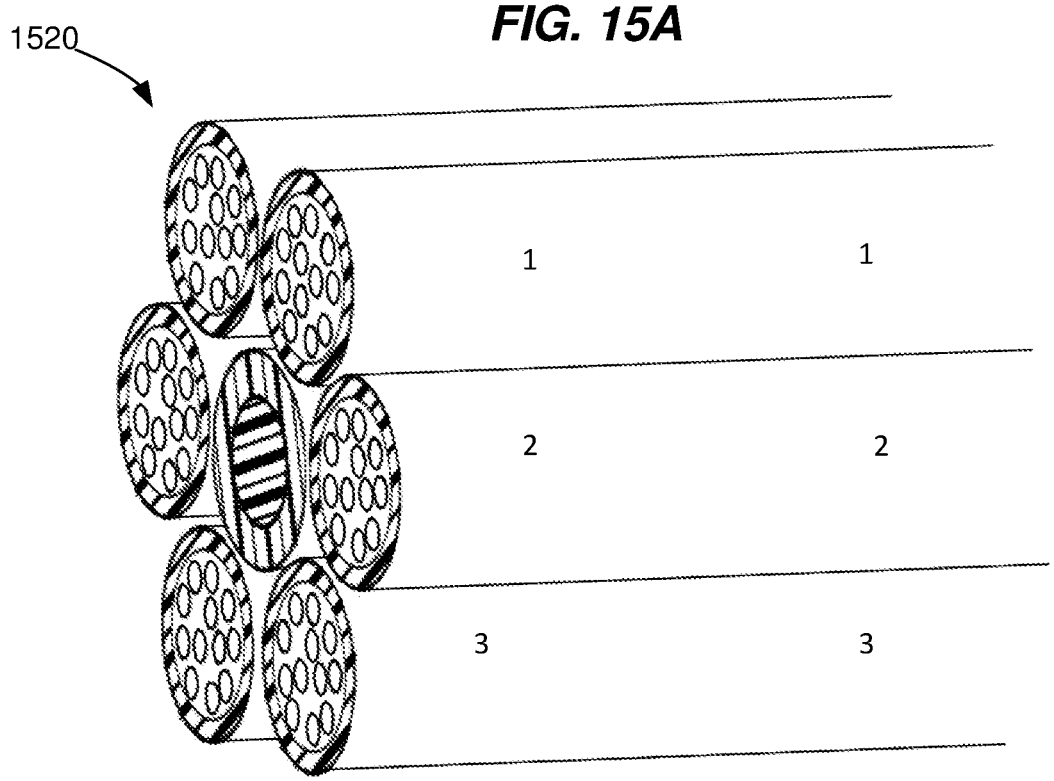
Figure 15C:
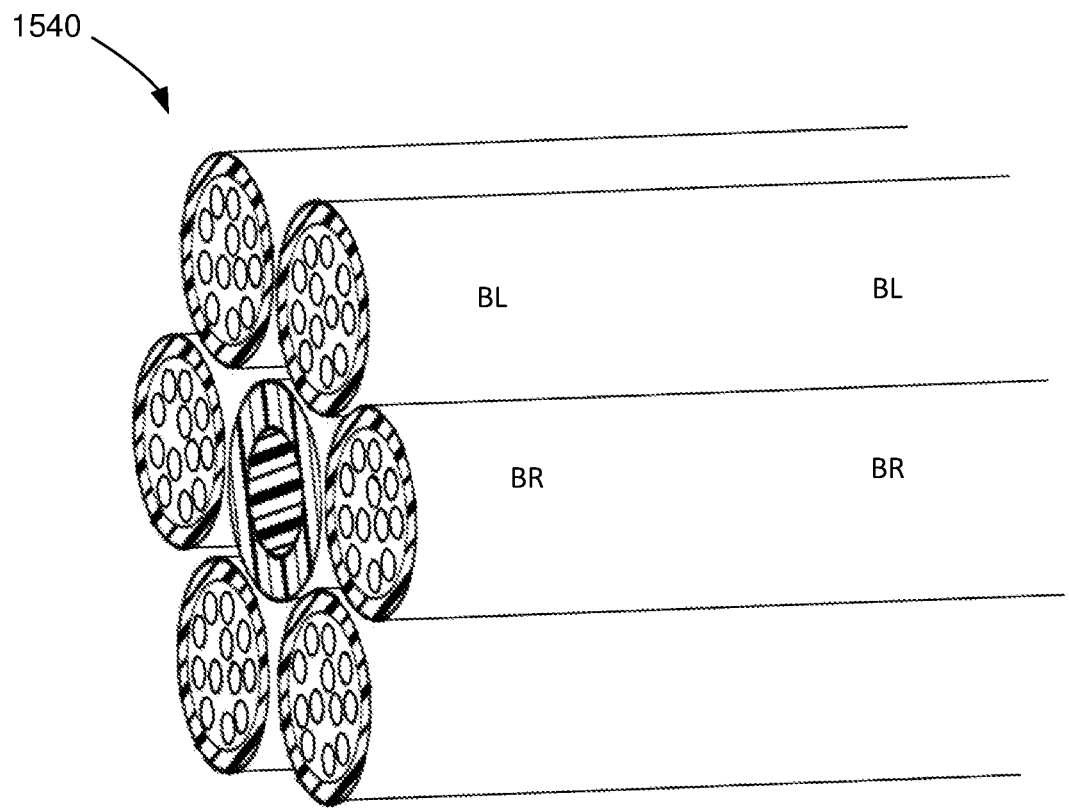
Figure 15D:
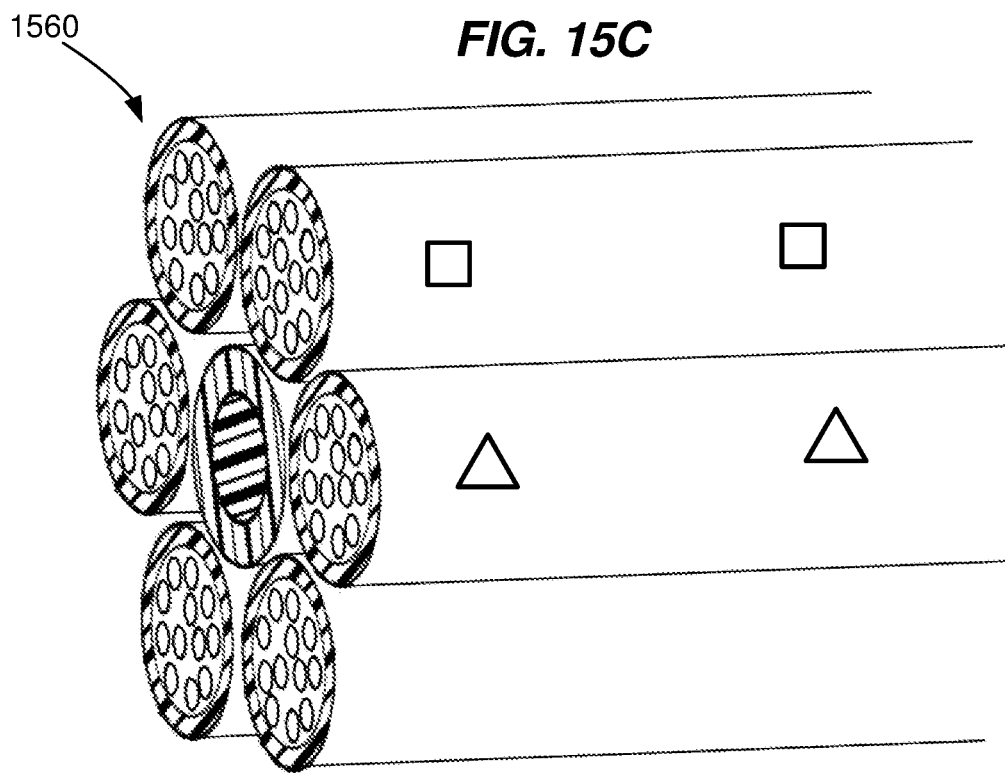
Figure 15E:
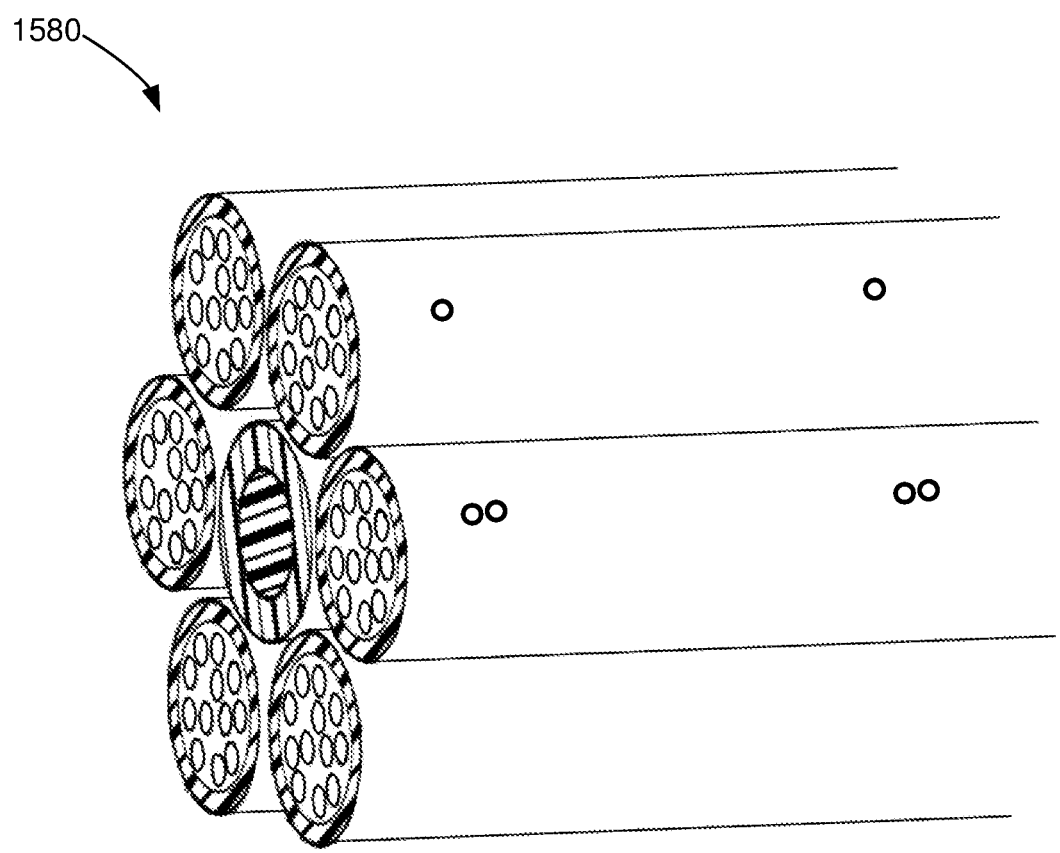

FIGS. 14A-15E are perspective views of example optical fiber components that include physical indicia formed with limited colorant on buffer tubes. In particular, FIGS. 14A-14D are perspective views of example optical fiber components having physical indicia formed from two or more different colors or colorants on the respective buffer tubes of any desired number of optical fiber components. In particular, FIG. 14A illustrates a first example group 1400 of optical fiber components in which physical indicia are formed as relatively small areas of different colorants on each of the different buffer tubes included in a plurality of optical fiber components. FIG. 14B illustrates a second example group 1420 of optical fiber components in which physical indicia are formed as relatively small areas of different colorants on the buffer tubes of a subset of a plurality of optical fiber components. FIG. 14C illustrates a third example group 1440 of optical fiber components in which physical indicia are formed as different colored lines or stripes on the buffer tubes of various optical fiber components. FIG. 14D illustrates a fourth example group 1460 of optical fiber components in which physical indicia are formed as dotted or broken lines (or as lines having different patterns) on the buffer tubes of various optical fiber components. FIGS. 15A-15E are perspective views of example optical fiber components having physical indicia formed from a single color or colorant on the respective buffer tubes of any desired number of optical fiber components. In particular, FIG. 15A illustrates a first example group 1500 of optical fiber components in which physical indicia are formed as text that identifies the conventional color(s) of one or more buffer tubes included in the optical fiber components. FIG. 15B illustrates a second set 1520 of optical fiber components in which numbers formed from a single colorant are utilized as physical indicia to identify various optical fiber components. FIG. 15C illustrates a third set 1540 of optical fiber components in which alphanumeric characters and/or sets of alphanumeric characters are utilized as physical indicia to identify various optical fiber components. FIG. 15D illustrates a fourth set 1560 of optical fiber components in which symbols (e.g., shapes, arrows, etc.) are utilized as physical indicia to identify various optical fiber components. FIG. 15E illustrates a fifth set 1580 of optical fiber components in which series of dots (or other shapes or symbols) are utilized as physical indicia to identify a desired number of the optical fiber components.

As mentioned above, the physical indicia illustrated in FIGS. 12A-15E as being formed on buffer tubes may be similar to the physical indicia illustrated and described in greater detail above with reference to FIGS. 8A-11E for tight buffers. As such, physical indicia may be formed on any desired numbers of buffer tubes (e.g., one, two, or more) provided that the physical indicia permit identification of each of the buffer tubes in certain embodiments. Physical indicia may also be selectively formed at a wide variety of suitable locations (e.g., longitudinally spaced locations, etc.) on various buffer tubes.

Additionally, as desired in various embodiments, any suitable combination of physical indicia illustrated and/or described herein for various buffer layers (e.g., tight buffer layers, buffer tubes, etc.) may be utilized. For example, a buffer layer may utilize a combination of raised, indented, textured, limited colorant, and/or other suitable physical indicia. The various buffer layers and associated physical indicia illustrated herein are provided by way of non-limiting example only.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic for deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A cable, comprising:
a single optical fiber component, the optical fiber component comprising:
at least one optical fiber; and
a buffer layer formed around the at least one optical fiber, the buffer layer comprising one or more first polymeric materials that are not blended or compounded with any colorant, and wherein no colorant is formed on an outer surface of the buffer layer; and
a jacket having a circular cross-sectional shape formed around the optical fiber component, the jacket comprising one or more second polymeric materials that are not blended or compounded with any colorant.

2. The cable of claim 1, wherein the buffer layer comprises a tight buffer layer.

3. The cable of claim 1, wherein the buffer layer comprises a loose buffer tube.

4. The cable of claim 3, wherein a plurality of optical fibers are positioned within the loose buffer tube.

5. The cable of claim 1, further comprising:
one or more surface variations selectively formed on an outer surface of the buffer layer.

6. The cable of claim 5, wherein the one or more surface variations comprise at least one of (i) a raised portion or (ii) an indention.

7. The cable of claim 6, wherein the one or more surface variations comprise at least one of (i) an embossing, (ii) a bump, (iii) a depression, (iv) a protrusion, (v) a dimple, (vi) a ridge, (vii) a groove, (viii) an alphanumeric character, or (ix) a symbol.

8. A cable, comprising:
a single optical fiber component, the optical fiber component comprising:
at least one optical fiber; and
a polymeric buffer layer formed around the at least one optical fiber, the polymeric buffer layer free of colorant; and
a jacket having a circular cross-sectional shape formed around the optical fiber component, the jacket comprising one or more polymeric materials that are not blended or compounded with any colorant.

9. The cable of claim 8, wherein the polymeric buffer layer comprises a tight buffer layer.

10. The cable of claim 8, wherein the polymeric buffer layer comprises a loose buffer tube.

11. The cable of claim 10, wherein a plurality of optical fibers are positioned within the loose buffer tube.

12. The cable of claim 8, further comprising:
one or more surface variations selectively formed on an outer surface of the polymeric buffer layer.

13. The cable of claim 12, wherein the one or more surface variations comprise at least one of (i) a raised portion or (ii) an indention.

14. The cable of claim 12, wherein the one or more surface variations comprise at least one of (i) an embossing, (ii) a bump, (iii) a depression, (iv) a protrusion, (v) a dimple, (vi) a ridge, (vii) a groove, (viii) an alphanumeric character, or (ix) a symbol.

15. A cable, comprising:
one or more optical fibers;
a single buffer layer formed around the one or more optical fibers, the single buffer layer comprising one or more first polymeric materials that are not blended or compounded with any colorant, and wherein no colorant is formed on an outer surface of the buffer layer; and
an outer jacket having a circular cross-sectional shape formed around the single buffer layer, wherein no buffer layers other than the single buffer layer are positioned within the outer jacket, the outer jacket comprising one or more second polymeric materials that are not blended or compounded with any colorant.

16. The cable of claim 15, wherein the single buffer layer comprises a tight buffer layer.

17. The cable of claim 15, wherein the single buffer layer comprises a loose buffer tube.

18. The cable of claim 17, wherein the one or more optical fibers comprises a plurality of optical fibers positioned within the loose buffer tube.

19. The cable of claim 17, further comprising:
one or more surface variations selectively formed on an outer surface of the single buffer layer.

20. The cable of claim 19, wherein the one or more surface variations comprise at least one of (i) a raised portion or (ii) an indention.

* * * * *